(12) United States Patent
Irwin et al.

(10) Patent No.: US 12,086,756 B2
(45) Date of Patent: *Sep. 10, 2024

(54) SYSTEMS AND METHODS FOR CONTROL OF ELECTRONIC PARCEL LOCKERS

(71) Applicant: United States Postal Service, Washington, DC (US)

(72) Inventors: Donald Eugene Irwin, Fredericksburg, VA (US); Gabriel Michael Yessin, Vienna, VA (US); Joram Shenhar, Fairfax, VA (US); Joel Locknauth Dewnandan, Bladensburg, MD (US); Michael LeRoy Spears, Chantilly, VA (US); William Albert Tartal, Baltimore, MD (US)

(73) Assignee: United States Postal Service, Wwashington, DC (US)

( * ) Notice: Subject to any disclaimer, the term of this patent is extended or adjusted under 35 U.S.C. 154(b) by 896 days.

This patent is subject to a terminal disclaimer.

(21) Appl. No.: 17/002,442

(22) Filed: Aug. 25, 2020

(65) Prior Publication Data
US 2020/0387862 A1    Dec. 10, 2020

Related U.S. Application Data

(63) Continuation of application No. 16/119,927, filed on Aug. 31, 2018, now Pat. No. 10,783,486, which is a
(Continued)

(51) Int. Cl.
*G06Q 10/0836*    (2023.01)
*G06Q 10/0837*    (2023.01)
(Continued)

(52) U.S. Cl.
CPC ..... *G06Q 10/0836* (2013.01); *G06Q 10/0837* (2013.01); *G07F 5/18* (2013.01);
(Continued)

(58) Field of Classification Search
CPC .......... G06Q 10/0836; G06Q 10/0837; G06Q 2200/00; G06Q 50/32; G06Q 50/60;
(Continued)

(56) References Cited

U.S. PATENT DOCUMENTS 256,296 A * 4/1882 Currier ................... G09F 11/02
312/305
894,577 A * 7/1908 Bessner ........... A47G 29/12095
232/27
(Continued)

FOREIGN PATENT DOCUMENTS

AU    2011224030 A1    10/2011
CN    113729419 B *    7/2023    ........... A47B 49/004
(Continued)

OTHER PUBLICATIONS

Anonymous: "Mailbox Monitor | dgraves.org", Feb. 14, 2016, XP055682452, https://web.archive.org/web/20160214071632/http://dgraves.org/mailboxmonitor, retrieved Apr. 2, 2020.
(Continued)

*Primary Examiner* — William L Miller
(74) *Attorney, Agent, or Firm* — Knobbe, Martens, Olson & Bear, LLP

(57) ABSTRACT

Systems, devices and methods for storage, delivery, receipt, and/or other handling of an item in an electronically controllable storage receptacle are disclosed. The disclosure provides features for keyless access to the storage receptacle by use of user access information, such as a PIN or bar code. Further, features are disclosed for receiving and/or transmitting data related to the recipient and the item to facilitate the various handling actions of the item.

12 Claims, 48 Drawing Sheets

Related U.S. Application Data continuation of application No. 14/743,260, filed on Jun. 18, 2015, now Pat. No. 10,074,068.

(60) Provisional application No. 62/015,309, filed on Jun. 20, 2014.

(51) Int. Cl.
    *G07F 5/18* (2006.01)
    *G07F 9/00* (2006.01)
    *G07F 17/12* (2006.01)
    *H04L 9/40* (2022.01)

(52) U.S. Cl.
    CPC ............. *G07F 9/001* (2020.05); *G07F 9/002* (2020.05); *G07F 17/13* (2020.05); *G06Q 2220/00* (2013.01); *H04L 63/08* (2013.01)

(58) Field of Classification Search
    CPC .......... G07F 9/001; G07F 9/002; G07F 17/13; G07F 5/18; H04L 63/08; A47G 29/1201; A47G 29/141
    USPC ................................................ 232/24, 25, 27
    See application file for complete search history.

(56) References Cited

U.S. PATENT DOCUMENTS

| | | | | |
|---|---|---|---|---|
| 1,534,920 | A * | 4/1925 | Cox | A47G 29/1201 232/26 |
| 1,605,118 | A * | 11/1926 | Kolstad | A47G 29/1201 232/24 |
| 4,509,676 | A * | 4/1985 | Stacy | A47G 29/1218 232/27 |
| 4,651,921 | A * | 3/1987 | McKellar | A47G 29/1218 232/43.4 |
| 5,223,829 | A * | 6/1993 | Watabe | A47G 29/141 340/568.1 |
| 5,385,265 | A | 1/1995 | Schlamp | |
| 5,494,347 | A * | 2/1996 | Poortvliet | A47B 49/00 312/249.2 |
| 6,003,761 | A * | 12/1999 | Chapman | A47G 29/1201 232/27 |
| 6,010,064 | A | 1/2000 | Umeda et al. | |
| 6,300,873 | B1 | 10/2001 | Kucharczyk et al. | |
| 6,845,909 | B2 | 1/2005 | Bong et al. | |
| 7,133,743 | B2 | 11/2006 | Tilles et al. | |
| 7,337,944 | B2 | 3/2008 | Devar | |
| 7,925,375 | B2 * | 4/2011 | Schininger | G07F 11/54 700/214 |
| 9,052,992 | B2 | 6/2015 | Irwin et al. | |
| 9,120,624 | B1 * | 9/2015 | Cassady | G06Q 10/0836 |
| 9,223,315 | B2 | 12/2015 | Irwin et al. | |
| 9,642,476 | B1 | 5/2017 | Mehdizadeh | |
| 10,074,068 | B2 | 9/2018 | Irwin et al. | |
| 11,191,382 | B2 * | 12/2021 | Likins | A47G 29/1201 |
| 11,633,058 | B2 * | 4/2023 | Sun | B64F 1/324 232/43.1 |
| 2001/0017507 | A1 * | 8/2001 | Hara | A47G 29/141 312/326 |
| 2002/0035515 | A1 | 3/2002 | Moreno | |
| 2002/0080030 | A1 | 6/2002 | Inomata | |
| 2002/0113703 | A1 | 8/2002 | Moskowitz et al. | |
| 2002/0130172 | A1 * | 9/2002 | Hara | A47G 29/141 232/18 |
| 2002/0147525 | A1 | 10/2002 | Cayne et al. | |
| 2002/0156645 | A1 | 10/2002 | Hansen | |
| 2003/0025590 | A1 | 2/2003 | Gokcebay et al. | |
| 2004/0089482 | A1 | 5/2004 | Ramsden et al. | |
| 2004/0199284 | A1 | 10/2004 | Hara | |
| 2005/0040931 | A1 | 2/2005 | Yasuhiro | |
| 2005/0040932 | A1 | 2/2005 | Cayne et al. | |
| 2005/0067925 | A1 | 3/2005 | Stone, III | |
| 2005/0068178 | A1 | 3/2005 | Lee et al. | |
| 2005/0083176 | A1 | 4/2005 | Yamada | |
| 2005/0179349 | A1 | 8/2005 | Booth et al. | |
| 2006/0020366 | A1 | 1/2006 | Bloom | |
| 2006/0080133 | A1 | 4/2006 | Das et al. | |
| 2006/0138220 | A1 | 6/2006 | Persky | |
| 2008/0128444 | A1 | 6/2008 | Schininger et al. | |
| 2009/0015400 | A1 | 1/2009 | Breed | |
| 2009/0015405 | A1 | 1/2009 | DiPoala | |
| 2009/0076650 | A1 | 3/2009 | Faes | |
| 2009/0187274 | A1 | 7/2009 | Higham | |
| 2012/0062362 | A1 | 3/2012 | Ruddock et al. | |
| 2012/0086314 | A1 | 4/2012 | Bourke et al. | |
| 2012/0089530 | A1 | 4/2012 | Klingenberg et al. | |
| 2012/0267057 | A1 | 10/2012 | Rydberg | |
| 2012/0326840 | A1 | 12/2012 | Frankenberg et al. | |
| 2013/0038450 | A1 | 2/2013 | Stewart | |
| 2013/0144427 | A1 | 6/2013 | Pugliese, III et al. | |
| 2013/0144428 | A1 | 6/2013 | Irwin et al. | |
| 2013/0166060 | A1 | 6/2013 | Irwin et al. | |
| 2013/0166067 | A1 | 6/2013 | Irwin et al. | |
| 2013/0261792 | A1 * | 10/2013 | Gupta | B65G 1/1378 700/232 |
| 2013/0338822 | A1 | 12/2013 | Gibson, Jr. et al. | |
| 2013/0346509 | A1 | 12/2013 | Elkins et al. | |
| 2014/0203076 | A1 | 7/2014 | Amdahl et al. | |
| 2014/0330407 | A1 | 11/2014 | Corder et al. | |
| 2014/0330603 | A1 | 11/2014 | Corder et al. | |
| 2015/0145642 | A1 | 5/2015 | Rutledge et al. | |
| 2015/0186840 | A1 * | 7/2015 | Torres | A47F 10/02 705/339 |
| 2015/0254248 | A1 | 9/2015 | Burns et al. | |
| 2015/0310381 | A1 | 10/2015 | Lyman | |
| 2015/0371187 | A1 | 12/2015 | Irwin et al. | |
| 2016/0066732 | A1 * | 3/2016 | Sarvestani | A47G 29/141 232/24 |
| 2016/0148154 | A1 | 5/2016 | Tibbs et al. | |
| 2016/0278558 | A1 | 9/2016 | Ansari | |
| 2016/0286998 | A1 * | 10/2016 | Lindbo | F25D 17/06 |
| 2017/0091710 | A1 | 3/2017 | Van Dyke | |
| 2017/0116571 | A1 | 4/2017 | Tammattabattula | |
| 2017/0278063 | A1 * | 9/2017 | Dixon | A47G 29/141 |
| 2017/0286905 | A1 * | 10/2017 | Richardson | A47G 29/20 |
| 2018/0070753 | A1 * | 3/2018 | Eveloff | H04W 4/025 |
| 2019/0051090 | A1 * | 2/2019 | Goldberg | G07F 9/001 |
| 2019/0114585 | A1 * | 4/2019 | Fee | G06Q 10/0836 |
| 2019/0313828 | A1 * | 10/2019 | Schmider | G07C 9/21 |
| 2020/0193373 | A1 * | 6/2020 | Varman | A47G 29/1218 |
| 2020/0349796 | A1 * | 11/2020 | Gokcebay | G07C 9/00896 |
| 2021/0224948 | A1 | 7/2021 | Steiner et al. | |
| 2021/0293465 | A1 * | 9/2021 | Cartwright | G06Q 10/0832 |
| 2022/0028192 | A1 * | 1/2022 | O'Rourke | G07C 9/00912 |

FOREIGN PATENT DOCUMENTS

| | | |
|---|---|---|
| DE | 10 2006 047 797 A1 | 4/2008 |
| EP | 1 921 586 A1 | 5/2008 |
| EP | 2913804 A1 | 9/2015 |
| JP | 2002-189797 A | 7/2002 |
| JP | 2004-026430 A | 1/2004 |
| WO | WO 01/31827 A2 | 5/2001 |
| WO | WO 02/07119 A1 | 1/2002 |
| WO | WO 02/074634 A2 | 9/2002 |
| WO | WO 2015/173820 A1 | 11/2015 |
| WO | WO 2016/138582 A1 | 9/2016 |

OTHER PUBLICATIONS

International Search Report and Written Opinion dated May 22, 2017 in International Application No. PCT/US2017/023661.
International Search Report & Written Opinion dated Oct. 20, 2017 in International Application No. PCT/US2017/046093.
International Search Report and Written Opinion dated Apr. 10, 2013 for International Application No. PCT/US12/68020.
Extended European Search Report dated May 29, 2015 for European Patent Application No. EP 15 162 411.1.
Extended European Search Report dated Jun. 10, 2015 for European Patent Application No. EP 12 855 458.1.

(56) References Cited

OTHER PUBLICATIONS

International Preliminary Report on Patentability dated Sep. 25, 2018 in International Application No. PCT/US2017/023661.
Sebastian, B. "Intelligent Mailbox System and Automatic Delivery Notification" <https://pdfs.semanticscholar.org/d8fd/ff82b1c6f2bee2ed9223b0a924c147ce6b80.pdf> Dec. 2015, Retrieved Sep. 23, 2019.
Paul Singh, S., Gary Burgess, and Jagjit Singh. "Measurement and analysis of the second-day air small and light-weight package shipping environment within federal express." Packaging Technology and Science: An International Journal 17 .3 (2004): 119-127. (Year: 2004).
Subramaniam et al. "Real time mailbox alert system via sms or email," 2007 Asia-Pacific Conference on Applied Electromagnetics, 2007, pp. 1-4, doi: 10.1109/APACE.2007.4603963. (Year: 2007).

\* cited by examiner

# SYSTEMS AND METHODS FOR CONTROL OF ELECTRONIC PARCEL LOCKERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. patent application Ser. No. 16/119,927, filed on Aug. 31, 2018, which is a continuation of U.S. patent application Ser. No. 14/743,260, filed on Jun. 18, 2015, which issued as U.S. Pat. No. 10,074,068, which claims the benefit of priority under 35 U.S.C. § 119(e) of U.S. Provisional Application No. 62/015,309, filed on Jun. 20, 2014 and entitled "SYSTEMS AND METHODS FOR CONTROL OF ELECTRONIC PARCEL LOCKERS," the entire disclosure of each of which is incorporated herein by reference.

BACKGROUND

Field of the Development

This disclosure relates to the field of the transportation, delivery, storage and/or other handling of one or several items and the field of communication, tracking, and control of the transportation, delivery, storage and/or other handling of one or several items. More particularly, the disclosure relates to such fields as they include electronic parcel lockers.

Description of the Related Art

Delivery and receipt of items from one person or company to another is a crucial need in today's economy. Ensuring fast, reliable and simple handling of such items is therefore desirable. This is especially true with items that are too large to fit in conventional mail boxes or Post Office boxes. Further, the volume of "failed first attempts," in which a recipient is unable to receive the first attempted delivery of an item, by the United States Postal Office in 2012 was over 135 million, presenting another issue with delivery that may be improved.

Existing methods and systems that allow for delivery and receipt of items are not convenient. For instance, failed first attempts and parcels that do not fit inside a recipient's mailbox may be brought back and stored behind the counter at a delivery service, such as the Post Office. The recipient of the box must then travel to the delivery service, wait in line, and retrieve the parcel from an employee at the counter. Or, a delivery agent must retry delivery by physically bringing the parcel to the home or office of the recipient. In such cases, the delivery agent and/or the recipient are inconvenienced. Further, the delivery service may be closed when the recipient goes to retrieve it, or the delivery agent may not be working or may be running behind, or the recipient may not be home or at the office when the item is re-delivered.

Further, conventional systems require physical keys to be used to access storage units. Difficulties are presented when keys are lost or stolen. Keys may also be easily duplicated and thus may not be the most secure means for accessing a unit. The number of keys in existence for a unit also requires tracking and keeping an inventory for the keys and their whereabouts, etc.

There is, therefore, a need for a simpler and more convenient method of delivery and receipt of items to a recipient to address the aforementioned issues. Toward this end, the present disclosure provides systems, devices and methods that allow for simpler and more convenient delivery, receipt, storage and other actions related to the handling of an item.

SUMMARY

Some embodiments described herein include a system for access to and storage of an item. In some embodiments, the system may comprise a plurality of electronically controllable storage receptacles, wherein at least one of the storage receptacles is configured to receive the item; and a control unit in communicating connection with the plurality of receptacles, wherein the control unit is configured to: receive identifying information corresponding to a recipient of the item, associate the recipient with user access information; generate notice information, regarding the item, for transmission to the recipient, associate the user access information with the at least one of the storage receptacles, receive access information via an interface, and provide access to the at least one of the storage receptacles when the received access information corresponds to the user access information.

In some embodiments, the user access information is personal identification information associated with the recipient.

In some embodiments, the notice information comprises the user access information.

In some embodiments, the control unit is further configured to generate the user access information.

In some embodiments, the control unit is further configured to prohibit use of the user access information to access the at least one of the storage receptacles following providing access to the at least one of the storage receptacles.

In some embodiments, the user access information is a bar code and the interface is a bar code scanner.

In some embodiments, the control unit is further configured to associate the user access information with the at least one of the storage receptacles based on a priority function.

In some embodiments, the priority function comprises a parameter related to at least one of historical frequency of use of the system by the recipient and efficiency of use of the system by the recipient.

In some embodiments, the user access information is a PIN and the interface is a number pad.

In some embodiments, the control unit further comprises a first side and a second side opposite the first side, wherein the first side comprises a user interface and the second side comprises an agent interface, wherein the user interface comprises the interface and a plurality of access points to the plurality of storage receptacles, and wherein the agent interface comprises rear access to the plurality of storage receptacles.

In some embodiments, the agent interface further comprises a display; an input device in communicating connection with the display; and a user access information generator in communicating connection with the input device.

In some embodiments, the system further comprises a first side and a second side opposite the first side; and a rotatable frame, wherein the first side comprises a user interface and the second side comprises an agent interface, wherein the rotatable frame is coupled with the plurality of storage receptacles and the control unit such that rotation of the frame rotates the plurality of storage receptacles and the control unit.

In some embodiments, the system further comprises a storage receptacle module comprising at least one of the storage receptacles and configured to be coupled to and decoupled from the system.

In some embodiments, the interface is configured to receive the user access information from a mobile device.

In some embodiments, the interface is a scanner and the user access information is a QR code.

In some embodiments, the system further comprises a user database.

In some embodiments, the control unit is further configured to transmit the notice information to the recipient.

Some further embodiments described herein include a method of storing an item in a storage receptacle. In some embodiments, the method comprises receiving identifying information corresponding to a recipient of the item; associating the recipient with user access information; generating notice information, regarding the item, for transmission to the recipient; associating the user access information with the storage receptacle; receiving access information via an interface; and providing access to the storage receptacle when the received access information corresponds to the user access information.

In some embodiments, the user access information is a personal identification code associated with the recipient.

In some embodiments, the notice information comprises the user access information.

In some embodiments, the method further comprises generating the user access information.

In some embodiments, the method further comprises prohibiting use of the user access information to access the storage receptacle following providing access to the receptacle.

In some embodiments, the user access information is a bar code, the interface is a bar code scanner, and receiving access information comprises scanning the bar code.

In some embodiments, the user access information is associated with the storage receptacle based on a priority function.

In some embodiments, the priority function comprises a parameter related to at least one of historical frequency of use of the system by the recipient and efficiency of use of the system by the recipient.

In some embodiments, providing access to the storage receptacle comprises unsecuring the storage receptacle.

Some further embodiments described herein include a method of providing access to an item in a storage receptacle. In some embodiments, the method comprises receiving access information corresponding to user access information, wherein the user access information corresponds to the storage receptacle; electronically unsecuring the receptacle; and prohibiting use of the user access information to access the storage receptacle following providing access to the storage receptacle.

Some further embodiments described herein include a system for storage of an item. In some embodiments, the system comprises means for receiving identifying information corresponding to a recipient of the item; means for associating the recipient with user access information, the means for associating the recipient in communicating connection with the means for receiving identifying information; means for generating notice information, regarding the item, for transmission to the recipient, the means for generating in communicating connection with the means for associating the recipient; means for associating the user access information with a storage receptacle, the means for associating the user access information in communicating connection with the means for associating the recipient; means for receiving access information via an interface, the means for receiving access information in communicating connection with the means for associating the user access information; and means for providing access to the storage receptacle when the received access information corresponds to the user access information, the means for providing access in communicating connection with the means for associating the user access information.

In some embodiments, the system further comprises means for generating the user access information, the means for generating the user access information in communicating connection with the means for generating notice information.

In some embodiments, the system further comprises means for prohibiting use of the user access information to access the storage receptacle following providing access to the receptacle, the means for prohibiting in communicating connection with the means for providing access.

In some embodiments, the means for providing access to the storage receptacle comprises means for electronically unsecuring the storage receptacle.

In some embodiments, the means for assigning a storage receptacle for the item comprises means for assigning a storage receptacle for the item based on a priority function.

Some further embodiments described herein include a system for providing access to an item in a storage receptacle. In some embodiments, the system comprises, means for receiving access information corresponding to user access information, wherein the user access information corresponds to the storage receptacle; means for electronically unsecuring the receptacle; and means for prohibiting use of the user access information to access the storage receptacle following providing access to the storage receptacle.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DETAILED DESCRIPTION

Figure 1:
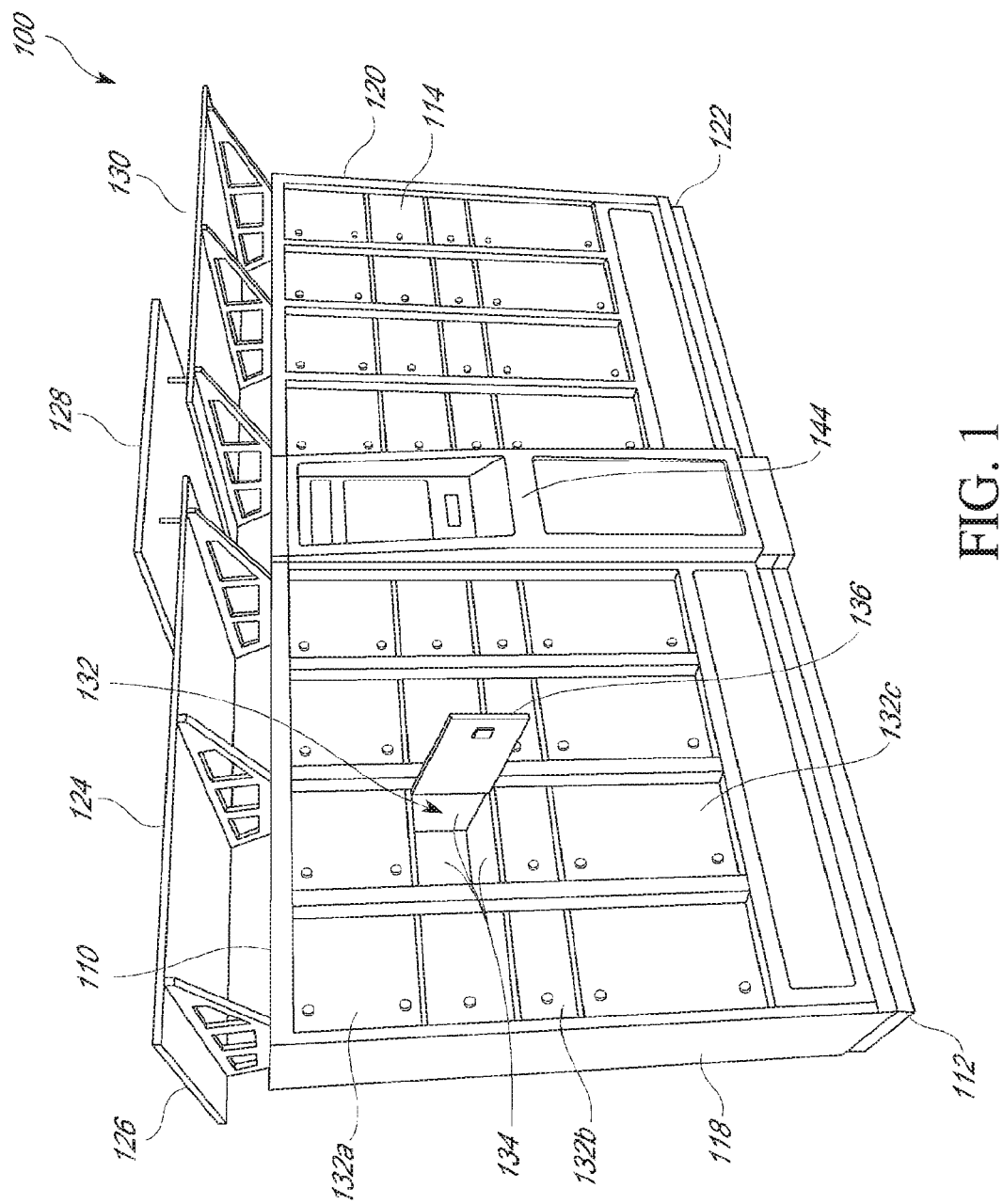
FIG. 1 depicts a perspective view of a storage unit.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some embodiments disclosed herein relate generally to a storage unit configured for use in item distribution. The storage unit may be an electronic parcel locker which acts as a parcel exchange point where customers send paid parcels or retrieve delivered parcels from electronic parcel lockers located in convenient locations. The customers may be customers who have registered to use the storage unit system, or may be guest users who perform one or more discrete transactions without registration. In some embodiments, the storage unit includes, for example, a plurality of storage receptacles. In some embodiments, access to the storage receptacles of the storage unit is controlled by a control unit. The control unit, in some embodiments, is configured to communicate information to, and receive inputs from a user, which may be a customer or an agent, and may, in response to those inputs, provide user access to one or more of the storage receptacles. In some embodiments, a user may provide user access information, such as a personal identification number (PIN) or an access code, which may be configured for one-time use, to the control unit in order to unlock and gain access to the storage receptacle. In some embodiments, the user access information is stored by the control unit. In some embodiments, the control unit of the storage receptacle may be further configured to allow the creation of the user access information for delivering to a customer or of labeling for placement on an item. The user access information may thus include, for example, a receipt with a bar code or a QR code presentable on a mobile device. The labeling may include, for example, creation of identification labeling, mailing labeling, such as, for example, destination and/or return address, postage, or any other desired labeling.

Some embodiments disclosed herein relate to an item delivery system that includes a plurality of storage units. In some embodiments, the plurality of storage units and/or storage receptacles each communicate with a central control unit. These communications relate to, for example, the availability of storage receptacles at each of the storage units and the priority of use of the storage receptacles by registered users. In some embodiments, the control unit uses this information relating to the availability and priority of storage receptacles to direct the flow of items to thereby maximize usage of the storage receptacles. A person of skill in the art, having the instant specification, will appreciate that a storage unit, and a delivery system disclosed herein may be used with diverse items and in diverse ways.

Some embodiments disclosed herein relate to a keyless storage system that allows for keyless retrieval of an item or parcel from a storage receptacle. In an implementation, user access information, such as a PIN or a bar code, and an interface, such as a number pad or scanner, are used for access to the storage receptacle. The number pad may receive a series of numbers and/or letters, or a bar code scanner may read the bar code, and in response the control unit may unlock and/or open the associated storage receptacle. The PIN may be a number, series of alphabetic letters or an alphanumeric sequence of which a recipient already has knowledge or possession. For instance, registered users of the system may be provided a PIN for future use of the system. The bar code may be a bar code printed on a receipt or a bar code such as a QR code on a mobile device, such as a mobile phone or tablet.

In some embodiments, the user access information and identifying information that corresponds to a recipient of the parcel is associated with the storage receptacle. User access information, that may be generated by the control unit, may be provided to the recipient. In some embodiments, the user access information is put in the recipient's post office box or home mailbox, or it may be electronically delivered to the recipient, for example by electronic mail or text message. The control unit may then receive user access information, and open or otherwise unsecure the corresponding storage receptacle if the user access information corresponds to the access information, and perform various functions related to the user access information and identifying information. In some embodiments, the control unit will remove or otherwise deactivate the user access information following its use such that it may only be used once to open the storage receptacle. In some embodiments, the control unit will prohibit use of the user access information to access the storage receptacle after the receptacle is unsecured.

In some embodiments, information related to the efficiency and frequency of retrieval of parcels by a specific recipient using the system over time may be collected. This information may be analyzed and used in future assignments of storage units for a particular recipient. In some embodiments, priority in use of the system is given to those recipients with higher priority ratings as compared to other users of the system. In some embodiments, a registered user database is queried by the control unit in various functions performed by the control unit.

As used herein, the term storage unit denotes a place which facilitates pick-up and drop-off of items. In some embodiments, the storage unit is intended to provide a location for short term storage of an item after an item is dropped off or while the item is waiting to be picked up or received by an agent or customer. While some systems, devices, and methods may be discussed under one subheading, the same systems, devices, and methods may be further discussed in other sections of the present disclosure.

FIG. 1 depicts one embodiment of a storage unit 100. As depicted in FIG. 1, a storage unit has a top 110, a bottom 112, a front 114, a back (not shown), a first end 118, and a second end 120.

Some embodiments of a storage unit 100 include features to facilitate placement of the storage unit 100 and protection of the storage unit 100 from the elements. In some embodiments, the storage unit 100 comprises a base 122. The base 122 is located at the bottom 112 of the storage unit 100. In some embodiments, the base 122 is configured for securing the storage unit 100 to a placement location, and is constructed of steel, concrete, aluminum, metal, a synthetic material, a natural material, or any other desired material. In some embodiments, the base 122 may include features for securement, such as, for example, screws, bolts, nuts, clips, hooks, or any other desired securement feature. In some embodiments these securement features may be located on the sides, roof, and/or back of the storage unit 100 and/or control unit 144. These features may include any features capable of securing the storage unit 100 to the location at which the storage unit 100 is placed. In some embodiments, the base 122 is integrally formed as a non-removable portion of the storage unit 100, and provides a foundation or support for the storage unit as the storage unit 100 is installed or located at a site.

In some embodiments, the base 122 comprises an elevated base. An elevated base is configured to elevate the storage unit 100 above the surrounding ground level to thereby protect the storage unit 100 and the contents of the storage unit 100. In some embodiments, the elevated base is sized to prevent water from entering the storage unit 100. Specifically, the elevated base is sized to prevent water from precipitation, such as, from rain, or snow, from entering the storage unit 100, as well as to prevent any other liquids from flowing into or from entering into the storage unit 100.

As depicted in FIG. 1, some embodiments of the storage unit 100 include a roof 124. The roof 124 is positioned above the top 110 of the storage unit 100. The roof 124 is sized to cover some or all of the top 110 of the storage unit 100. In some embodiments, the roof 124 is sized so that the roof 124 covers a larger area than that occupied by the storage unit 100.

The roof 124 may be made of a variety of materials, including, for example, metal, man-made materials, natural materials, or any other desired material. The roof 124 may comprise a variety of shapes. In some embodiments, the roof 124 may comprise one or several substantially planar surfaces, rounded or curved surfaces, or surfaces having any other desired shape. The roof 124 may be positioned in any desired angular position relative to the top 110 of the storage unit 100. In some embodiments, the roof 124 is positioned parallel to the top 110 of the storage unit 100, or the roof is positioned non-parallel to the top 110 of the storage unit 100. In some embodiments, when the roof comprises a plurality of pieces, some pieces of the roof may be positioned parallel to the top 110 of the storage unit 100, and some pieces of the roof 124 is positioned non-parallel to the top 110 of the storage unit 100. The roof 124 as depicted in FIG. 1 comprises three substantially planar pieces angularly positioned relative to the top 110 of the storage unit 100, a first substantially planar piece 126, a second substantially planar piece 128, and a third substantially planar piece 130. As depicted in FIG. 1, a plurality of planar pieces are arranged so as to allow complete coverage of the top 110 of the storage unit 100.

The storage unit 100 may comprise one or several receptacle units each comprising a plurality of storage receptacles 132. Each storage receptacle 132 comprises a plurality of sides 134 and a door 136. The combination of the sides 134 and the door 136 defines a receiving volume configured to receive and hold a deposited item.

The storage receptacles 132 may comprise a variety of shapes and sizes. In some embodiments, the storage unit 100 comprises a plurality of storage receptacles 132 of different sizes. Thus, as depicted in FIG. 1, the storage unit 100 includes a first storage receptacle 132a, a second storage receptacle 132b that is smaller than the first storage receptacle 132a, and a third storage receptacle 132c that is larger than the first storage receptacle 132a.

In some embodiments, the door 136 of the storage receptacle 132 is dynamically connected to the storage unit 100. In some embodiments, the door 136 of the storage receptacle 132 is dynamically connected to the storage unit 100 so as to allow rotation of the door 136 relative to the storage unit 100, so as to allow sliding movement of the door 136 relative to the storage unit 100, or to allow any other desired movement of the door 136 relative to the storage unit 100.

Figure 1A:
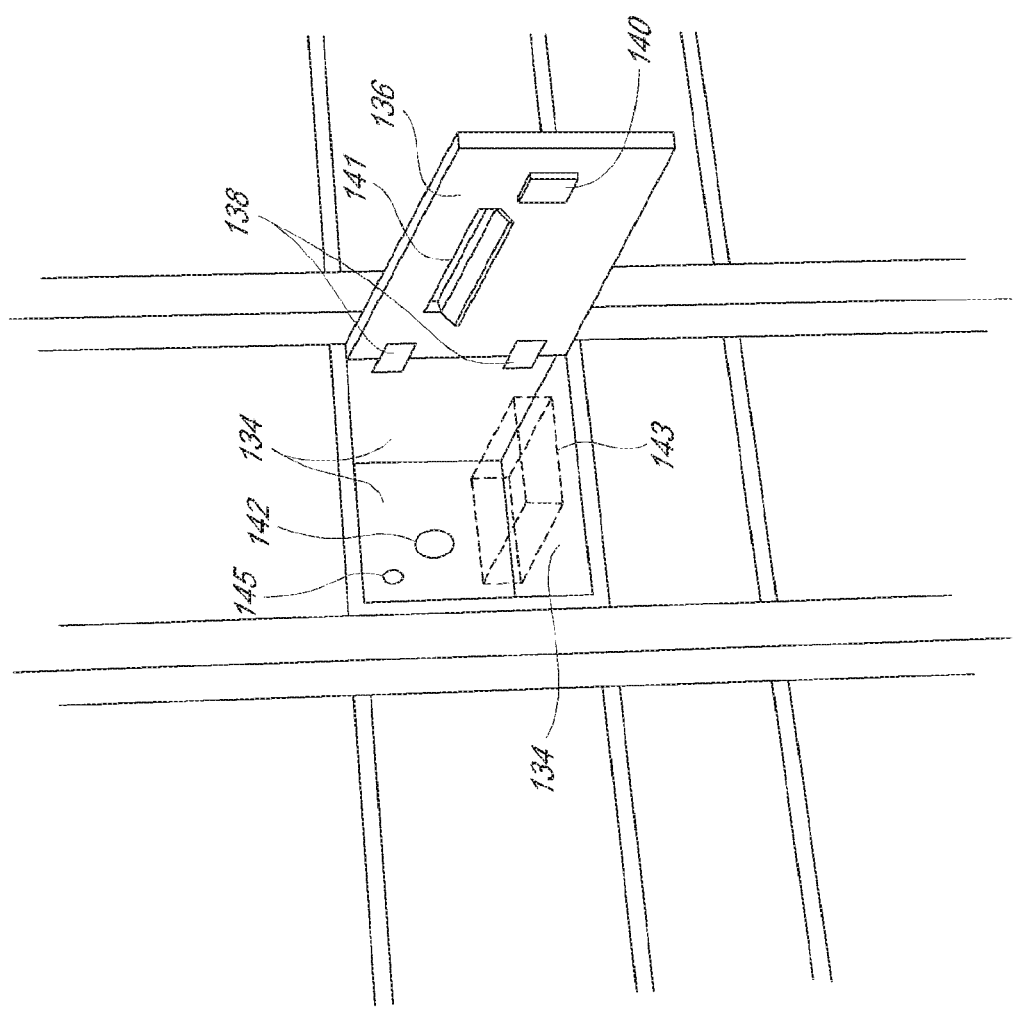
FIG. 1A depicts a perspective view of one embodiment of a storage receptacle that may be used with the storage unit of FIG. 1.

As depicted in FIG. 1A, in one embodiment, the door 136 of the storage receptacle 132 is rotationally connected to one of the walls 134 of the storage receptacle 132. In one specific embodiment, the door 136 of the storage receptacle 132 is rotationally connected to one of the walls 134 of the storage receptacle 132 via one or more hinges 138. As depicted in FIG. 1A, the connection of the door 136 to one of the walls of the storage receptacle 134 allow rotational displacement of the door 136 relative to the storage receptacle 134 and the storage unit 100.

In some embodiments, the storage receptacle 132 includes features configured to secure the door 136 of the storage receptacle. These features may include, for example, a lock, a latch, or any other securement feature. In some embodiments, the lock is one of a mechanical lock, an electrical lock, and magnetic lock, or any other type of lock. In some embodiments, the securement feature is electronically controlled, for example, by a control unit. For instance, an electronically controlled lock on the door 136 may be unlocked upon presentation of user access information 151 to an interface 150 on the control unit 144, as discussed in further detail herein.

The securement feature may interact with cooperating structures to secure and/or unsecure the door 136. The securement feature may be located in any desired position on the storage receptacle. FIG. 1A shows one embodiment of a location of a securement feature 140 on the door 136 of the storage receptacle 132. As depicted in FIG. 1A, the securement feature 140 located on the door 136 of the storage receptacle 132 cooperates with features of the walls 134 of the storage receptacle 132 to secure and/or unsecure the door. In some embodiments, the securement feature 140 may comprise a purpose built securement feature. In some embodiments, the securement feature may comprise a latching feature and a latch engagement and disengagement feature. The latching feature may be configured to obstruct movement of a locked item. In the case of a storage receptacle 132, the latch lockingly engages the door 136 of the storage receptacle 132 and obstructs movement of the door 136. In some embodiments, the latch engagement and disengagement feature may comprise components and/or a mechanism interacting together to selectively allow the engagement and/or disengagement of the latch. In some embodiments, the latch engagement and disengagement feature is a rotatable cylinder of a lock. In some embodiments, the latch engagement and disengagement feature may comprise an electrical actuator connected to the latch. Any of these and similar embodiments of the securement features may be controlled electronically by, for example, the control unit 144. Further, a person of skill in the art will recognize that the present disclosure is not limited to any specific form of locking or any specific locking mechanism, but broadly encompasses any lock or form of locking used in connection with the storage unit.

In some embodiments, the securement feature 140 is configured for remote operation. Specifically, in some embodiments, the securement feature 140 is controllable in response to received signals, such as, for example, electric, light, optical, radio, or any other signal. The received signals may come from the control 144 unit including a controller as is further described in more detail herein. In some embodiments, for example, the securement feature 140 is controllably and electronically disengaged in response to receipt of valid access information, which may be user access information 151, so as to allow access to the securement receptacle 132.

In some embodiments, the storage receptacles 132 may be configured with features to expedite recognition of an accessible storage receptacle 132. Thus, in some embodiments, the storage receptacle 132 may comprise one or several receptacle designating features that facilitate recognition of which of the several storage receptacles is accessible. In some embodiments, these receptacle features may include, for example, a feature configured to open the door 136 of the storage receptacle when the securement feature of the storage receptacle is disengaged such as, for example, a spring, a motor, or any other feature, a designator, such as, for example, a light, or any other desired feature.

In some embodiments, a storage receptacle includes a light 142. This light 142 may be any desired type of light emitting object, such as, for example, a light bulb, a LED, or any other light emitting object. In some embodiments, the operation of the light 142 changes based on the accessibility of any of the storage receptacles 132. Thus, if the light 142 is normally on, the light 142 may be turned off to indicate that the storage receptacle 132 is accessible. Similarly, if the light 142 is normally turned off, the light 142 may be turned on to indicate that the storage receptacle 132 is accessible. Similar techniques may be used with other indicators to designate which, if any, of the storage receptacles 132 are accessible. In some embodiments the light is located, for example, on one of the outside edges of the one of the walls 134 of the storage receptacle 136. In some embodiments, and as depicted in FIG. 1A, the light 142 is located along the outside edge of the wall 134 opposite the wall to which the hinges 138 are attached.

In some embodiments, light 142 may be disposed in the interior of storage receptacle 132. The light 142 is mounted on or within one of the walls 134 or the door 136 of the storage receptacle 132. As depicted in FIG. 1A, the light 142 is mounted on the wall 134 opposite the door 136 of the storage receptacle 132. The light 142 is configured for lighting when the storage receptacle 132 is accessible, and/or, when the door 136 of the storage receptacle 132 is opened, thereby linking the operation of the light 142 to the position of the door. Advantageously, the linking between the light 142 and the door 136 of the storage receptacle 132 allows lighting of the receiving area of the storage receptacle 132 when the door 136 of the storage receptacle 132 is opened, and thereby facilitate a user's ability to see the contents of the storage receptacle 132 when they are accessing the storage receptacle 132. In some embodiments, the light 142 may be used in connection with other features to allow easy identification of an accessible storage receptacle 132. Thus, in some embodiments, the light 142 is visible to a user when the storage receptacle is accessible.

In some embodiments the light 142 is disposed on an outer surface of the door 136, such that the light 142 is visible to a user standing in front of the storage unit 100. In some embodiments, the light is a receptacle designating feature. The light 142 may indicate which of the storage receptacles 132 is available or is activated for use.

In some embodiments the storage receptacle 132 further includes a feature configured to detect the position of the door 136, such as, for example, whether the door 136 is open or closed. In some embodiments, the door position detection feature comprises, for example, a sensor, a switch, or any other feature capable of detecting if the door 136 is open. In some embodiments, the door position detection feature is integrated into another feature of the storage receptacle, such as, for example, the securement feature 140, or a switch associated with the light 142.

The storage receptacle 132 further includes features configured to detect the presence or absence of an item within the receiving area of the storage receptacle 132. In some embodiments, the item detection feature configured to detect the presence or absence of an item within the receiving area of the storage receptacle 132 comprises, for example, a sensor 145. The sensor 145 may be a camera, or any other feature possessing the desired capabilities. The sensor 145 may be located on one of the walls 134 or on the door 136.

In one embodiment, for example, the sensor comprises for example, a load cell or a strain gauge configured to sense when a load is applied to the storage receptacle 132.

In some embodiments, the storage receptacle 132 may be configured to maintain climatic conditions within the storage receptacle 132. Specifically, in some embodiments, the storage receptacle may be configured to allow maintenance of a temperature and relative humidity level that are different than the levels of the area in which the storage unit 100 containing the storage receptacle 132 is placed. In some such embodiments, the storage receptacle 132 may be climate controlled by connection to an HVAC system and/or air humidifier and/or dehumidifier to facilitate the maintenance of desired climate conditions within the storage receptacle 132. Additionally, in some embodiments, the storage receptacle 132 is sealed and/or insulted to facilitate the maintenance of desired climatic conditions within the storage receptacle 132.

In some embodiments, the storage unit 100 is configured for receipt and/or collection of an item or items deposited by a customer for delivery. In some embodiments, these features may include, for example, a storage receptacle 132 comprising a mail slot 141, disposed in the door 136, to allow collection of envelopes, postcards, flats, or any other thin item. In some embodiments, these features may comprise a storage receptacle associated with a collection bin 143. The collection bin 143 may be located inside the storage receptacle such that items placed in the storage receptacle 132 are deposited in the collection bin.

In some embodiments, a storage receptacle module is modularly installed into a storage unit 100. In some embodiments, a storage receptacle module comprises one or several connected storage receptacles 132. Advantageously, a storage receptacle module may facilitate adaptation of a storage unit 100 to meet a range of customer needs. In some embodiments, for example, a first storage receptacle module may be removed from the storage unit 100 and replaced by a second storage receptacle module having storage receptacles 132 with different storage area dimensions. The dimensions of the storage receptacles 132 of the second storage receptacle module may be selected based on customer demand for specific sizes of storage receptacles 132 in a particular storage unit 100 depending on use patterns, specific customer requests, and the location of the storage unit 100.

To facilitate interchangeability, the varying storage receptacle modules may have identical mounting hardware and electrical connections such that each storage receptacle module provides electrical connection to the control unit 144.

Referring again to FIG. 1, some embodiments of a storage unit 100 further include a control unit 144. As more clearly depicted in FIG. 1B, the control unit 144 may include, for example, a control cabinet 146 with a front side 158 including, for instance, a plurality of storage receptacles 132, front doors 136 to the receptacles 132, an interface 150, and a rotating frame 115. Further, as shown in FIG. 1C, the control unit 144 may also comprise a screen 148, a printer 152, a payment feature 154, a security camera 155, and a service door 156 which may be on the front 158 and/or back 160 of the control cabinet 146.

Figure 1B:
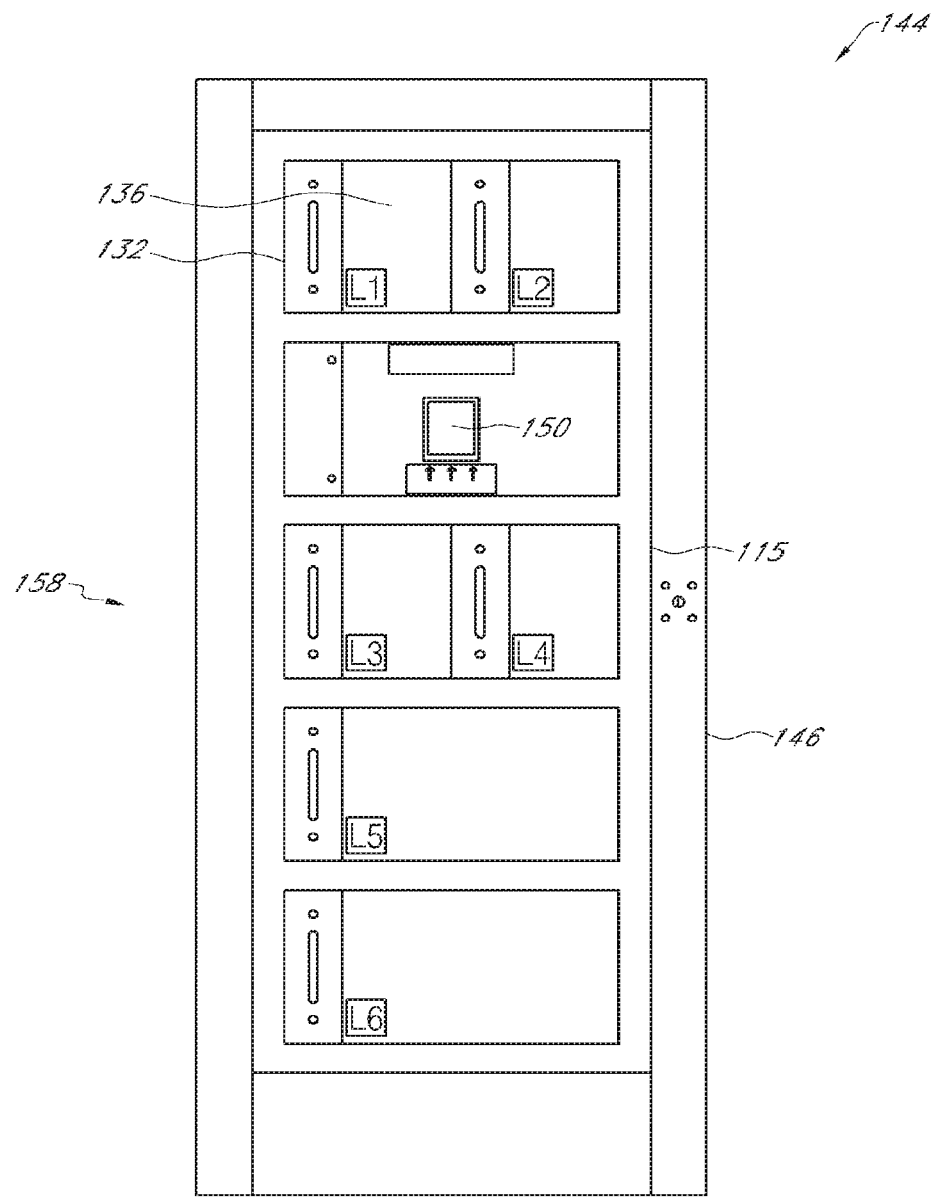
FIG. 1B depicts a front view of one embodiment of a control unit connected to storage receptacles that may be used with the storage unit of FIG. 1.
Figure 1C:
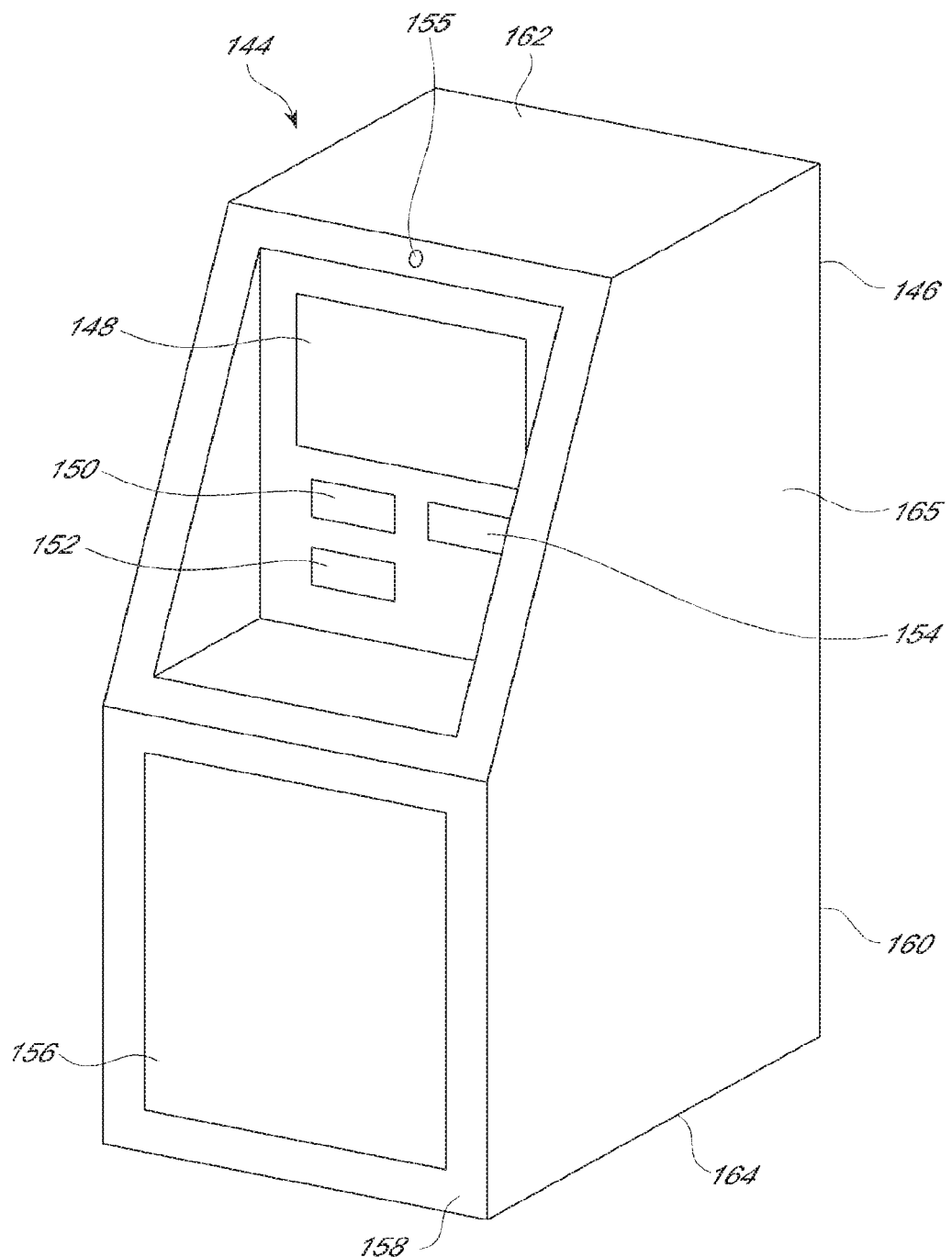
FIG. 1C depicts a perspective view of one embodiment of a control unit without storage receptacles that may be used with the storage unit of FIG. 1.

Referring to FIGS. 1B and 1C, in some embodiments, the control cabinet 146 of the control unit 144 is connected to the plurality of storage receptacles 132 of the storage unit 100. The control cabinet 146 has a front 158, back 160, top 162, bottom 164, first side (not shown), and second side 165. In some embodiments, the control cabinet 146 is integrally formed with portions of some of the plurality of storage receptacles 132 of the control unit 144. In some embodiments, the first side and the second side 165 of the control cabinet 146 is adjacent to and/or affixed to a plurality of the storage receptacles 132. For example, as shown in FIG. 1B, in some embodiments a number of storage receptacles 132 may be included with the control unit 144. The storage receptacles 132 may be in the same control cabinet 146 as the control unit 144. The receptacles 132 may also be in a control cabinet 146 separate from the control cabinet 146 of the control unit 144.

As further shown in FIG. 1B, in some embodiments the front 158 of the control unit 144 may include an interface 150, such as a scanner, reader, number pad, touch screen or other device, connection or feature for inputting information to the control unit 144. In some embodiments, the interface 150 may be an omni-directional reader. The interface 150 may be located on the front 158 of the control unit 144 as shown. The interface 150 may also be in other positions, such as the sides, top, or back 160 of the control unit 144. As shown, the interface 150 is mechanically and rigidly attached to the control unit 144. This attachment may be with screws, brackets, or any other mechanical materials suitable for attaching the interface 150. In some embodiments, the interface 150 may be flexibly attached to the control unit 144. For instance, the interface 150 may be attached by a flexible cord such that the interface 150 may be moved away from the control unit 144 when using it.

The interface 150 may comprise features configured to read a visual identifier including, for example, a text string, a computer readable code such as, for example, a barcode, a 1-D barcode, a 2-D barcode, a QR-code, an RFID tag, CODE39, CODE128, EAN128, I2OF5, 4STATE, POSTNET, or any other desired computer readable code, a biometric identification feature, a color pattern, an image, or any other visual identifier. A scanner may comprise a interface such as, for example, a barcode interface, a pen-type interface, a laser scanner, a CCD interface, a camera based interface, an omni-directional barcode scanner, or any other interface type. The interface 150 is configured to receive control signals and to transmit signals corresponding to information from the scanned item. In some embodiments, the interface 150 may comprise a near field communication (NFC) or Radio Frequency Identification (RFID) module. In this embodiment, the RFID module is Near Field Communication (NFC)-based and facilitates using a mobile device to provide information to the storage unit 100. A mobile device may also be used in some embodiments to provide the visual identifier, such as a QR code, to the scanner by positioning the mobile device a suitable distance from the scanner to allow it to read the visual identifier. In some embodiments, the scanner may be in other locations on the control unit 146. For example, the scanner may be on the back 160, on either side, or on the top 162 of the control unit.

The control cabinet 146 may comprise a variety of shapes and sizes, and may be made of a variety of materials. In some embodiments, the control cabinet 146 includes features and is made of materials to protect the contents of the control cabinet 146 from man-made and natural risks. In some embodiments the control cabinet 146 is configured to allow selective access to the contents of the control cabinet 146. In some embodiments, such configuration may advantageously allow the maintenance, repair, and general upkeep of the contents of the control cabinet 146. In some embodiments, access to the control cabinet 146 is provided through, for example, a service door 156 as shown in FIG. 1C.

In some embodiments, the control cabinet 146 includes, for example, a service door 156. The service door 156 is located, for example, on an exposed face of the control cabinet 146. In one embodiment, the service door 156 is located, for example, on the front 158 of the control cabinet 146. In addition, or instead, the service door 156 may be located on the back 160 of the control cabinet 146 and may comprise a plurality of doors or door segments, as is discussed in further detail herein.

The service door 156 is configured for movement between a first open position and a second closed position. In some embodiments, the service door 156 is connected with the control cabinet 146 so as to allow movement to and between the first open position and the second closed position. In some embodiments, the dynamic connection of the service door 156 to the control cabinet 146 is achieved, for example, through the use of hinges, clasps, lips, protrusion, engaging members, or a variety of other features. In some embodiments, these features may cooperate with corresponding features on the control cabinet 146 to secure the service door 156.

In some embodiments, the service door 156 further includes one or more locking mechanisms. The locking mechanism is configured to secure the service door 156 when the service door is in its second, closed position. The locking mechanism may comprise a variety of mechanisms, including, for example, a mechanical lock, an electric lock, a magnetic lock, or any other type of locking mechanism. In some embodiments, the lock is controlled via the control unit 144, with a key, or in any other desired fashion.

In some embodiments, the front 158—or, as is discussed in further detail herein, the back 160—of the control cabinet 146 is openable to reveal the internal components of the control cabinet 146. The front 158 of the control cabinet 146 may be attached to the control cabinet 146 via a hinge or a plurality of hinges. Thus, as the front 158 of the control cabinet 146 opens on the hinge or plurality of hinges, each of the components disposed on the front 158 of the control cabinet 146 moves with the front 158 of the control cabinet 146. In some embodiments, a lock or plurality of locks (not shown) is located on the front 158 of the control cabinet 146 configured to lock and secure the front 158 and prevent unauthorized access into the internal area of the control cabinet 146.

The control unit 144, as depicted in FIG. 1C, may include a screen 148. The screen 148 is configured to display information to a user. The screen 148 may comprise a CRT screen, a plasma screen, a LCD screen, or any other desired screen type. In some embodiments the screen 148 is paired with other output features configured to transmit information to a user, such as, for example, a speaker, a display, or any other information transmitting feature. In some embodiments the screen 148 has a touch-screen functionality. In some embodiments, the screen 148 is configured to receive an electronic signature from a user using a signature capture process. In some embodiments, the screen 148 is paired with an input feature configured to allow a user to input information and/or commands to the control unit 144. In some embodiments, the input feature may comprise, for example, a touch-screen, a keypad, a microphone, or any other user input device.

Figure 1D:
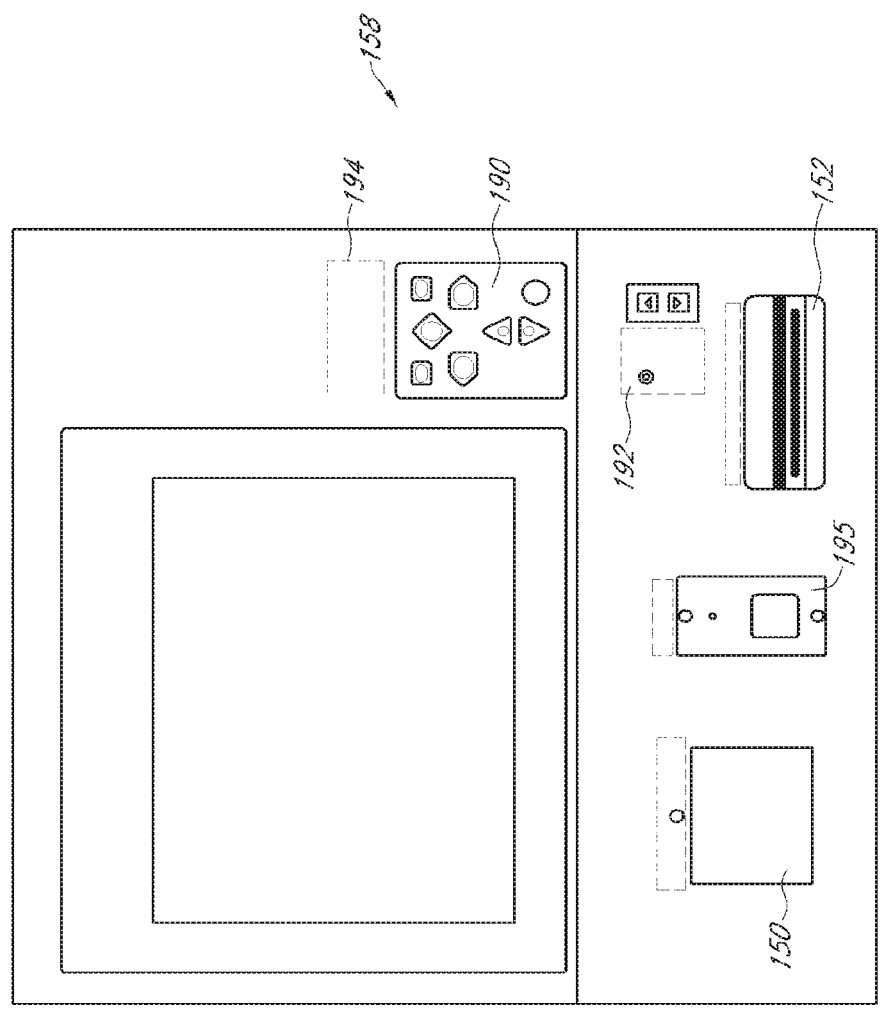
FIG. 1D depicts a front view of an embodiment of a control unit with various accessibility features that may be used with the storage unit of FIG. 1.

In some embodiments, and as shown in FIG. 1D, the control unit 144 may comprise additional features which increase user accessibility to using the control cabinet 146. For example, the control cabinet 146 may comprise an easy access keypad 190, a headset jack for TDD/TTY communication 192, braille labels 194, a near field communication module 195, a printer 152 for printing receipts and/or postage, and an audio system comprising external speakers (not shown). The keypad 190 may be used for entering user access information 151 to retrieve an item from a storage receptacle 132. In some embodiments, a receipt is generated for every transaction, which may be emailed or otherwise sent to the customer or user. In some embodiments, a customer or user can elect to receive a receipt, for example following a drop-off or deposit transaction, which may be printed by the printer 152 or have it digitally sent to them. The control unit 144 may further include an interface 150, as discussed in further detail herein, for example with respect to FIG. 1B.

Referring again to FIG. 1D, the front 158 of the control unit 144 may further comprise a printer 152. The printer is configured to print any desired items, including, for example, user access informations, text strings, images, computer readable codes, or any other desired item. In some embodiments, the printer 152 is configured to print labels, such as, for example, address labels, postage, description labels, computer-readable code labels, or any other desired label. The printer 152 is configured for printing in response to received control signals. In some embodiments printer 152 may be configured to print receipts. In various steps of the processes described herein, for example, upon payment of postage or insurance on a package, a printed receipt may be generated and provided to the user. A receipt may also be generated with confirmation of pick-up or delivery of an item.

The control unit 144 may further comprise a payment feature 154. The payment feature 154 is configured to receive payment from a user. The payment feature may comprise features configured to receive cash from a user, to conduct an electronic transaction with a user, including, for example, credit card, bank card, or any other form of electronic payment, or to conduct any other desired transaction with the user. The payment feature 154 may be configured to receive control signals and to transmit signals relating to the transaction. In some embodiments, the payment feature 154 may comprise a credit card interface such as, for example, the Dynamag Magnetic Stripe Credit Card Interface by Magtek. In some embodiments, the payment feature 154 comprises a near field communication (NFC) module, which facilitates payments using a mobile/digital wallet, a tablet computer, a smart phone, or other similar devices with NFC capability.

The control unit 144 may further comprise a camera 155. The camera 155 may be configured to provide photographic and/or video documentation of the users of the control panel. In some embodiments, the camera 155 is configured to capture and save all recorded images. In one embodiment, the camera 155, and associated picture memory, is configured to capture and record one or several images taken when a user enters, for example, their user identification or user password. In some embodiments, the camera 155 is configured to capture and record one or several images when a user confirms deposit of an item to the storage receptacle 132, or removal of an item from the storage receptacle 132. In some embodiments, the camera 155 may comprise a plurality of cameras located on different positions on the storage unit 100. These cameras are positioned and directed to provide complete camera coverage of the storage unit or desired parts thereof. Similar to camera 155, the images recorded by these cameras are constantly stored, or specific images are stored from these cameras. In some embodiments, a camera may be installed on the roof 124. The roof camera may be positioned such that the roof camera's field of vision encompasses the front of the storage unit 100, including the control cabinet 146 and the storage receptacles 132. This positioning of the roof camera allows for photographic and video monitoring of the storage receptacles themselves, including recording user's access to the storage receptacles. This may provide evidence that a pick-up or drop off occurred, or evidence of the identity of a user who picks up or drops off an item.

In some embodiments, the features of the storage unit 100 may be configured so as to allow identification of a user based on a driver's license or other government issued form of identification. Beneficially, this capability may allow the storage unit 100 to determine the identity of the user and the age of the user. In some embodiments, the picture of the owner of the government issued identification that is found on the identification may be compared with the image of the user taken at log-in. Facial recognition techniques may be used to determine if the user is the same person identified by the government issued identification. In some embodiments, the use of government issued identification to identify the user may allow non-registered users to use the storage unit to send and/or receive items. In some embodiments, the use of government issued identification to identify the user may allow non-registered users to register at the unit. In some embodiments, use of government issued identification to identify the user may be used to enable delivery of restricted delivery items which require that the person identified on the item is the only recipient of the item, and age-restricted items such as, for example, alcohol, tobacco, ammunition, weapons, medication, or any other age restricted items.

Figure 1E:
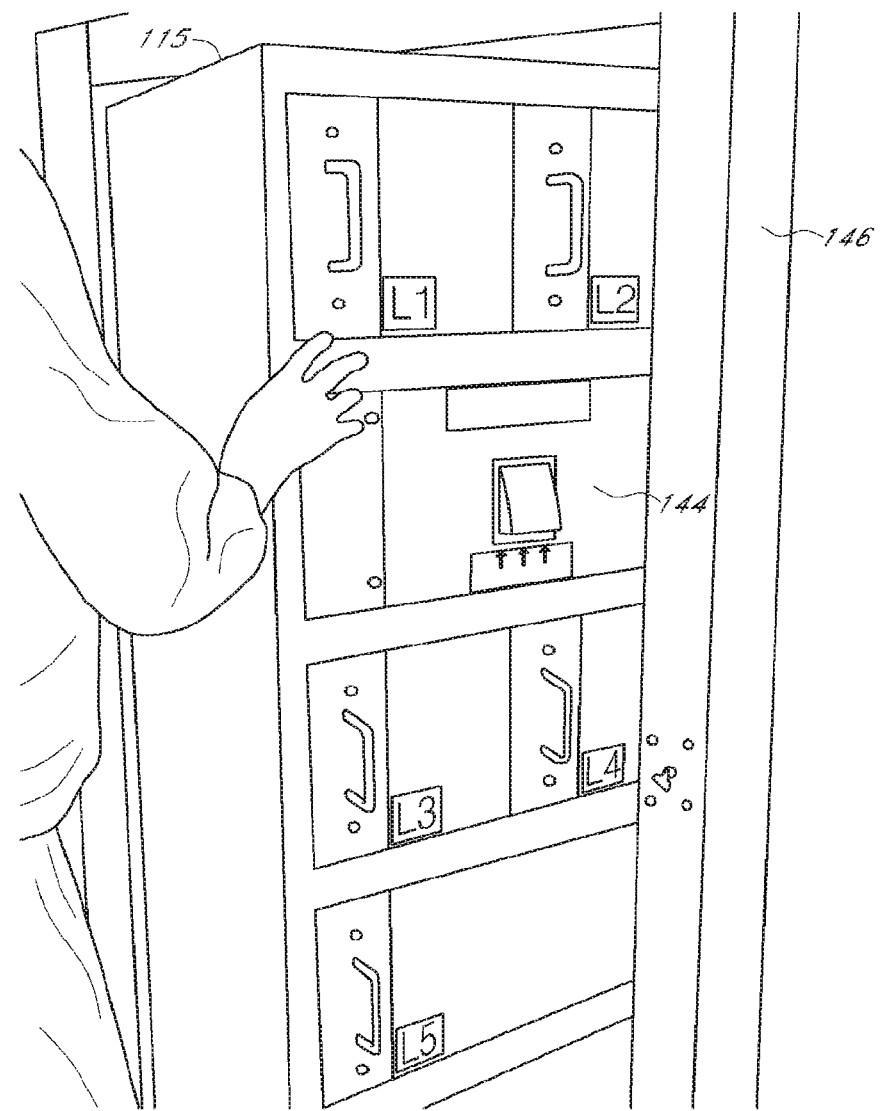
FIG. 1E depicts a perspective view of the control unit of FIG. 1B in a partially rotated configuration on a frame.

In some embodiments the control unit 144 comprises a rotatable frame 115. Referring to FIG. 1E, the frame 115 is shown in a partially rotated configuration. The frame 115 may rotate one hundred and eighty degrees or a full three hundred and sixty degrees, or any amount in between. The frame 115 may further be configured to rotate indefinitely such that more than three hundred and sixty degrees of rotation are possible. In some embodiments, the frame 115 may rotate about a vertical axis. In some embodiments, the frame may rotate about a horizontal or other axis with a different orientation.

In some embodiments, the control unit 144 may be attached to the frame such that the unit 144 will rotate with the frame 115. The unit 144 may be rigidly attached so that rotation of the frame 115 also rotates the unit 144 by a similar amount. Or, the unit 144 may be flexibly attached to the frame 115, such that rotation of the frame 115 rotates the unit 144 by more or less than the same amount as the frame 115. When the frame 115 rotates, it may also rotate any other structures or features coupled to the frame 115, such as the storage receptacles 132, the interface 150, and/or any other features discussed herein that may be associated with the control unit 144. In some embodiments, the frame 115 rotates within the storage cabinet 146. The cabinet 146 may be stationary while the frame 115 rotates relative to the cabinet 146. In some embodiments, the cabinet 146 may rotate with the frame 115, such that rotation of the frame 115 also rotates the cabinet 146.

Figure 1F:
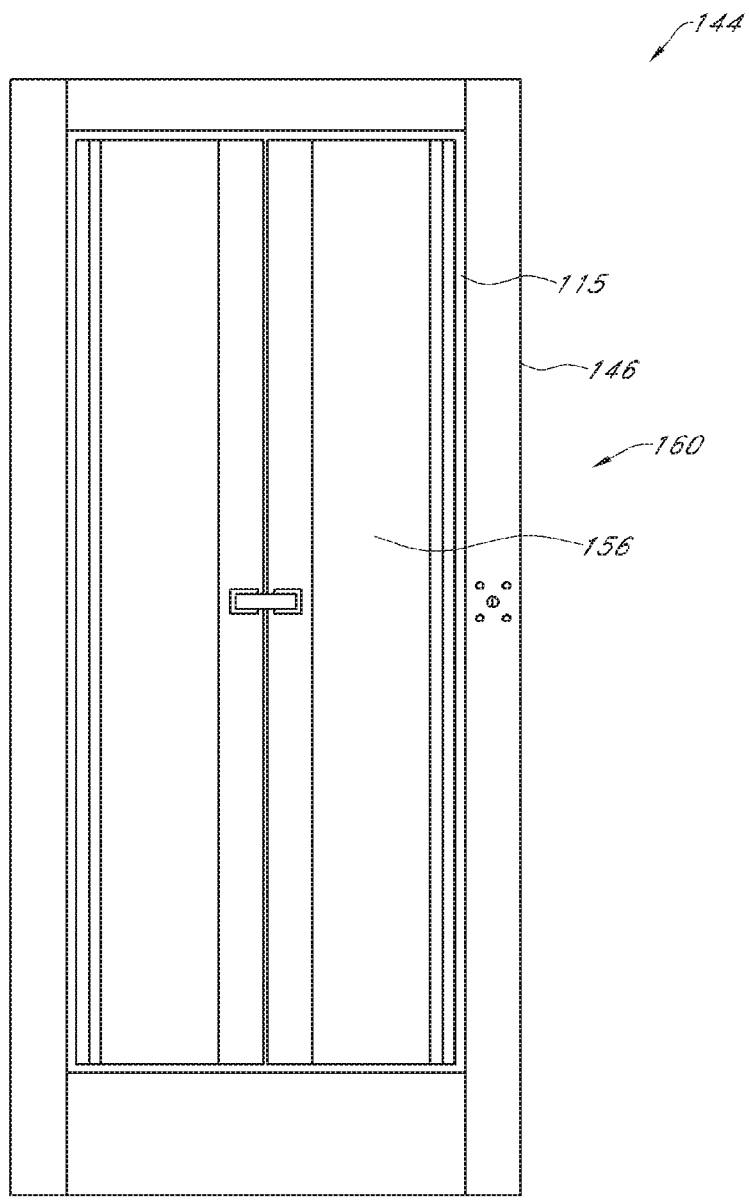
FIG. 1F depicts a back view of a closed back side of the control unit of FIG. 1B.

FIG. 1F depicts an embodiment of the control unit 144 after it has been rotated one hundred and eighty degrees. As shown, after such rotation, the back 160 may now be positioned where the front 158 was positioned before the rotation.

Figure 1G:
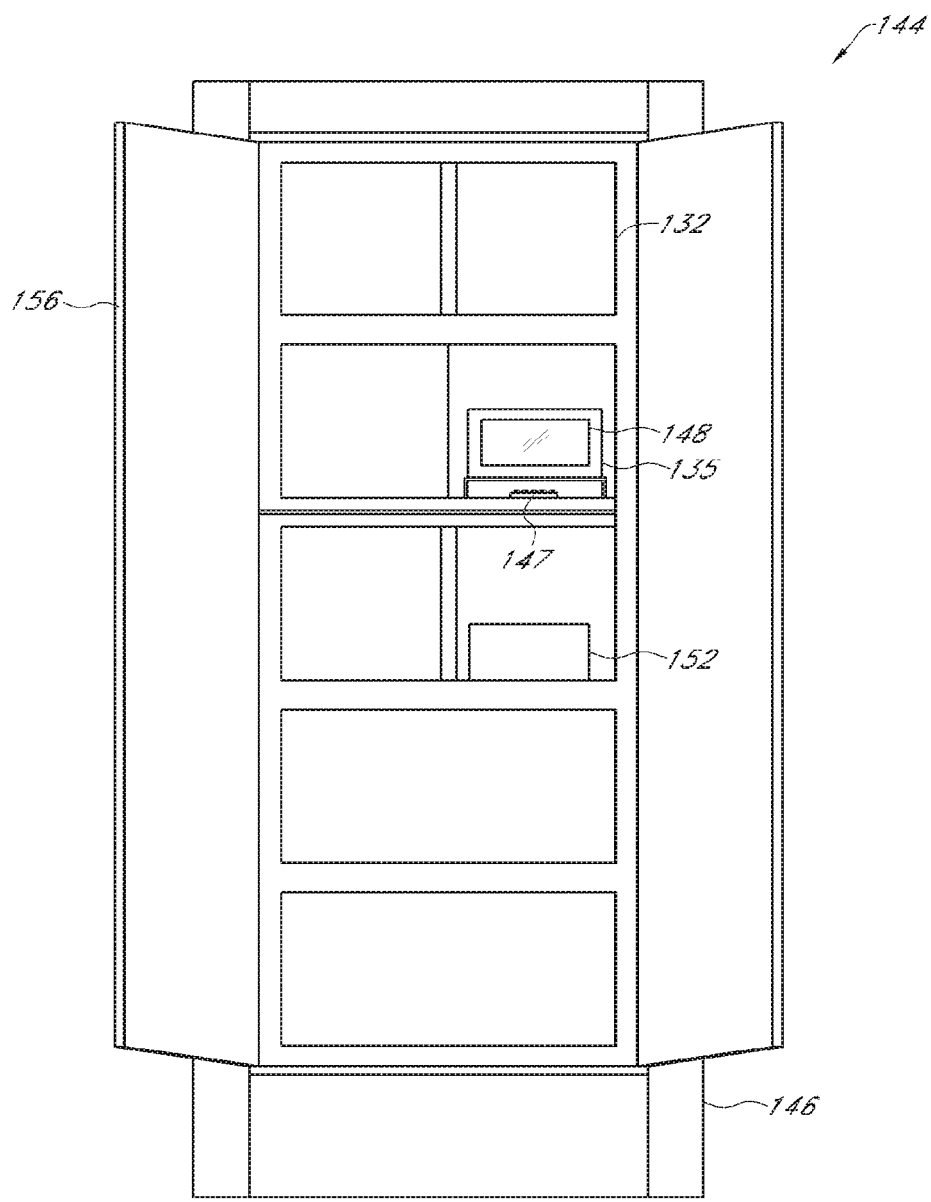
FIG. 1G depicts a back view of an open back side of the control unit of FIG. 1B.

In some embodiments, the back 160 of the control unit 144 may have a service door 156. This may be in addition to, or instead of, the service door 156 on the front 158 of the control unit 144. The service door 156 may provide access to the storage receptacles 132, as discussed in further detail herein. The service door 156 may include a lock. Further, the service door 156 may comprise a number of doors or door segments. For instance, the service door 156 shown in FIG. 1F comprises two doors, one on each of the left and right side of the back 160 in the orientation shown. The two doors of service door 156 may be hinged along the sides of the control unit 144. In some embodiments, the service door 156 opens up to reveal the inside of the control unit 144, as depicted in FIG. 1G. In some embodiments, the service doors may act as a security feature which precludes access from one storage receptacle to another by a customer.

Referring now to FIG. 1G, an embodiment of the control unit 144 with service door 156 open is shown. In some embodiments, the frame 115 may be rotated one hundred and eighty degrees and the service door 156 on the back 160 of the control unit may be opened to reveal the inside of the control unit 144. In some embodiments, opening the door 156 may reveal the rear of the storage receptacles 132. This may be used, for example, by a delivery agent to place parcels or other items in the receptacles 132. As shown, a number of receptacles 132 may be accessible in this manner. Further, access to the back 160 may provide access to a computer 135, a screen 148, an input device 147, a printer 152 and any other number of items that may be included in the control unit 144.

In some embodiments, the rear 160 may comprise a computer 135. The computer 135 may be configured to receive identifying information 157 corresponding to a recipient of the parcel. For example, the computer may receive information 157 identifying a storage receptacle 132 to be used by the recipient of a parcel. The information may further identify the recipient's name, cell phone number, home phone number, address, or other identifying information, such as the recipient's Post Office box number.

In some embodiments, the computer 135 may be configured to generate user access information 151. The user access information 151 provides access to one or more storage receptacles 132. The computer 135 may generate or otherwise produce the user access information 151 and store it in memory, deliver it to the recipient, and/or produce a receipt or ticket for the recipient of the parcel.

The computer 135 may be further configured to associate the identifying information 157 and user access information 151 with the at least one of the storage receptacles 132. For instance, the computer 135 may associate a selected receptacle 132 with the recipient's Post Office box and the user access information 151 such that when the computer 135 receives the user access information 151 the computer 135 associates it with the receptacle 132 containing the parcel. If the user access information 151 is printed on a receipt with a bar code, the receipt may be placed in the recipient's Post Office box. Then, the recipient may retrieve the receipt from the box and present it to the interface 150. The computer 135 may then receive the user access information 151 from the scanner and open or send a command to open the corresponding storage receptacle 132 containing the recipient's parcel. This is merely an illustrative example of how the computer 135 may associate certain embodiments of identifying information 157 and user access information 151 with the storage receptacle 132. Other configurations and variations of the system are within the scope of the present disclosure.

In some embodiments, the computer 135 is a laptop computer. It may also be any number of similar electronic devices, such as a desktop computer, a tablet, a mobile device, etc. The computer 135 may be integral with the control unit 144 or it may be added to it. For instance, a separate computer 135 may be placed in the control unit 144 such that it rests on a shelf accessible from the back 160 of the control unit 144.

The computer 135 may further be configured to electronically unlock the at least one of the storage receptacles 132 upon receiving the user access information 151. In some embodiments, the computer 135 is physically wired to locks that unlock the receptacles 132. In some embodiments, the computer is wirelessly connected to the locks. The computer 135 may itself directly command the locks to unlock or it may command an intermediate device in order to unlock the locks. For example, the computer 135 may send a command to a transmitter that communicates with the locks.

The control unit 144 may further comprise a screen 148. As discussed above, the screen 148 is configured to display information to a user. The screen 148 may comprise a CRT screen, a plasma screen, a LCD screen, or any other desired screen type. In some embodiments the screen 148 is paired with other output features configured to transmit information to a user, such as, for example, a speaker, a display, or any other information transmitting feature. In some embodiments the screen 148 has a touch-screen functionality. In some embodiments, the screen 148 is configured to receive an electronic signature from a user using a signature capture process. In some embodiments, the screen 148 is paired with an input feature configured to allow a user to input information and/or commands to the control unit 144. In some embodiments, the input feature may comprise, for example, a touch-screen, a keypad, a microphone, or any other user input device. Further embodiments of the screen are discussed below, for example, with reference to FIGS. 3A and 3B.

Referring to FIG. 1G, the control unit 144 may further comprise an input device 147. The input device 147 may provide a means for inputting information into the computer 135. The device 147 may be separate from the computer 135 or it may be integral with the computer 135. In some embodiments, the device 147 is a touch screen on the computer 135. In some embodiments, the device 147 is a scanner or other reader, for example a bar code scanner that can read a bar code, QR code, or other readable/scannable identifier that is on or otherwise associated with the item. In some embodiments, the input device 147 is a separate number pad. An input device 147 that is separate from the computer 135 may be located under the computer 135, as shown. It may also be located in any location of the control unit, including inside another storage receptacle, attached to a wall of the storage unit 144 or frame 115, or coupled with the service doors 156. In some embodiments, the input device 147 is entirely separate from the control unit 144. For example, the input device 147 may be a keyboard on a computer in an office, where the information typed in on the keyboard is communicated via a network to the computer in the control unit 144. In some embodiments, the input device 147 may communicate with the computer 135 through wired connection or it may communicate wirelessly, for instance, by RF or Bluetooth. The input device 147 may be used to input alphanumeric or other characters or symbols in order to input identifying or other information into the computer 135. An embodiment of the input device 147 is further discussed below, for example, with reference to FIG. 2.

Referring again to FIG. 1G, the control unit 144 is some embodiments comprises a printer 152. This printer 152 may be in addition to or instead of the printer 152 configured on the front 158 of the control unit 144, or this printer 152 may be the same printer 152 configured on the front 158 of the control unit 144. The printer 152 shown in FIG. 1G is accessible from the back 160. This printer 152 in some embodiments is configured to print user access information 151. In some embodiments, the printed user access information 151 is on a paper document, such as a receipt. This paper receipt may then be removed from the printer 151 and provided to the recipient of the item, for example it may be placed in the recipient's Post Office box. In some embodiments, the user access information 151 is a bar code on the receipt, as is discussed in further detail herein, for example, with respect to FIG. 4. In some embodiments, the computer 135 generates the user access information 151 and then the printer 152 prints the user access information 151. The printer 152 may print other information either on the same document as the user access information 151 or on a separate document. The printer 152 is capable of printing any relevant information as is readily appreciated by one having ordinary skill in the art, and such printers are contemplated as being within the scope of the present disclosure.

Further, as is discussed in further detail herein, the control unit 144 may, instead of or in addition to the printer, provide the user access information 151 to the recipient. In some embodiments, the control unit 144 provides the user access information 151 directly to a recipient, for example by sending it through a network to the recipient's email address or mobile device. In some embodiments, the printer 152 prints the user access information 151 to be provided to the recipient, and in addition the control unit 144 also provides the user access information 151 to the recipient, for example over a network as discussed. Many other variations of printing and/or sending the user access information 151 to a recipient that are not explicitly addressed here are within the scope of the present disclosure, some of which are further discussed in detail herein.

Figure 2:
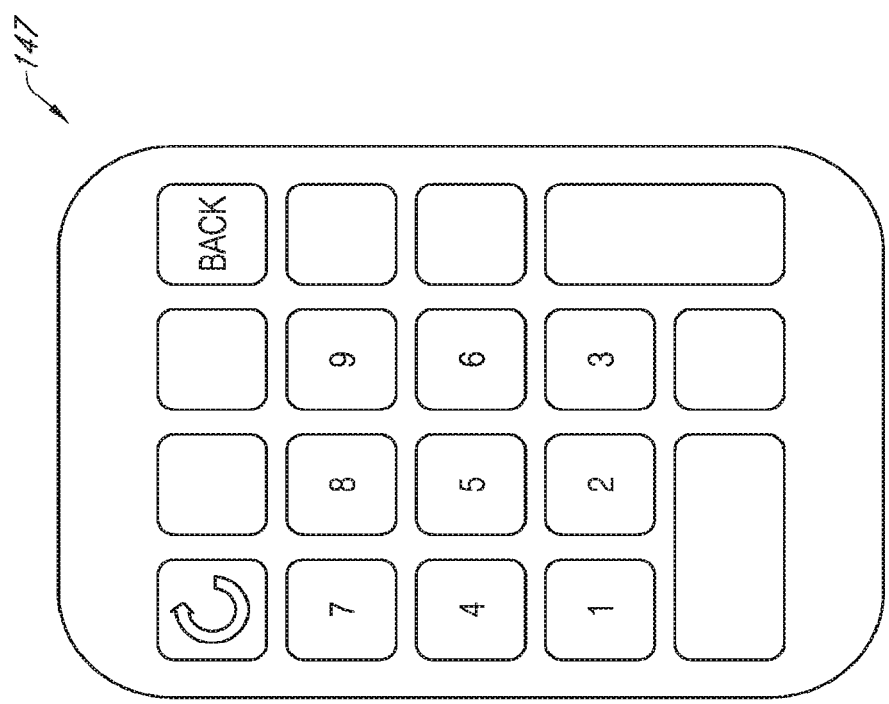
FIG. 2 depicts a perspective view of an embodiment of an input device that may be used with the storage unit of FIG. 1.

FIG. 2 depicts an embodiment of an input device 147. As shown, the device 147 may be a number pad containing numbers and various other keys for controlling, entering, or otherwise communicating with the computer 135. The keys of the device 147 may include more or less than those typically on a conventional keyboard and they may be sized such that a typical finger may press one key at a time. Further, the layout of the keys may be similar to or different from conventional keyboards or number pads. Other configurations of the number pad and keys are possible and are within the scope of the present disclosure. As discussed, the input device 147 may be located within the control unit 144 or it may be separate from the control unit 144, for example in a delivery agent's vehicle or office. In such case, a storage receptacle 132 may be reserved without having to physically be at the control unit 144. Then, the parcel may later be delivered to the receptacle 132 knowing that the receptacle 132 will be available. Other configurations and corresponding uses of the various devices of the system are contemplated and are within the scope of the present disclosure.

Figure 3A:
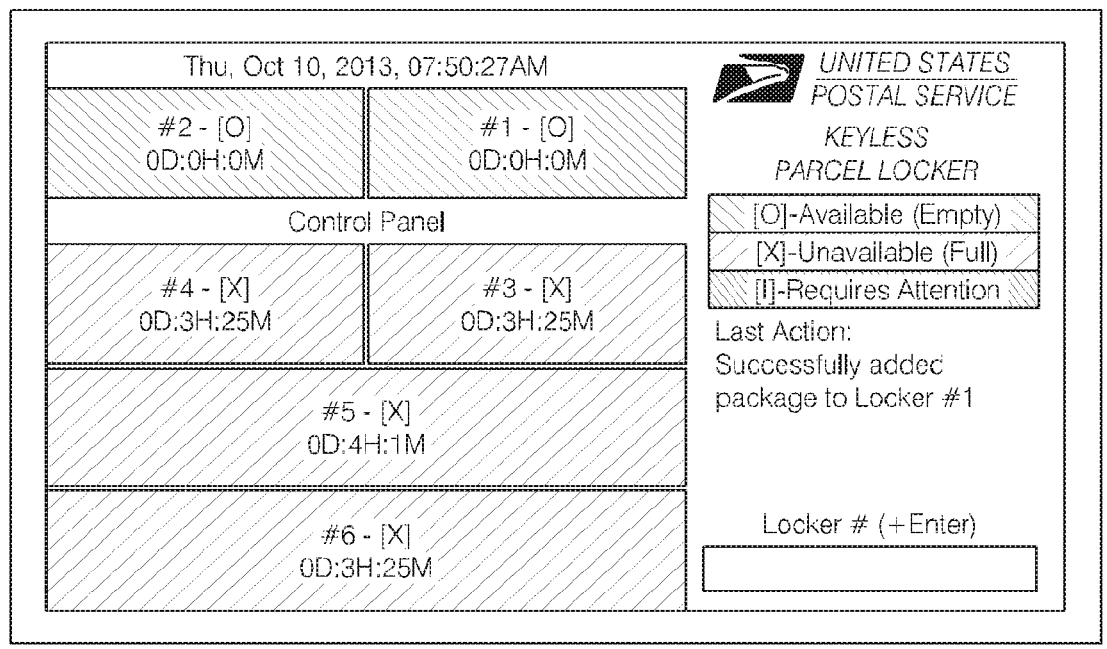
FIGS. 3A-3C depict front views of embodiments of a display screen that may be used with the storage unit of FIG. 1.
Figure 3B:
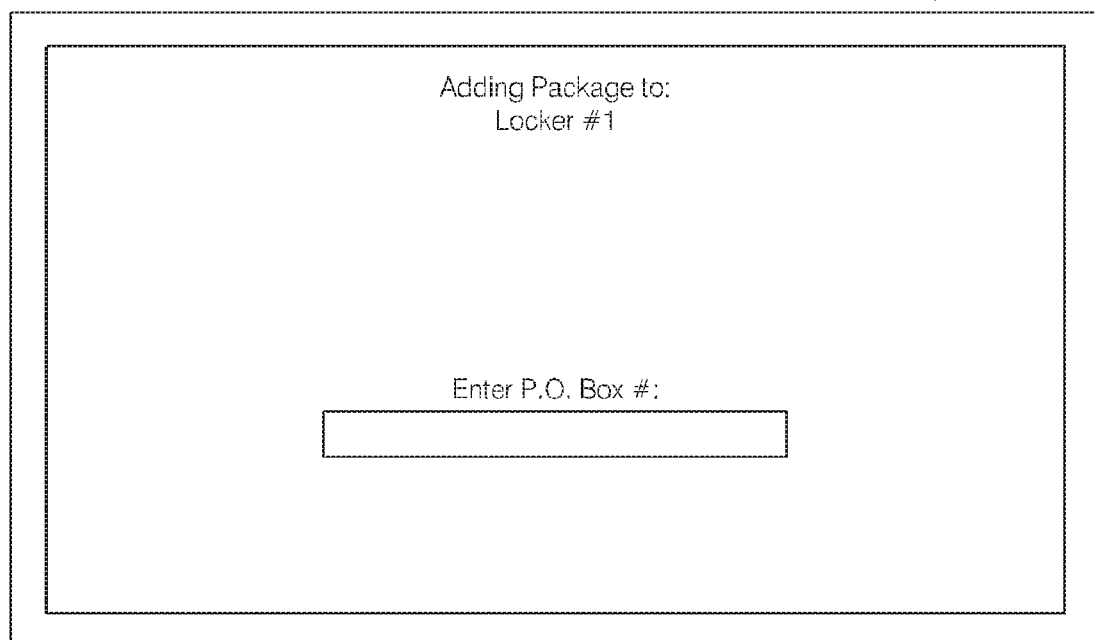
Figure 3C:

FIGS. 3A-3C depict embodiments of the screen 148 that may be displayed in the context of the United States Postal Service. A person of skill in the art will recognize that the present disclosure is not limited to embodiments with the United States Postal Service. The screen 148 may be at the back 160 of the control unit 144, for example coupled to a computer 135, or it may be separate from the control unit 144, for example on a computer 135 in an office or home. The screen 148 may provide information about available storage receptacles 132 and allow for selection of one or more receptacles 132. The screen may be displayed in color-coded fashion or any other manner to convey the status of the availability of the receptacles 132. The screen may display information relating to the availability of receptacles 132 that are associated with one or more control units 144. For instance, the screen 148 may display information related to a control unit in which the screen 148 is located or to a different, separate control unit. Such information may include, for example, which receptacles 132 are available, the identity of the last action completed, an input box for selecting or identifying a receptacle 132, the time and date, an input box for identification of a recipient's delivery information such as Post Office box, and/or any other information. It may also display possible actions or options for using the control unit 144, such as shown in FIG. 3C, including but not limited to removal of a package, entering a new user, or deleting a user.

Figure 4:
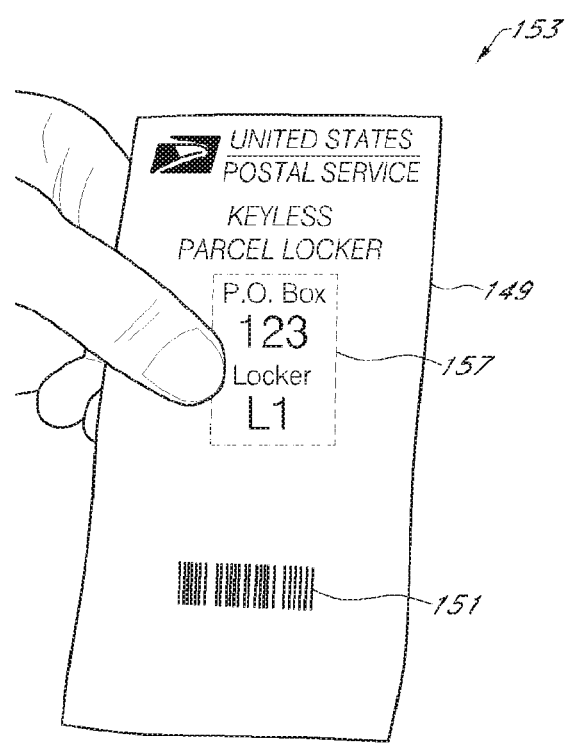
FIG. 4 depicts a front view of an embodiment of a notice comprising user access information as a bar code that may be used with the storage unit of FIG. 1.

Turning to FIG. 4, an embodiment of notice information 153 is depicted. As shown, the notice information 153 contains user access information 151 as a bar code printed on a receipt 149. As discussed, this receipt 149 may be printed by the printer 152 configured with the control unit 144. The receipt 149 may also be printed by any printer, for example by a user of the system who prints the receipt on a printer at home or the office. In some embodiments, the user access information 151 is provided as access information on a mobile device, such as a cell phone or tablet, for example by email or on a website. In such cases, the mobile device may be presented to the control unit 144, for example by having an interface 150 scan the access information. Access information, discussed in further detail herein for example with respect to FIGS. 12A-13B, may be information provided to the interface 150 to gain access to the receptacle 132. Therefore, access information may thus be the same as the user access information 151. In some embodiments, the user access information 151 is therefore information entered into or otherwise provided to the interface 150. For example, the user access information 151 may be a PIN that a user enters into a number pad or touch screen. The user access information 151 may also be a series of numbers and/or letters entered into the interface 150 as access information. The user access information 151 may therefore not be printed on the notice information 153 that is given to a recipient. In some embodiments, a recipient is already aware of the user access information 151, such as a PIN. Therefore, in some embodiments, notice information 153 contains information about the item and/or storage system but does not include the access information.

The receipt shown in FIG. 4 comprises user access information 151 configured as a bar code. In some embodiments, the bar code is a conventional bar code similar to those on items at a grocery store. In other embodiments, the bar code may be a different type of bar code. In some embodiments, the bar code is a QR code. The QR code may comprise a square pattern recognizable by the interface 150. In some embodiments, the bar code is a different, unconventional code that is recognizable by the scanner 151.

In some embodiments, the receipt 149 includes information 157 identifying the storage receptacle and/or the recipient. As shown in FIG. 4, the information 157 includes a Post Office ("P.O.") box number corresponding to the recipient of the item. P.O. boxes are used here as exemplary embodiments only, and the scope of this disclosure is not limited thereto. The information 157 shown also includes the storage receptacle 132 in which the item is intended to be stored and retrieved. As depicted, the information 157 recites the recipient's delivery information as "P.O. Box 123" and the corresponding storage receptacle 132 as "Locker L1." Other configurations of the receipt 149 with user access information 151 and information 157 are possible. In some embodiments, the user access information 151 is at the bottom of the receipt 149 and the information 157 is at the top. Any other configurations are possible, for example with the locations reversed or with the user access information 151 on the opposite side of the receipt 149 as the information 157, and are within the scope of the present disclosure. Further, an user access information 151 that is sent electronically to a recipient, for instance by email or by text message, may also be configured in a similar manner as that shown in FIG. 4 or in any other configuration.

Figure 5:
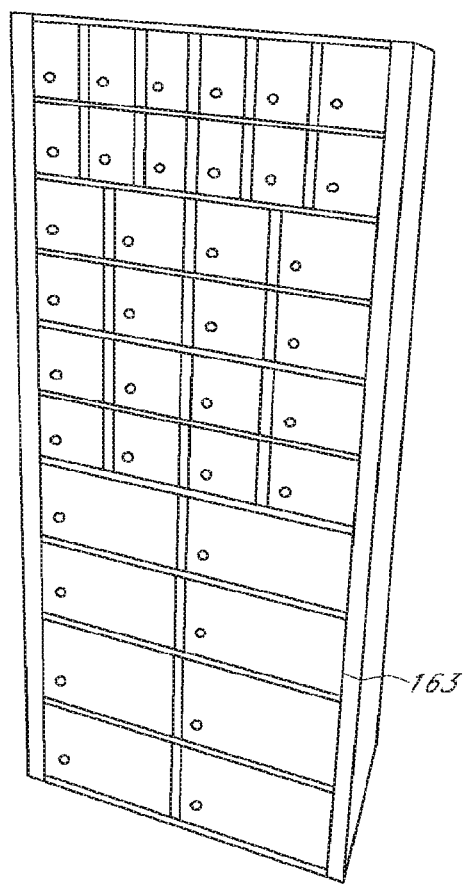
FIG. 5 depicts a front view of an embodiment of customer postal boxes that may be used with the storage unit of FIG. 1.

FIG. 5 depicts an embodiment of conventional Post Office boxes 163. The boxes 163 may receive the user access information 151, for example on the receipt 149. A user, such as the recipient, may then retrieve the user access information 151 from their box 163 and use the code 151 to open a storage receptacle 132 via the control unit 144. The boxes 163 may be separate, as shown, from the control unit 144 or they may be integral with the control unit 144. In some embodiments, the boxes 163 are contained in the control cabinet 146 and/or with the frame 115. In some embodiments, the boxes 163 are conventional P.O. boxes located at a Post Office or other location containing P.O. boxes. Other configurations not explicitly addressed here are possible and are within the scope of the present disclosure.

Figure 6:
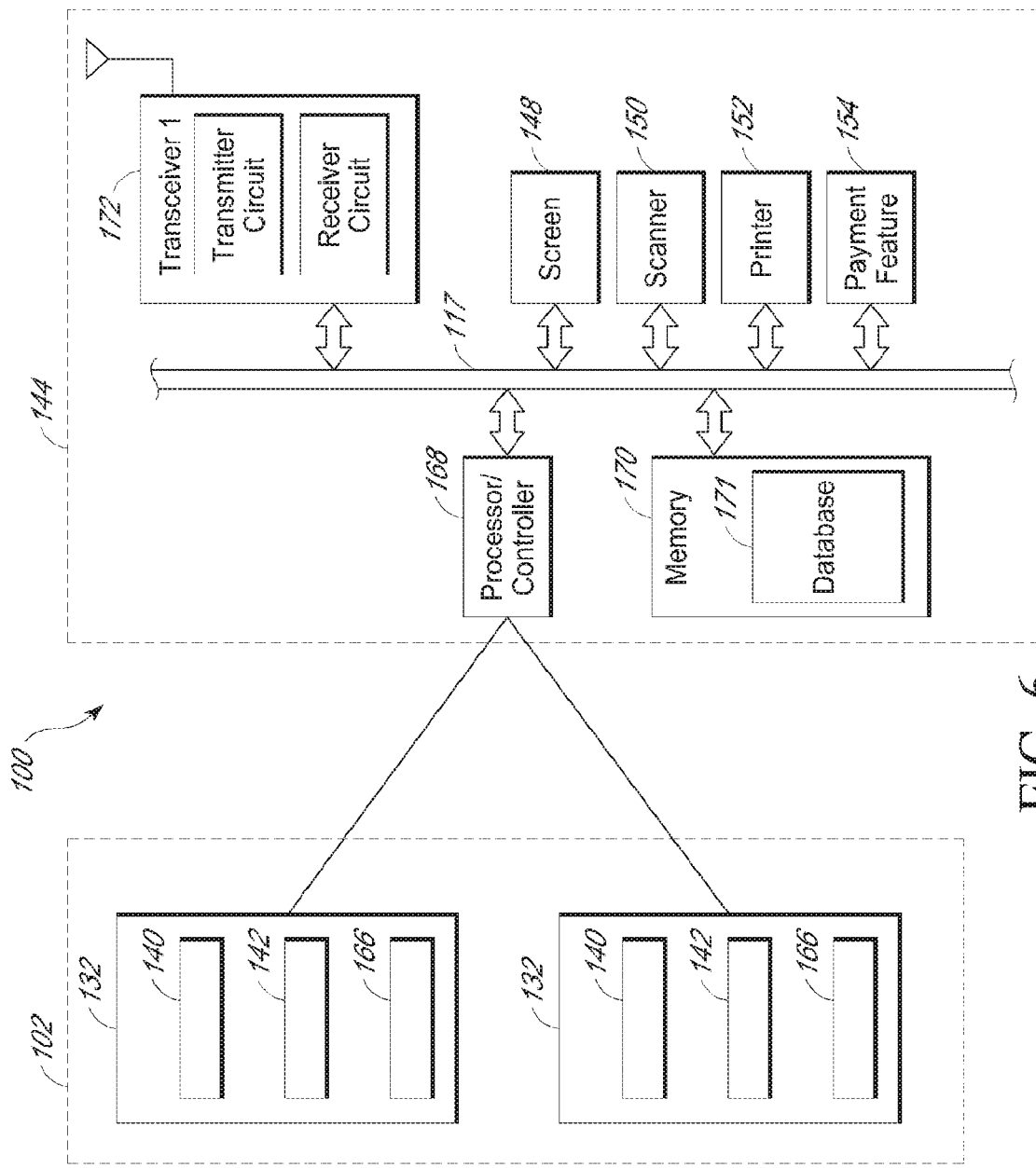
FIG. 6 depicts a schematic illustration of embodiments of communicating interactions within a storage unit having a receptacle unit and a control unit.

The various features of the storage receptacles 132 and the control unit 144 may communicatingly interact. FIG. 6 depicts a schematic illustration showing one exemplary embodiment of the communicating interactions within the storage unit 100.

The storage unit 100 shown in FIG. 6 includes a receptacle unit 102 and a control unit 144. The receptacle unit 102 may comprise a plurality of storage receptacles 132. The receptacle unit 102 depicted in FIG. 6 comprises two storage receptacles 132. The storage receptacles 132 each comprise a plurality of features that may include, for example, securement feature 140, light 142, receptacle designating feature 166, and/or any other desired features, such as, for example, an interior light, a door position detection feature, and/or an item detection feature.

The control unit 144 may comprise a variety of features performing a variety of functions. In some embodiments, and as depicted in FIG. 6, the control unit 144 comprises, for example, a processor 168, memory 170, a communication feature 172, a screen 148, an interface 150, a printer 152, and a payment feature 154. The control unit 144 may further include a central bus 117 linking the several features together.

The processor 168 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processor 168 may comprise, for example, a microprocessor, such as a Pentium® processor, a Pentium® Pro processor, a 8051 processor, a MIPS® processor, a Power PC® processor, an Alpha® processor, or the like. The processor 168 typically has conventional address lines, conventional data lines, and one or more conventional control lines.

The processor 168 is in communicating connection with memory 170. The memory 170 may include, for example, RAM memory, flash memory, ROM memory, EPROM memory, EEPROM memory, registers, hard disk, a removable disk, a CD-ROM, or any other form of storage medium known in the art. The memory may include, for example, software, at least one software module, instructions, steps of an algorithm, or any other information. In some embodiments, the processor 168 performs processes in accordance with instruction stored in the memory 170. These processes may include, for example, controlling features and/or components of the receptacle unit 102, controlling features and/or components of the storage receptacle 132, controlling features and/or components of the control unit 144, requesting information from features and/or components of the storage receptacle 132, requesting information from features and/or components of the receptacle unit 102, requesting information from features and/or components of the control unit 144, transmitting instruction and/or control signals to the features and/or components of the storage receptacle 132, transmitting instruction and/or control signals to the features and/or components of the receptacle unit 102, transmitting instructions and/or control signals to features and/or components of the control unit, requesting information from the user, transmitting information to the user, processing information received from features and/or components of the storage receptacle 132 and/or of the receptacle unit 102 and/or of the control unit 144, processing information received from the user, and/or any other desired processes.

In some embodiments, memory 170 comprises one or more databases 171. In one embodiment, the database may contain registered user identification information, including, for example, the user identification and user password for registered users, storage receptacle information, including whether a storage receptacle 132 is available, and the location, item identification, and recipient identification of items stored in the storage unit 100.

In some embodiments, the processor 168 is in communicating connection with a communication feature 172. The communication feature 172 is configured for wired, and/or wireless, communication. In some embodiments, the communication feature 172 communicates via telephone, cable, fiber-optic, or any other wired communication network. In some embodiments, the communication feature 172 may communicate via cellular networks, WLAN networks, or any other wireless network. The communication feature 172 is configured to receive instructions and to transmit and receive information. This information may relate to, for example, the identifying information 157, the user access information 151, commands for locking and/or unlocking a storage receptacle 132, required maintenance of the storage unit 100, availability of storage receptacles 132 in the storage unit 100, status of items in the storage receptacles 132, such as, for example, whether an item is awaiting retrieval, transaction information, and/or any other desired information. In some embodiments, the communication feature 172 communicates via a wired or wireless communication network with one or more network services (e.g., web services) on one or more network servers (not shown). For example, some of the functionality described with respect to the control unit and other functionality as described further below may be performed by a remote network service, remote from the control unit 144. The control unit 144 may communicate via the communication feature 172 with the remote network service to exchange data and provide the interactivity necessary with a user of the storage unit 100 or a recipient of an item. In one embodiment, the network service may be cloud service that may include processors, memory, and the like as described above. In one embodiment, the network service may include NFC modules configured to communicate information from mobile devices, such as smart phones, as described above. In some embodiments, the communication feature 172 may communicate the user access information 151 to a recipient of an item. For instance, user access information 151 may be transmitted to a recipient's email address or mobile device. In some embodiments, a user may provide the user access information 151 as access information and the communication feature 172 may receive and/or transmit the access information to provide access to the storage receptacle 132 containing the item. For instance, a user may scan the user access information 151 using the interface 150 and the communication feature 172 may then receive the code 151 and then transmit the code 151 to the processor 168 which then transmits an unlock command to unlock the storage receptacle 132.

As depicted in FIG. 6, the processor 168 is in communicating connection with the screen 148. In some embodiments, the processor 168 is configured to transmit control signals to the screen 148 to control the transmission of information to the user, and to receive signals corresponding to user inputs from the screen 148.

The processor 168 is further in communicating connection with each of the interface 150, the printer 152, and the payment feature 154. The processor 168 is configured to transmit control signals to the interface 150 and to receive information relating to a scanned item from the interface 150, to transmit control signals to the printer 152 corresponding to, for example, to instructions to print a label, and to transmit control signals to the payment feature 154 and receive information relating to the transaction from the payment feature 154.

In some embodiments, and as depicted in FIG. 6, the processor 168 communicates via a communication link with some or all of the storage receptacles 132 for sending control signals to the storage receptacles 132. In some embodiments, the communication with some or all of the storage receptacles 132 may comprise sending control signals to control the features of each of the storage receptacles 132, including, for example, the securement feature 140, and the light 142. In some embodiments, the processor 168 is configured to send control signals to the securement feature 140 to secure and/or to unsecure the door 136 of the storage receptacle 132, and to receive signals from the securement feature 140 relating to the securement status of the securement feature 140, such as, whether the securement feature 140 is securing the storage receptacle 132.

In some embodiments, the processor 168 is configured to send control signals to the light 142. In some embodiments, these control signals correspond to turning the light 142 on, or to shutting the light 142 off. In some embodiments, the processor 168 is configured to send control signals to the sensor 145, or the climate control equipment.

In some embodiments, the processor 168 is configured to send control signals to the receptacle designating feature 166 or the light 142. These signals may correspond to activating the receptacle designating feature 166 or the light 142 when the associated storage receptacle 132 is unsecured, and to de-activating the receptacle designating feature 166 or the light 142 when the associated storage receptacle has been re-secured.

In some embodiments, an address is provided for the storage unit 100. This address may be a text string, standard address comprising a street and a number, or a modified address that may identify the storage unit 100 without reference to a standard address. In some embodiments, this modified address may comprise a unique number, the zipcode in which the storage unit 100 is located and a unique number. In some embodiments, each of the storage receptacles 132 may comprise a unique address. This address may be the same as the address for the storage unit 100, plus additional digits to allow unique identification of the storage receptacle 132. In some further embodiments, and using similar principals, users, such as customers, registered for use of the storage unit may be assigned a storage unit address. This address may be tied to a preferred storage unit, such that the user's address is the address of the storage unit 100 plus additional text, or may be independent of any storage unit. In some embodiments, this storage unit address may allow deliveries addressed, not to the recipient, but to the recipient's storage unit address. Advantageously, such addressing may prevent the originator of the item from knowing the identity and physical address of the recipient.

In some embodiments, the address may be utilized by a user associated with a social media network. For example, the address may be assigned to a user of a social network site, such as Facebook, or Twitter, or a dating service, and may facilitate physical delivery of items to the social media user, while maintaining anonymity of the social media user. In some embodiments, the address may facilitate the physical exchange of items between more than one user of a social media network. In some embodiments, the address may be assigned to a user who buys from vendors who cater or sell to users of social media networks. This mechanism allows for vendors or businesses to interact and deliver items through social media while maintaining the anonymity of the users who buy from such vendors or businesses.

A person of skill in the art will recognize that the processor 168 is configured for communicating interaction with other features of the receptacle unit 102 and/or of the control unit 144. Further the memory 170 of the control unit 144 may comprise a variety of instructions configured for different item delivery scenarios.

Figure 7A:
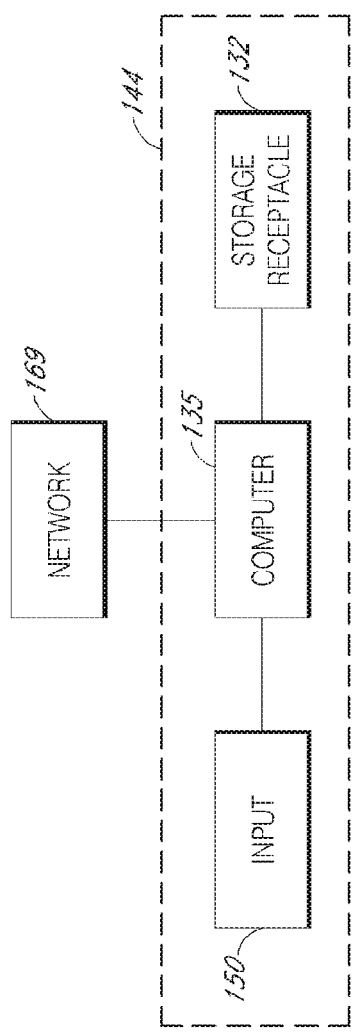
FIGS. 7A-7C depict block diagrams of different embodiments of a control unit.

FIG. 7A depicts another schematic illustration showing an exemplary embodiment of the communicating connections related to various features of a control unit 144 that may be within a storage unit 100. As shown, the computer 135 may connect to and interact with the interface 150, the storage receptacle 132 and/or a network 169. In some embodiments, a user scans the user access information 151 using the interface 150. The interface 150 then transmits the scanned code 151 to the computer 135. The computer 135 then interacts with the storage receptacle 132. If the code 151 corresponds to the storage receptacle 132, then the computer 135 sends a command, either directly or indirectly, to open the storage receptacle 132. If direct, the computer 135 sends the command directly to the receptacle 132. In some embodiments, the computer 135 may send the command to an intermediate device, such as a microprocessor on the securement feature of the receptacle 132, which then commands the receptacle 132 to open or close. As used herein, "open" may refer to physically opening the receptacle 132, to unlocking the receptacle 132, or otherwise unsecuring the receptacle 132. Similarly, "closing" may refer to physically closing the receptacle 132, to locking the receptacle 132, or otherwise securing the receptacle 132.

In some embodiments, the computer 135 may interact with a network 169. The interaction with the network 169 may be a wired or wireless connection. The network 169 provides interaction with other computing devices and methods. For instance, the network 169 may be an external network 169 such as the internet, cloud or cloud computing network, or world wide web, or it may be a virtual private network (VPN) interacting with other storage units 100 or with one or more databases. The network 169 may further be any of the other network embodiments described herein. In some embodiments, the features of the control unit 144 shown may be separate from the storage unit 100. For instance, the control unit 144 may comprise the interface 150, the computer 135 and the storage receptacle 132, while the network 169 is separate from the control unit 144.

While the interactions shown in FIG. 7A are direct connections and interactions, the connections and/or interactions may also be indirect, as mentioned. For instance, there may be intermediate devices that interact between the computer 135 and the interface 150, the storage receptacle 132, and the network 169. Further, any component shown in FIG. 7A may also refer to a subcomponent of the component. For instance, the computer 135 may also be a processor within the computer 135. Similarly, the interface 150 may refer to an interface or to a processor within the interface 150.

Figure 7B:
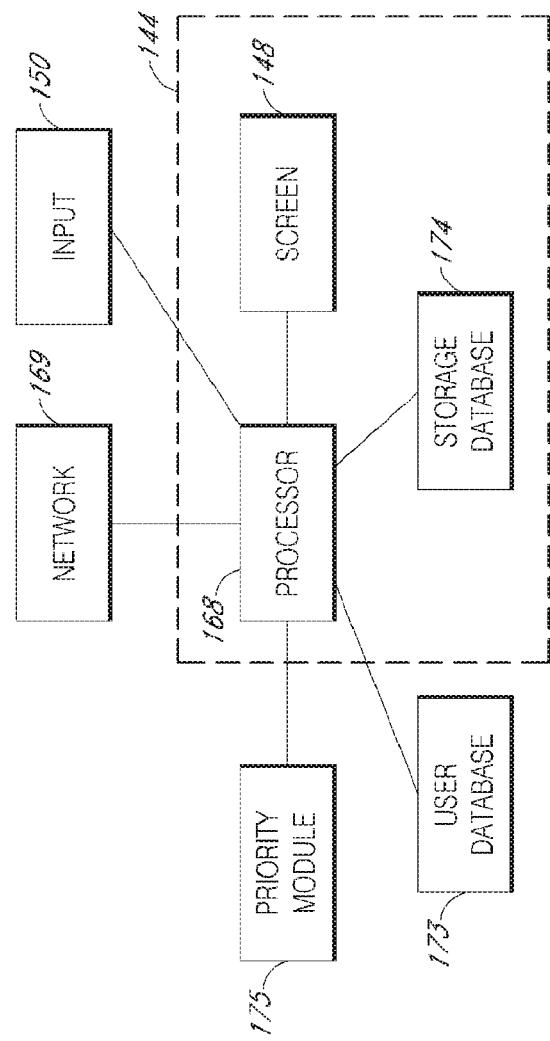

FIG. 7B depicts another schematic illustration showing an exemplary embodiment of the communicating interactions related to various features of a control unit 144 that may be within a storage unit 100. As shown, the control unit 144 may comprise the processor 168, the interface 150, such as a scanner, and the screen 148, while the remaining components shown may be separate from the control unit 144. In some embodiments, more or fewer components may be part of the control unit 144. For instance, the control unit 144 may comprise just the processor 168 and the interface 150, while the remaining components are separate from the control unit 144. In an implementation, a user may provide the user access information 151 to the interface 150, such as a scanner, and the processor 168 may then communicate with a separate network 169 or a device thereon that controls the storage receptacles 132. Other variations and configurations of the control unit 144 are possible and are within the scope of the present disclosure.

In some embodiments, the features of the control unit 144 shown may be separate from the storage unit 100. As shown, a processor 168 may interact with the network 169, the interface 150, the screen 148, a storage database 174, a user database 173 and/or a priority function module 175. The interaction may be via wired or wireless connection. The processor 168 may be a subcomponent of the computer 135. In some embodiments, the processor 168 is separate from the computer 135. The interface 150 may be in direct interaction with the processor 168 as shown. In some embodiments, as mentioned, the processor 168 and interface 150 may have intermediate components. The screen 148 may be on the front 158, back 160, or any other side of the control unit 144. The screen 148 may display the results of the interaction with the processor 168. The screen 148 may also provide an input for communication to the processor 168, such as a touch screen.

The processor 168 may also communicatingly interact with various computing resources, such as databases and executable routines. As further shown in FIG. 7B, the processor 168 may interact with a storage database 174, a user database 173 and a priority function module 175. In some embodiments, the databases 174, 173 hold data that is accessed by the processor 168. The storage database 174 may hold data related to storage receptacles 132, such a database of which receptacles 132 are currently available, which receptacles 132 will be needed and when for incoming items, and/or which receptacles 132 will be available and when. These are just some examples of what the storage database 174 may comprise, and many other types of data related to storing items in a receptacle 132 or in a storage unit 100 are within the scope of the present disclosure.

In some embodiments, the control unit 144 includes a user database 173 that can interact with the processor 168. The user database 173 may contain data related to users of the control unit 144. For example, the database 173 may contain data related to registered users. In some embodiments, the database 173 contains data related to historical user activity such as frequency of use or efficiency of use.

For instance, user activity may include data related to the frequency of use of the control unit 144 by a particular user. A user's frequency of use of the unit 144 may be recorded and stored in the database 173. This may be how often a user uses the unit 144 or any other information related to the frequency of use.

User activity may further include the efficiency of use of the unit 144 by a user. For instance, records in the database 173 may include how responsive a user is to being alerted that an item is available for pickup. Efficiency here may refer to how quickly a recipient or user picks up an item after being alerted that an item is ready for pickup. It may also include data on whether a user ever actually retrieves the item.

For efficiency and frequency of use, and for any other data related to user activity, the user may also be the recipient, but the user need not be the recipient. For instance, a recipient may be notified, but a different person may actually pick up the item and thus be the user. Thus, the efficiency of the recipient may be stored, but the recipient may not be the actual person responsible for the efficiency data stored in the database 173. This applies equally to the frequency of use or to any other data stored that is related to "user" activity. Further, the user database may contain other data besides user frequency and efficiency. Similar data related to user activity are within the scope of the present disclosure, even though they may not be explicitly addressed herein.

As further shown in FIG. 7B, the processor 168 may interact with a priority function module 175. The module 175 may be an executable program to determine priority of use of the storage receptacle 132. For instance, the module 175 may retrieve and/or analyze data in the user database 173 and/or the storage database 174 to determine the priority of a particular item for a particular recipient. In some embodiments, if the intended recipient has favorable ratings with regard to frequency and efficiency, and/or if a storage receptacle 132 is available, then a high priority may be given to that item and/or recipient. This may mean that the next available storage receptacle 132 will be chosen for the item. Or it may mean that the item is placed lower on the list for priority. In some embodiments, if the intended recipient has unfavorable ratings with regard to frequency and efficiency, and/or if a storage receptacle 132 is not available, then a low priority may be given to that item and/or recipient. Many variations and configurations for the priority module are possible and are within the scope of the present disclosure.

As shown in FIG. 7B, the various components are all interacting with the processor 168. However, in some embodiments, the various components may also interact with each other in addition to or instead of the processor. For instance, the priority function module 175 may in addition to the processor also interact with the user database 173 and/or the storage database 174 and/or the network 169. Many other variations and configurations for the control unit 144 are possible and are within the scope of the present disclosure.

Figure 7C:
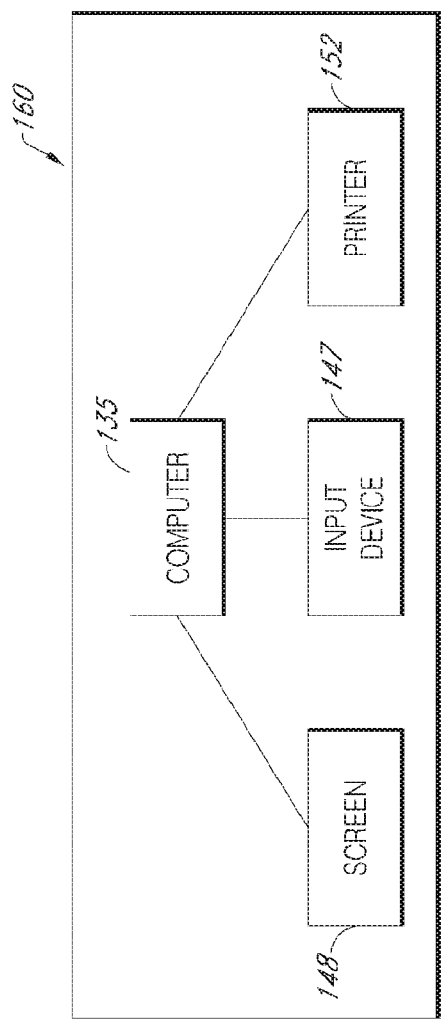

FIG. 7C depicts an embodiment of various components that may communicatingly interact and that are accessible from the back 160 of the control unit 144. As mentioned this control unit 144 may be a part of, or separate from, the storage unit 100. As shown, the computer 135 may interact with a screen 148, and input device 147 and/or a printer 152. The screen may be a part of, or separate from, the computer 135. In some embodiments, the screen 148 is a 10" USB-powered display. In some embodiments, the screen 148 is a 7" USB-powered display. Other size screens 148 may be used. The input device 147 may be used to input data into the computer 135. In some embodiments, the device 147 is a number pad, as discussed in further detail herein. The printer 152 may be used to print a receipt 149 containing user access information 151. The various components may interact via a wired and/or a wireless connection. The various components may also be within the control unit 144 or they may be external to the unit 144. For instance, the input device 147 may be on a mobile device of a delivery agent, or the printer may be in the office of the delivery agent. Many configurations and variations of the communicating interaction between the various components are possible and are within the scope of the present disclosure. Further, any component shown also includes any subcomponent. For instance, the computer 135 may also refer to a processor within the computer 135.

Figure 8:
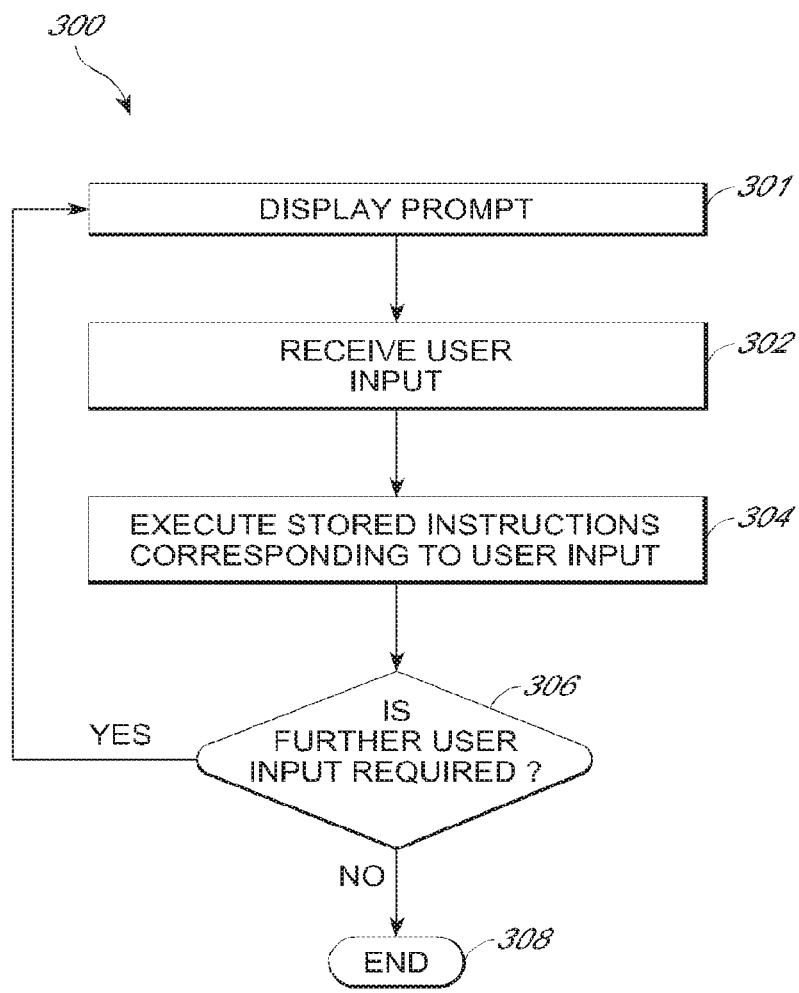
FIGS. 8-8F depict flow charts of different embodiments of operation of the control of a storage unit.
Figure 8A:
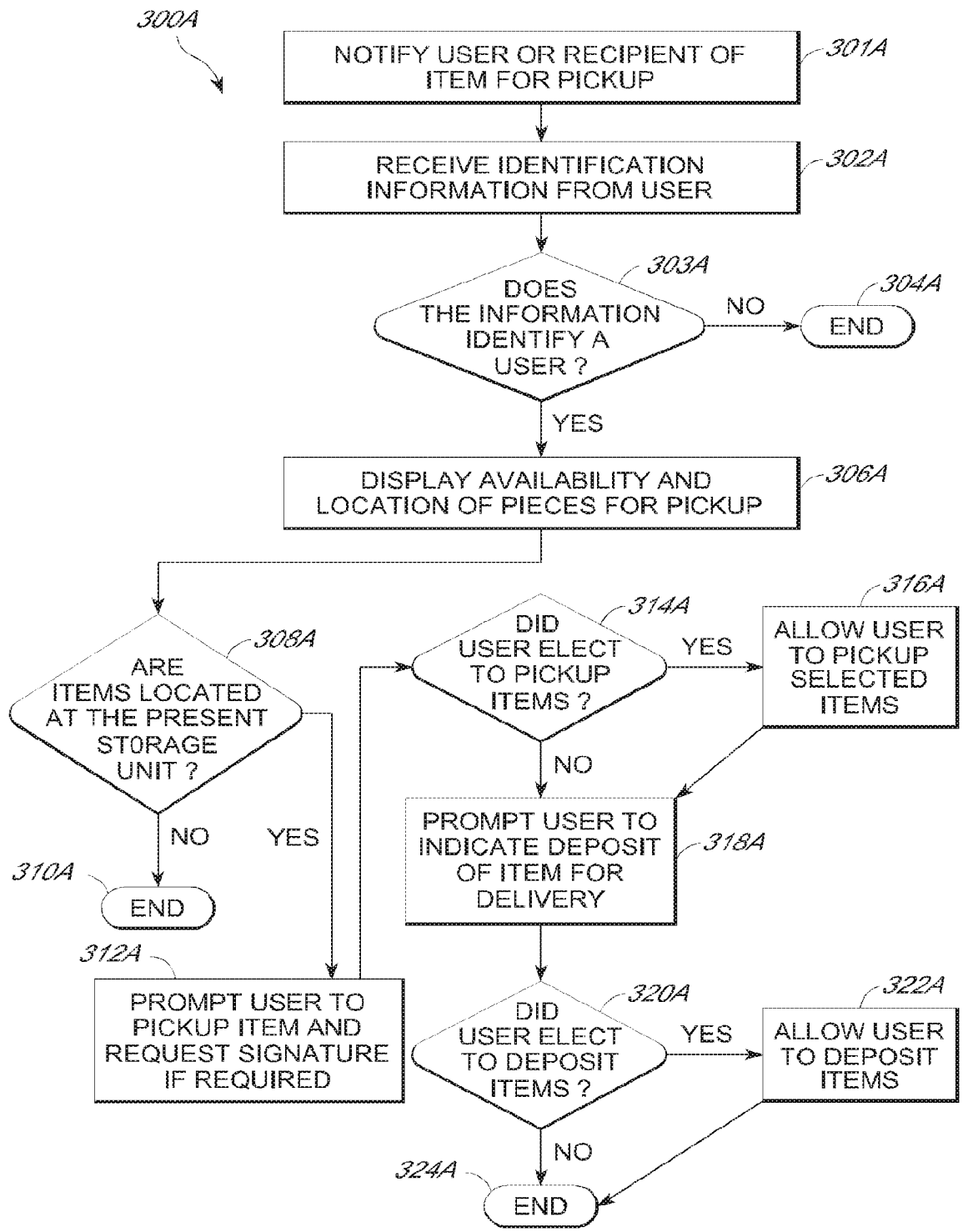
Figure 8B:
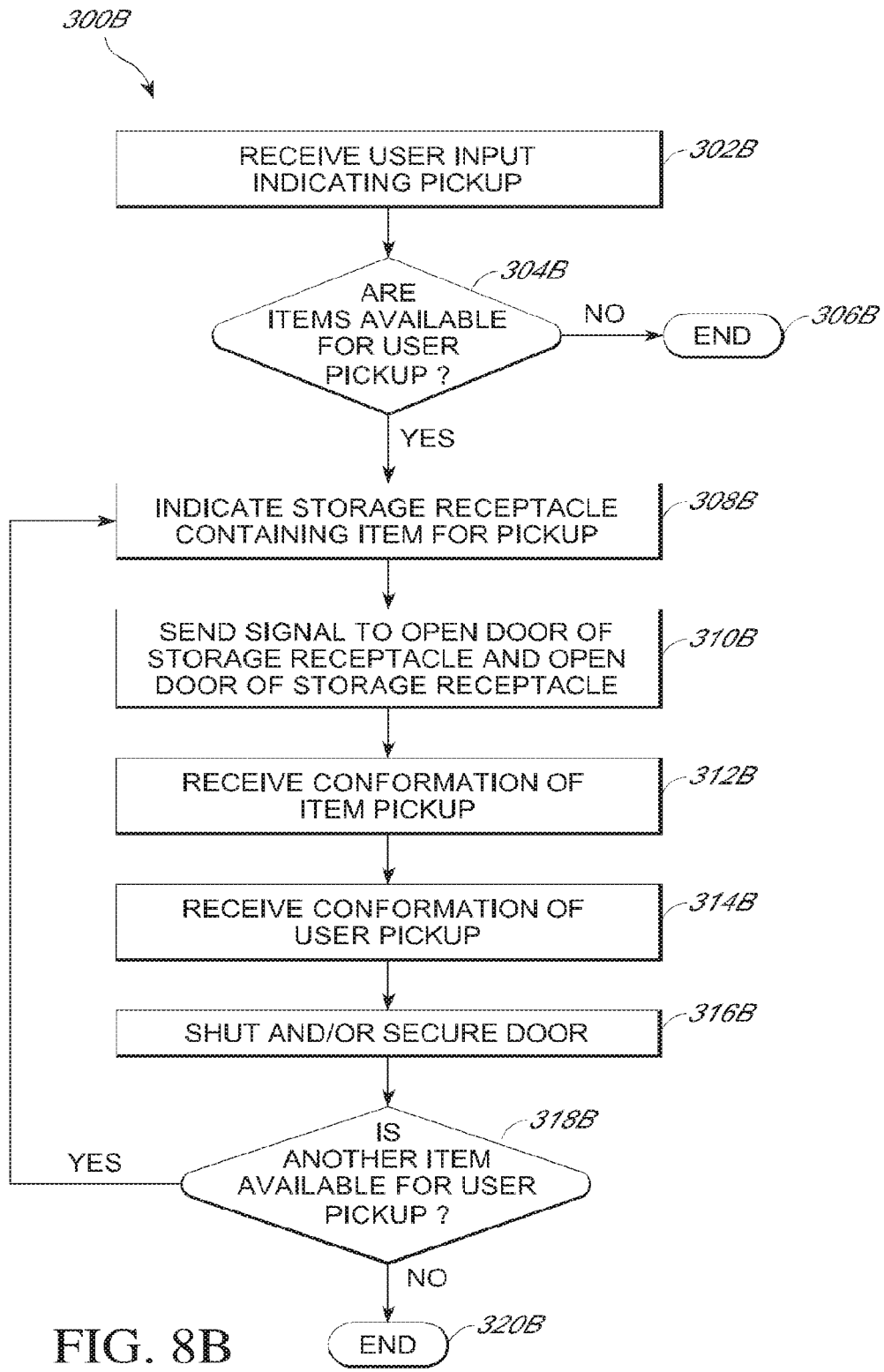
Figure 8C:
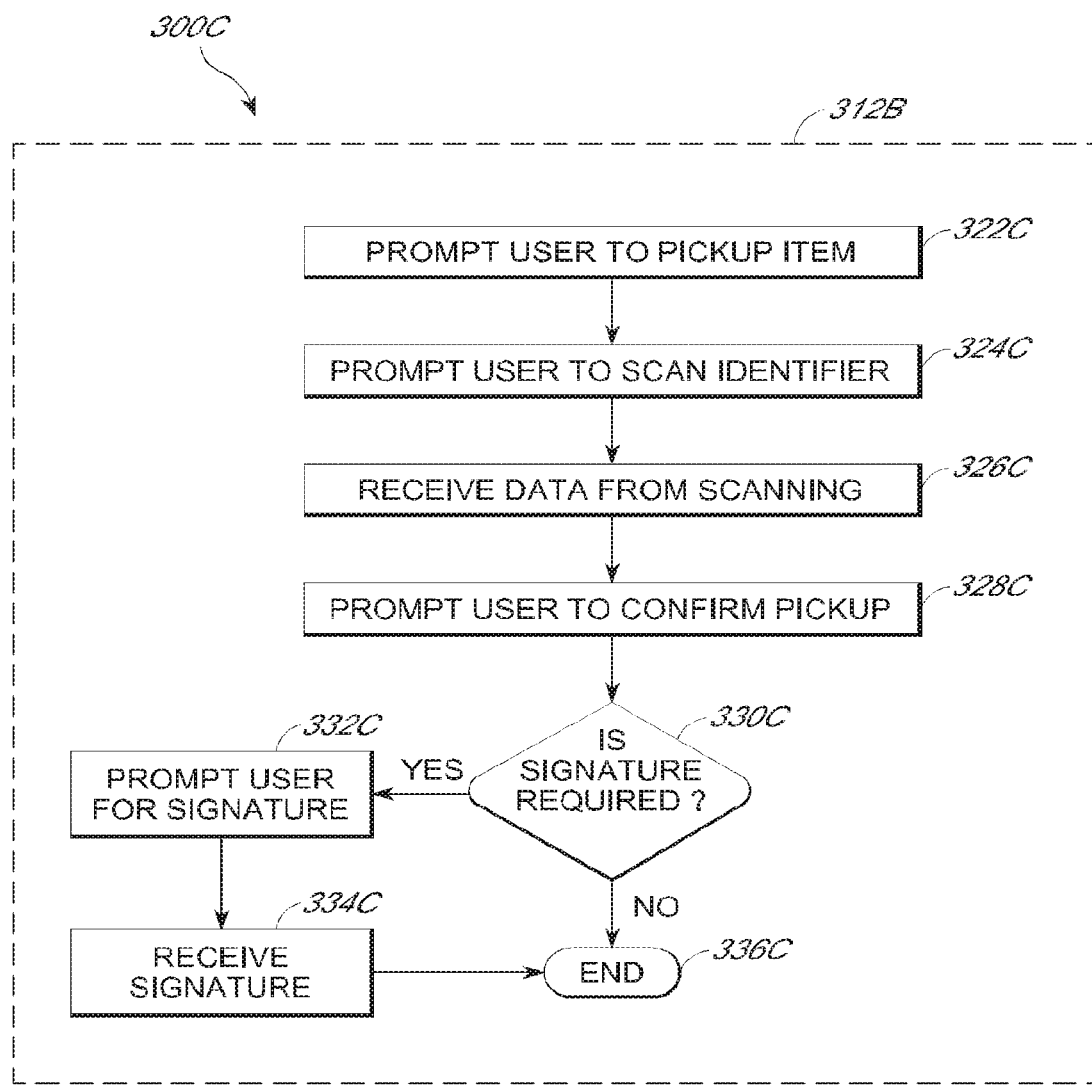
Figure 8D:
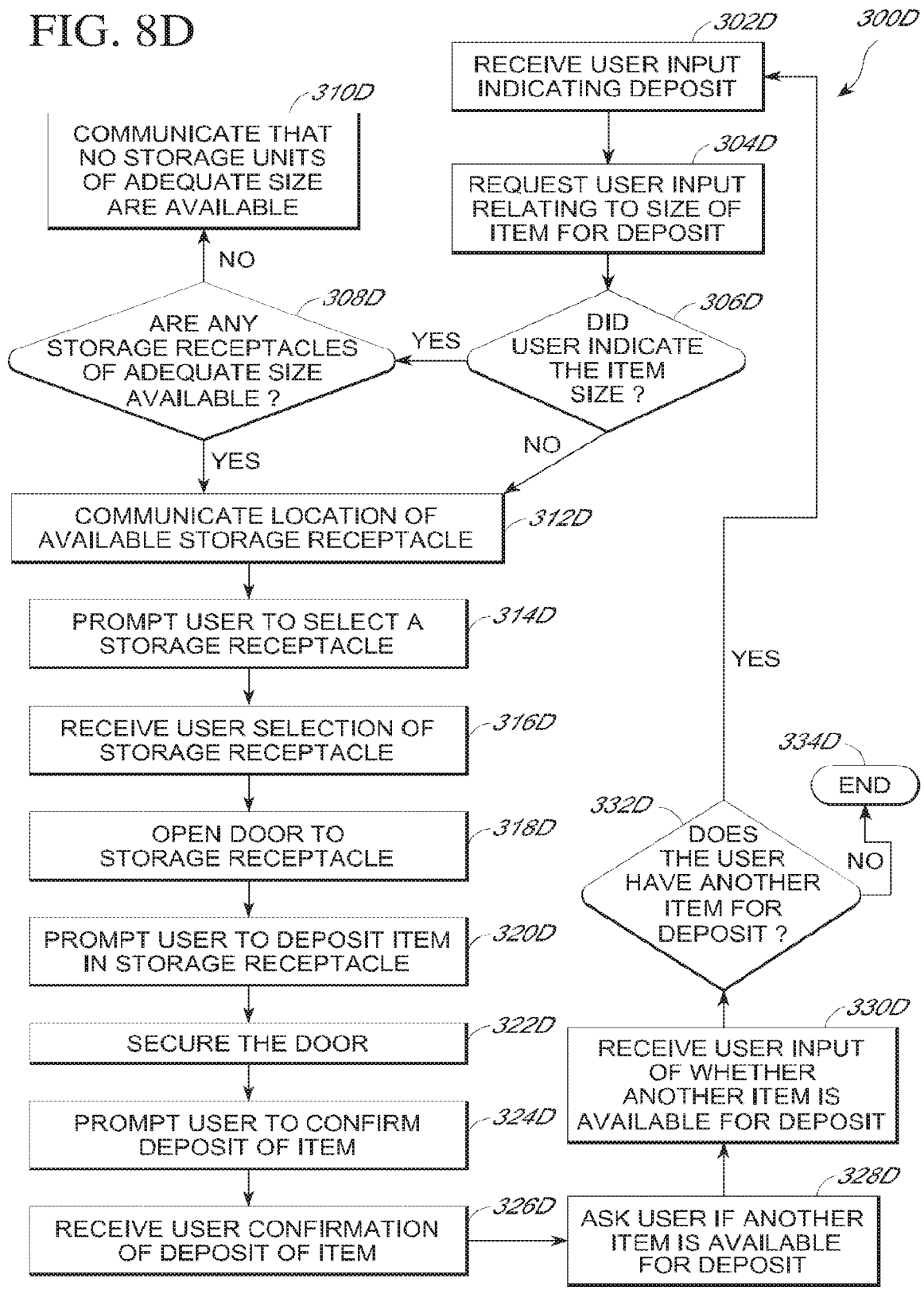
Figure 8E:
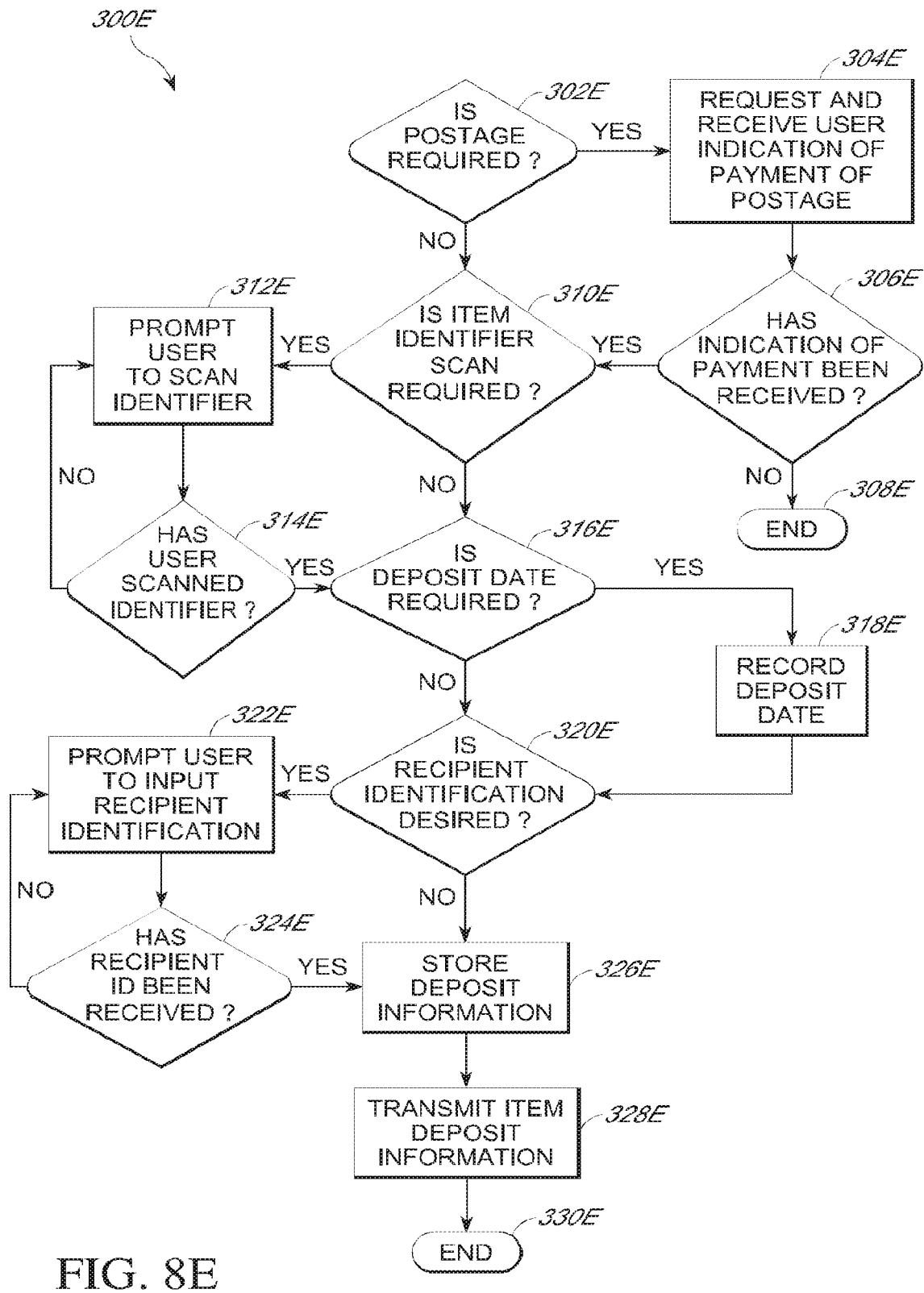
Figure 8F:
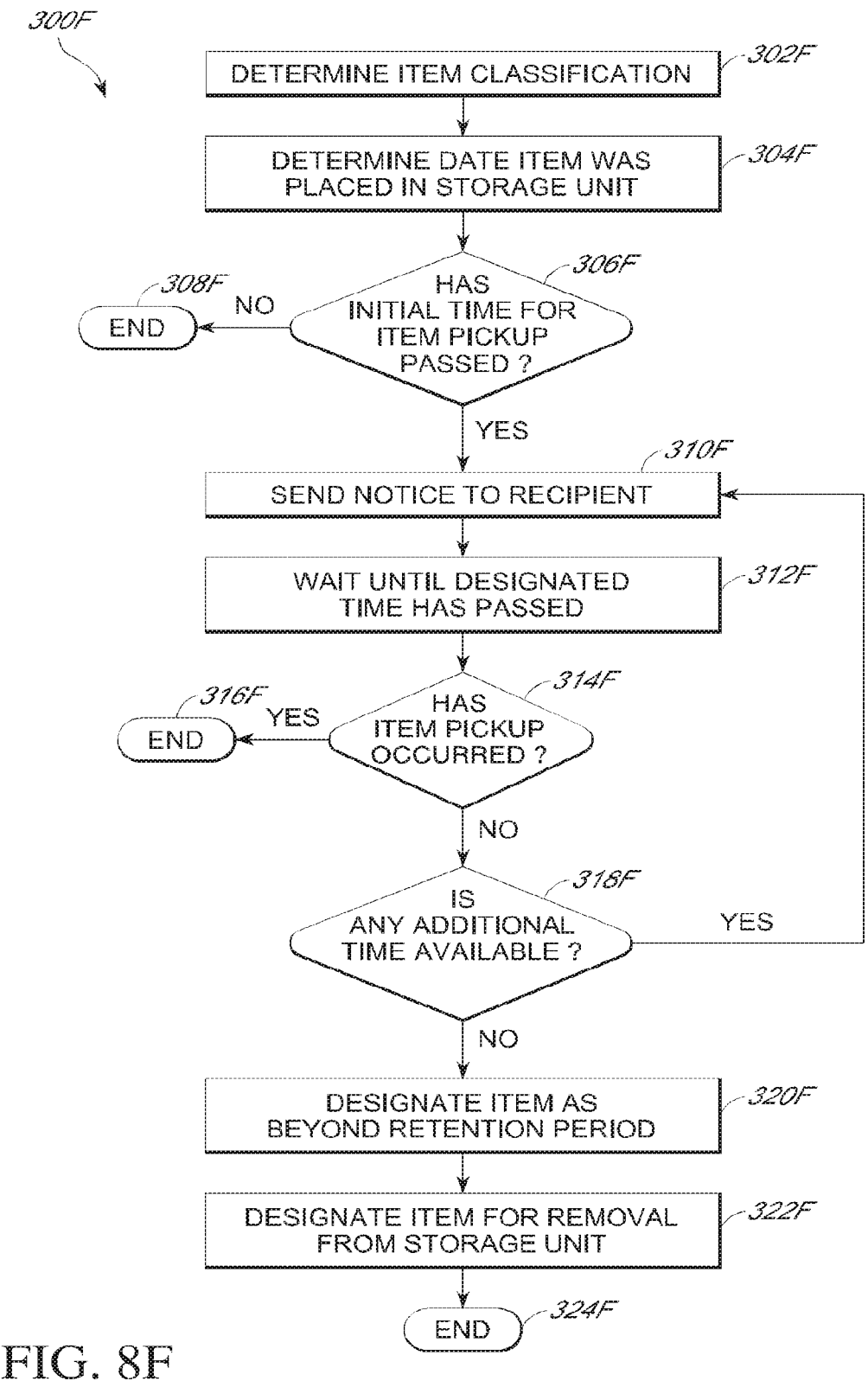

FIGS. 8-8F illustrate different methods of operating a storage unit 100. FIG. 8 depicts one embodiment of a process 300 of controlling a storage unit 100. The process 300 begins by displaying a prompt to a user as depicted at block 301. This prompt or message may be a request for input such as, for example, the user access information 151, user identification, item identification, task identification, item delivery, item retrieval, payment, an instruction, storage receptacle selection, or any other input, or may be an information display.

The process 300 continues to block 302 and receives a user input. In some embodiments, this input is in response to the prompt displayed in block 300. This input may correspond to, for example, the user access information 151, user identification, item identification, task identification, payment, item delivery, item retrieval, storage receptacle selection, or any other input.

The process 300 continues to block 304 and executes stored instructions corresponding to the user input. These instructions may correspond to, for example, the functions of the storage unit 100, including, for example, requesting information, transmitting information, disengaging a lock, engaging a lock, receiving an input, scanning user access information, access information, scanning an identifier, and receiving payment.

After execution of stored instructions corresponding to the user input at block 304, the process 300 moves to decision state 306 and determines whether additional user input is required. If additional user input is required, the process moves to block 300. If no additional user input is required, the process terminates at block 308.

The general method of operation outlined in FIG. 3 is generally applied in all of the other processes performed with the storage unit 100. Thus, this general method is applied in, for example, the process of FIG. 8A which depicts one embodiment of a process 300A of controlling the storage unit 100 during item pickup and item delivery. The process 300A begins at block 301A, when an item is deposited in a storage unit, which triggers a sending notice information 153 to a user or the intended recipient of the item. The notice information 153 may be sent as an email, an SMS text message, a written notice, or by any other notification method. After notice information 153 is sent, process 300A moves to block 302A wherein control unit 144 receives identification information from the user. The identification may comprise a broad range of information and may be received by the control unit 144 in a variety of formats. In some embodiments, the identification comprises, for example, the access information, the user access information 151, a username and password, a unique account number, and unique information stored in a computer readable medium. In some embodiments, the identification information provides input to the control unit 144 by a user action, such as, typing, speaking, selecting, or scanning. In some embodiments, for example, a user can enter a username and password by typing the username and password, by speaking his username and password into a microphone, by spelling his username and password into a microphone, by scanning a computer readable code, or by any other desired method. In some embodiments, for example, the user has a device such as mobile phone and/or fob which may communicate, wired or wirelessly, with the control unit 144 to authenticate. In some embodiments, for example, this may employ a challenge-response scheme to authenticate the user, and/or the device may also potentially authenticate the system. Challenge-response schemes may be any suitable scheme, including but not limited to asking for one of multiple passwords, using transient or temporary passwords that expire after a set time, presenting a question that must be validly answered or authenticated, etc. In some embodiments, two or more of these or other methods may be required for multi-factor authentication. In some embodiments, one method of authentication could be used in lieu of another; for example, the user may be able to enter their username and password should they not have their mobile device available.

After receiving identification information from the user, the process 300A moves to decision state 303A and determines whether the information identifies a user. In some embodiments, this step can comprise a comparison of received identification information with stored user identification information. If the identification information does not identify a user, the process 300A terminates as depicted at block 304A.

If the identification information identifies a user, the process 300A moves to block 306A and the storage unit 100 displays the availability and location of items scheduled for pickup by the user. In some embodiments, these items may be at the instant storage unit 100, and in other embodiments, these items may be located at a different storage unit 100.

After displaying the availability and location of an item scheduled for pickup by the user, in some embodiments, the process 300A moves to decision state 308A and determines whether the item is located at the present storage unit 100. If the item is not at the present storage unit 100, then the process ends at block 310A.

If the item is at the present storage unit 100, the process 300A moves to block 312A and the user is prompted to pick-up the item. The process 300A moves to decision state 314A and determines if the user has elected to pick-up the item. If the user has elected to pick-up the item, then the user is allowed to pick-up the item at block 316A, for example, by allowing the user to scan the user access information 151 with the interface 150 and then unsecuring or unlocking the storage receptacle 132.

After the user picks-up the item at block 316A, or if the storage unit determines at decision state 314A that the user has not elected to pick-up the item, the process moves to block 318A, where the user is prompted to indicate whether they will deposit an item for delivery. The process 300A moves to decision state 320A and determines if the user elected to deposit the item for delivery. If it is determined that the user elected to deposit the item for delivery, the user is allowed to deposit the item at block 322A. After the user has deposited the item at block 322A, or if the storage unit 100 determines that the user did not elect to deposit the item for delivery, the process ends at block 324A. Although the processes herein are described with regard to a single item, the processes could be carried out with multiple items, multiples storage receptacles 132, and/or multiple users.

The process of controlling the storage unit during item pick-up and/or delivery may include further sub-processes. These sub-processes may include, for example, processing further steps relating to the item pick-up and relating to the item delivery. FIG. 8B depicts one embodiment of a process for item pick-up 300B. The process 300B begins at block 302B when the storage unit 100 receives a user input indicating intent to pick-up an item. In some embodiments, the input may be user access information 151. After receiving this input, the process 300B moves to decision state 304B to determine if there is an item available for pick-up by the user. This determination can, in some embodiments, be performed locally at the storage unit 100, or in some embodiments, this determination may comprise transmitting a request to the storage unit system control unit for whether the user has an item available for pick-up at the storage unit. If no item is available for pick-up, the process terminates at block 306B.

If an item is available for pick-up at the storage unit 100, the process 300B indicates the storage receptacle 132 containing the item available for pick-up. This indication may be achieved in a variety of ways. In some embodiments, for example, the screen 148 shows a depiction of the storage unit 100, and visually indicates the storage receptacle 132 in which the item is being stored. In some embodiments, the visual indication of the location of the item may include, for example, a schematic illustration of the storage unit with a visual indication, such as highlighting, one or several storage receptacles containing items for pick-up. In some other embodiments, the position of storage receptacles 132 containing an item available for pick-up may be indicated through, for example, activation of a light, or any other desired method.

The process continues at step 310B, where the control unit 144 sends a signal to open the door 136 of the storage receptacle 132, and the door 136 of the receptacle 132 opens or is made accessible to the user by the control unit 144. In some embodiments, opening of the door comprises, for example, unlocking of the securement feature 140, or causing the door 136 of the receptacle 132 to move to an opened position. In some embodiments, the door 136 may pop open, either partially or completely, in order to provide easy awareness to a user which receptacle has been opened.

After opening the door 136 of the storage receptacle 132 as depicted in block 310B, the process moves to block 312B, and the storage unit 100 requests confirmation by the user that he or she picked-up the item in the designated storage receptacle 132.

The storage unit 100 receives confirmation that the user picked-up the item in the designated storage receptacle 132 at block 314B. In some embodiments, for example, the user provides a signature if required for pick-up, and additionally confirms the pick-up via signature, or other input to the storage unit 100. In some embodiments, the user signs in a signature capture space located on a touch screen, and the signature is electronically captured. In some embodiments, storage receptacle 132 comprises a scale or other device to detect a change in the weight within the volume of the storage receptacle. If a user picks up an item, the scale senses the reduction in weight, and the reduction in weight may be a pick-up confirmation provided to the storage unit 100. In some embodiments, sensor 145 may provide a sensing function to sense when an item has been removed from the storage unit 132, and may provide confirmation of item pickup to the storage unit 100.

Upon receiving confirmation that the user picked-up the item in the designated storage receptacle 132 as depicted in block 314B, the process 300B advances to block 316B, where the door 136 of the storage receptacle 132 is closed and/or secured. In some embodiments, the door 136 of the storage receptacle 132 is configured to automatically close. In some embodiments, the door 136 of the storage receptacle 132 is configured to controllably close. In some embodiments, the door 136 of the storage receptacle 132 may not be configured to controllably or automatically close.

In some embodiments, the securement feature 140 of the storage receptacle 132 is configured for activation upon user confirmation of pick-up, or upon the elapsing of a specified time, such as an automatic log-off. In some embodiments, the securement feature 140 is activated as depicted in block 314B to re-secure the door 136 of the storage receptacle 132.

After the door 136 of the storage receptacle 132 has been closed and/or secured as depicted in FIG. 8B, the process 300B advances to decision state 318B, where it determines if another item is available for pick-up by the user. If another item is available for pick-up by the user, the process returns to block 308B. If another item is not available for pick-up by the user, then the process 300B terminates at block 320B.

FIG. 8C provides further detail into the steps of some processes used in picking-up an item from a storage unit 100. Specifically, FIG. 8C depicts one embodiment of a process 300C for requesting confirmation of item pick-up as depicted in Block 312B of FIG. 8B. Accordingly, the steps of the present process 300C occur within block 312B of FIG. 8B.

As depicted in FIG. 8C, the process 300C for requesting confirmation of item pick-up begins at block 322C by prompting the user to pick-up the item. This prompt may be, for example, in addition to an indication of which storage receptacle 132 contains the item, and in addition to opening of the storage receptacle 132 containing the item.

After prompting the user to pick-up the item, the process 300C advances to block 324C where the user is prompted to scan an identifier, such as user access information, for the item. In some embodiments, this may comprise, for example, scanning a computer readable code, receiving a radio frequency transmission, scanning a text string, or scanning any other identifying feature of the item.

After prompting the user to scan the identifier as depicted in block 324C, the process 300C advances to block 326C, where the storage unit 100 receives data from the scanning of the identifier.

After receiving data from the scanning of the identifier as depicted in block 326C, the storage unit 100 prompts the user to confirm the pick-up of the item at block 328C. The process 300C then advances to decision state 330C where it determines whether a user signature is required. If a signature is required, the storage unit 100 prompts the user to provide a signature as depicted in block 332C. The storage unit then receives the signature as depicted in block 334C. After receiving the signature as depicted in block 334C, or after determining that no signature is required in decision state 330C, the process 300C terminates at block 336C.

The steps of process 300C as depicted are illustrative, and need not be performed in the order described. For example, steps 324C and 325C may be performed prior to step 322C.

FIG. 8D depicts one embodiment of a process 300D for deposit of an item. The process 300D begins at block 302D when the storage unit 100 receives a user input indicating a user's intent to deposit an item at the storage unit 100.

The process 300D then moves to block 304D, where the user input is requested relating to the size of the item for deposit. In some embodiments, the user may respond to this request by inputting, for example, the dimensions of the item for deposit, or specifying the general item size, such as, for example, small, medium, or large. In some embodiments, the request to input the size of the item for deposit may provide general guidance as to how to classify an item as small, medium, or large.

In some embodiments, a scale, a sensor, or measuring device may be located at the storage unit 100, or may be incorporated into storage unit 100, providing a user with an opportunity to measure the size and weight of an item and provide the measurements to the storage unit 100. A user may manually input the measured item dimensions into the control unit 144, or the scale, sensor, or measuring device may communicate the measured item dimensions to control unit 144. In some embodiments, the item may be provided in a flat-rate box, or one of a set of standard size boxes. In this embodiment, the user may select or input an identifier from the flat-rate or standard size box. The control unit 144 recognizes the identifier for the flat rate or standard size box, and selects appropriately sized storage receptacles 132 for deposit of the item in the flat-rate or standard size box.

After requesting that the user input information relating to the dimensions of the item for deposit, the process 300D moves to decision state 306D and determines whether the user indicated the item size. In some embodiments, the item size may be indicated to the control unit 144 according to the postage required or paid, where the postage required corresponds to a flat-rate or standard size box.

If the user indicated the item size, the process 300D advances to decision state 308D, and determines whether any storage receptacles 132 of adequate size to hold the deposited item are available. In some embodiments, this determination includes, for example, a query of the receptacle database 171 to determine which receptacles are available and the sizes of the available receptacles.

If no storage unit of adequate size is available, the process moves to block 310D and communicates to the user that no storage receptacles 132 of adequate size are available in the storage unit 100. In some embodiments, the control unit 144 may display on screen 148 the location of the nearest storage unit 100 having an available storage receptacle 132 appropriate to the item or item size. In some embodiments, screen 148 may display the location of the nearest delivery or pick-up points, such as the nearest post offices to the storage unit 100. In some embodiments, this information may be provided on a print out, a receipt, email, or SMS message to the user.

If storage units of adequate size are available, or if the user does not indicate the item size as determined at decision state 306D, the process 300D moves to block 312D and communicates the location of available storage receptacles. In some embodiments, for example, the screen 148 shows a depiction of the storage unit 100, and visually indicates, by, for example, highlighting, available storage receptacles 132.

The process 300D then moves to block 314D where the user is prompted to select a storage receptacle 132. After receiving the user selection of the storage receptacle 132 as depicted in block 316D, the door 136 to the selected storage receptacle 132 is opened as depicted in block 318D.

The process 300D then proceeds to block 320D, where the user is prompted to deposit the item in the storage receptacle 132. In some embodiments, the door 136 may automatically shut after the item is deposited, or the door may be controllably shut after the item is deposited. In some embodiments, the user may be additionally prompted to shut the door 136. In some embodiments, a sensor incorporated into securement feature 140 provides confirmation to the control unit 144 that the door has been secured and locked or unsecured and unlocked. In some embodiments, sensor 145 provides a signal to the control unit 144 that the door is closed, secured, and/or locked, or open, unsecured, and/or unlocked.

The process then moves to block 322D, and the door 136 is secured. In some embodiments in which the presence of an item in the storage receptacle is not automatically detected, after the door is secured, the user is prompted, as depicted in block 324D, to confirm that the item was deposited in the storage receptacle 132. After receiving the user confirmation that the item was deposited in the storage receptacle as depicted in block 326D, or after receiving sensing information indicating that the item was deposited in the storage receptacle, the process moves to block 328 where the user is asked if he has another item to deposit.

After receiving the user input as to whether he has another item for deposit as depicted in block 330D, the process 300D moves to decision state 322 and determines whether the user has another item for deposit. If the user has another item for deposit, the process 300D moves to block 302D and continues through the flow chart. If the user does not have another item for deposit, then the process 300D ends at block 334D.

FIG. 8E depicts one embodiment of the process 300E associated with prompting the user to deposit an item in the storage receptacle 132 as depicted in block 320D of FIG. 8D. As depicted in FIG. 8E, the process 300E moves to decision state 302E and determines if postage is required. In some embodiments, determining if postage is required may comprise evaluating whether a certain item or identifier input by a user qualifies for deposit into storage unit 100. For example, a user may generate an identifier or user access information 151, such as a postage bar code, and provide the barcode to the storage unit 100 via interface 150. The process, in decision state 302E may evaluate whether the provided postage barcode is eligible for use at the storage unit 100. This determination may be based on the identification of the user and an input from the user identifying the item is a mail item to be sent to a particular recipient or location. In decision block 302E, the determination of whether postage is required may also be made based on input or scanned dimensions and weight of the item. In some embodiments the user inputs a description of the item, any special delivery instructions, delivery destination, value of item being deposited, and other similar parameters. Based on these parameters, control unit may determine how much postage is required for the item to be deposited. In some embodiments in which the user is the agent, no postage may be required. In contrast, in some embodiments in which the customer is the user, postage may be required.

If postage is required, the process 300E moves to block 304E and requests and receives user indication of payment of postage. In some embodiments, this comprises completion of a postage purchase transaction at the storage unit 100. In some embodiments, this may comprise providing an indication of a previously completed postage purchase transaction. In some embodiments, this indication may comprise scanning a unique identifier such as user access information 151 associated with the postage purchase transaction, entering a unique identifier associated with the postage purchase transaction, scanning postage located on the item, or any other method of identifying a completed postage transaction. Upon each transaction, control unit 144 may update a database maintained on a central controller or server, which will be described in more detail below.

The process 300E then moves to decision state 306E and determines if an indication of payment has been received from the control unit 144. If the indication of payment has not been received, then the process terminates at block 308E. If the indication of payment has been received, then the process moves to decision state 310E and determines if scanning of an item identifier is required. Advantageously, the scanning of a unique item identifier may allow the storage unit 100 to track each individual item that is placed in a storage receptacle.

This identifier, such as the user access information 151, may comprise a range of identifiers, and may include a computer readable code, a barcode, a text string, a radio-frequency emitter such as an RFID tag, or any other identifier.

If scanning of an identifier is required, the process 300E moves to block 312E and prompts the user to scan the identifier. The process 300E then moves to decision state 314E and determines if the user scanned the identifier. If the user did not scan the identifier, then the process returns to block 312E and prompts the user again to scan the identifier. If the user scanned the identifier, or if no identifier scan was required, the process 300E moves to decision state 316E and determines if an item deposit date is required. If an item deposit date is required, the process 300E moves to block 318E and records the deposit date. In some embodiments, the storage unit 100 is configured to track the date, and so will be able to store the deposit date without user input. In other embodiments in which the storage unit 100 is not configured to track the date, the user may be prompted to input a deposit date, which entered date is stored at block 318E.

After the deposit date has been stored in block 318E, or if no deposit date is required, the process 300E moves to decision state 320E and determines if recipient identification is desired. In some embodiments in which an agent is depositing an item in a storage unit 100, the recipient information may be requested so that the recipient is notified that his item is in the storage unit 100 and/or storage receptacle 132 and so that the recipient can identify himself to retrieve the item from the storage unit 100 and/or storage receptacle 132. In other embodiments in which the customer is depositing an item in the storage unit 100 and/or storage receptacle 132, the identification of the recipient may not be requested.

If the recipient information is desired, the process 300E moves to block 322E and the user is prompted to input recipient information. In some embodiments, the user may manually input the recipient information, may scan an identifier containing the recipient information, or may use any other technique to enter the recipient information.

The process 300E then moves to decision state 324E and determines if the recipient identification information has been received. If the recipient identification information has not been received, the process moves to block 322E and the user is again prompted to enter the recipient identification information. If the recipient identification information has been entered, or if the recipient identification information is not required, then the process moves to block 326E and the deposit information is stored at the storage unit 100. The process then moves to block 328E and transmits the item deposit information. In some embodiments, this transmission is from the storage unit 100 and to the storage unit system 400. Specifically, this transmission is from the storage unit 100 and to the central management system 404. The process then terminates at block 330E.

In some embodiments, the storage unit 100 is configured to track the amount of time that an item has been in a storage receptacle 132, and designate the item for removal from the storage receptacle 132 if the item has been in the storage receptacle 132 in excess of some duration. FIG. 8F depicts one embodiment of a process 300F for determining whether an item should be classified for removal based on the time it has been in the storage receptacle 132. In some embodiments, the time an item may be stored in the storage unit 132 may be input by a user into control unit 144 upon deposit. In some embodiments, the time an item may be stored may be determined by the storage unit 100 based on the category of the item, input by the user at time of deposit. In some embodiments, when time an item may be stored is not specified, control unit 144 may select a default time for storage of a unit such as 1 hour, 2 hours, 4 hours, 12 hours, 1 day, 2 days, 1 week, 2 weeks, 1 month, 2 months, or any other amount of time. In some embodiments, the control unit 144 records the time of deposit regardless of user input. The time of deposit may initiate a standard allowed time for an item to remain in a storage receptacle 132 according to a pre-determined storage time.

The process 300F depicted in FIG. 8F starts at block 302F by determining the classification of the item. This classification may relate to a characteristic of the delivery service provided for the item, such as, for example, mail class and/or mail type, the nature of the item, such as, for example, its degree of perishability or size, economic or market factors, such as the relative demand for the storage receptacle occupied by the item, or any other factor relevant to the time that an item should be allowed to remain in the storage receptacle 132.

The process 300F moves to block 304F and determines the date that the item was placed in the storage unit 100. In some embodiments, the storage unit 100 is configured to track the date, and so this date may be retrieved from storage unit 100 resources. In other embodiments in which the storage unit 100 is not configured to track the date, this date may be retrieved from remote resources located within a storage unit system.

After determining the date that the item was placed in the storage unit 100 at block 304F, the process 300F moves to decision state 306F and determines if the initial time for item pick-up has passed, or if the item has been stored longer than input or predetermined time for an item to be stored in the storage receptacle 132 has elapsed. If the initial time period for item pick-up has not passed, the process 300F terminates at block 308F.

If the initial time period for item pickup has passed, the process 300F proceeds to block 310F and notice information 153 is sent to the intended recipient of the item to pick-up the item. In some embodiments, this notice information 153 may provide the address of the storage unit 100, identify the storage receptacle 132 holding the item within the storage unit 100, provide the user access information 151, provide a date before which the item must be picked-up, provide notice procedures if the item is not retrieved, and any other desired information. In some embodiments, this notice information 153 comprises an electronic communication to, for example, an email account, a telephone number, a social network homepage, or any other electronic communication. In some embodiments, the notice information 153 comprises a voice communication sent to a telephone number or other account capable of receiving a voice communication. In some embodiments, the notice information 153 comprises a paper communication sent to the address of the intended recipient of the item. The notice information 153 may be generated upon a user request or automatically by the storage unit 100.

After sending the notice information 153 to the user at block 310F, the process 300F advances to block 312F and waits until the designated time period has passed. After the time period has passed, the process 300F advances to decision state 314F and determines whether the item has been picked-up. If the item has been picked-up, the process 300F terminates at block 316F. If the item has not been picked-up, the process 300F moves to block 318F and determines if any additional time is available for picking-up the item. In some embodiments, the user may specify whether there is an extended time for pick-up of the item, or that the item may be stored in the storage unit 132. In some embodiments, the storage unit 100 may determine two time periods, the first period being the initial time for storage, and the second period being an extended or additional time for item pickup, which may be available upon payment of an additional fee. In some embodiments, the user may indicate whether the item should be provided to another storage unit 100 upon the first period elapsing.

If additional time is available to pick-up the item, the process 300F moves to block 310F, and continues through the flow-chart until the process is terminated. If the item is not picked up within a first time period, the above notice is sent. If the item is not picked up within the second extended or additional time period, a second notice information 153 is sent.

If there is no additional time period available for picking-up of the item, the process 300F advances to block 320F where the item is identified as being held beyond its allowed retention period. In some embodiments, this designation is stored in a local database at the storage unit 100, and in other embodiments, this designation is stored at a central database in a storage unit system. In addition to designating the item as being held beyond its allowed retention period at block 320F, the process 300F designates the item for removal from the storage unit at block 322F. In some embodiments, this designation is stored in a local database at the storage unit 100, and in other embodiments, this designation is stored at a central database in a storage unit system. In some embodiments, once the allowed storage time has elapsed, the item is returned to the sender, or the depositor is notified to come retrieve the item.

Figure 9:
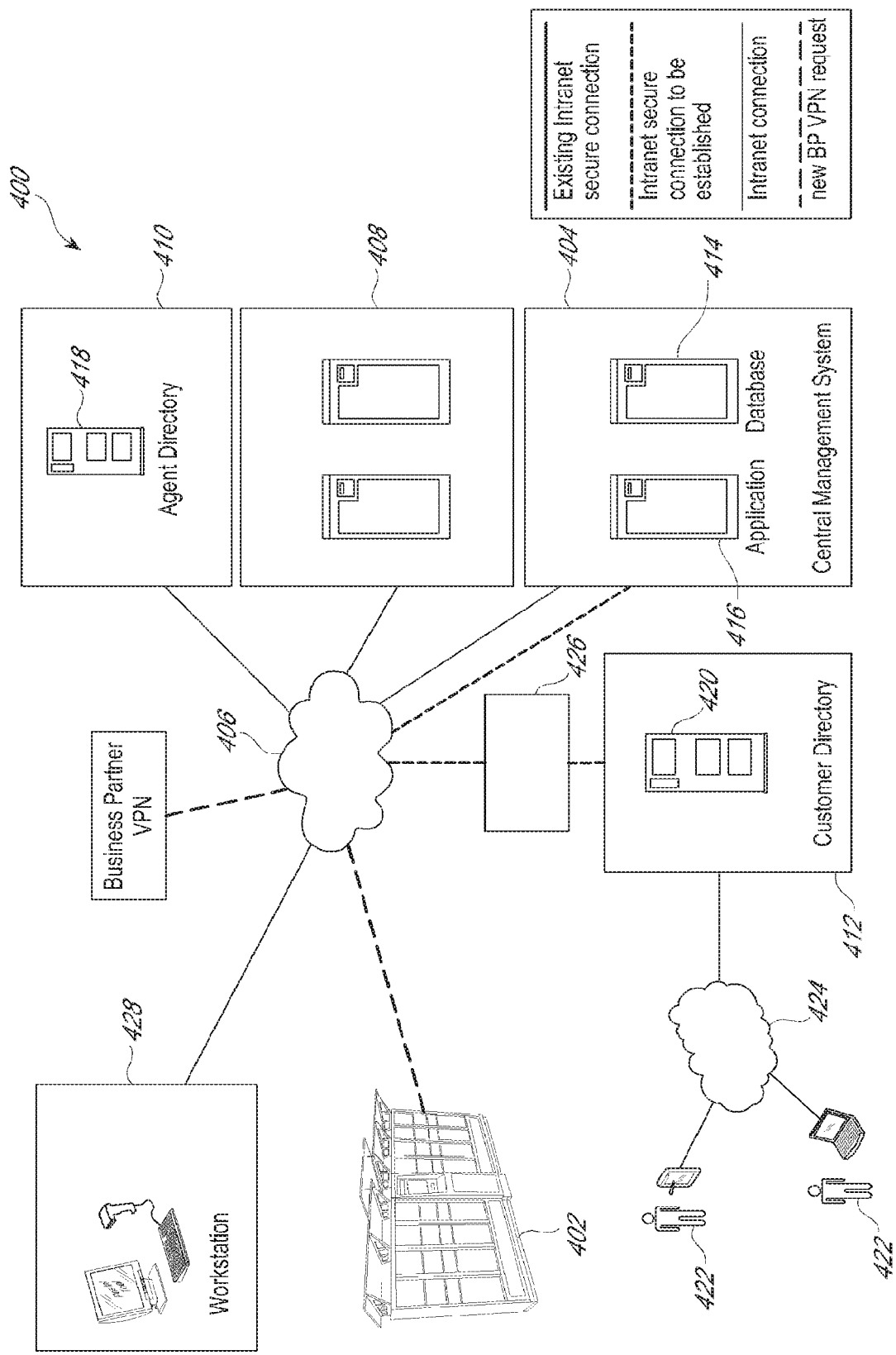
FIGS. 9-9A depict functional layouts of one embodiment of a storage unit system.

As discussed above, in some embodiments, the storage unit 100 is a standalone unit. In some embodiments, however, a plurality of storage units 100 may be integrated into a single storage unit system. FIGS. 9 through 9D depict schematic illustrations of embodiments of storage unit systems 400. As depicted in FIG. 9, a storage unit system 400 comprises a storage unit 402. In one embodiment, the storage unit 402 of the storage unit system 400 comprises a storage unit 402 and/or storage receptacle 132 as described with respect to items 100 and 144, respectively, for example in FIGS. 1-6. In some embodiments, the storage unit system 400 comprises a plurality of storage units 402 and/or of storage receptacles 132. The storage units 402 are configured for communication with other features of the storage unit system 400 across a network 406. In some embodiments, the network may comprise a local area network (LAN), a wide-area network (WAN) or any other type of network. The storage units 402 are wired to or wirelessly communicate with the network, via, for example, a cellular network.

The storage unit system 400 further comprises computing and memory resources. These computing resources may include one or several processors, computers, servers, or other computing resources. The memory resources may include, for example different types of volatile or nonvolatile memory. A user or customer may sign up or register to be a user of the storage unit system 400. By doing so, a customer can select that particular items the customer orders be sent to a specific location. A customer may also provide pick-up and delivery preferences at the time of registration. The information provided at registration may be stored in a customer database as described herein. A customer may sign up by accessing the network, establishing user identification and password, and other information that may be useful to facilitate pick-up and delivery of items. Vendors, sellers, merchants, and other similar parties may also register to use the storage unit system 400. By so doing, they can provide a convenient delivery option for a customer or user who orders an item from them. The vendors may establish preferences for pick-up and delivery items for users of the storage system 400. In some embodiments, the customer may not be a registered user, but may be identified as a guest user. A guest user may be provided with user access information 151 or other unique code or identifier, appropriate for a single or limited number of uses, and provide this code 151 at a storage unit 100 in order to complete a transaction.

In the embodiment depicted in FIG. 9, the computing and memory resources include, for example, a central management system 404, one or several engineering support servers 408, and an agent directory 410. In some of embodiments, each of these computing resources may comprise memory including stored instructions and one or more databases.

In some embodiments the central management system 404 comprises a computing resource such as, for example, a computer, a computer system, a server, one or several processors, or any other feature configured to receive and transmit information and instructions to and from the storage units 402, receive and transmit information and instructions relating to item status and delivery, and receive and transmit information and instructions to and from other components of the storage unit system 400. In some embodiments, and as depicted FIG. 9, the central management system 404 comprises a database 414 comprising information relating to the storage unit 100 and the item status. In some embodiments, and as depicted in FIG. 9, the central management system 404 comprises memory 416 comprising instructions for the operation of the aspects of the storage unit system 400.

As depicted in FIG. 9, the storage unit system 400 further comprises one or more engineering support servers 408. The engineering support servers may comprise a computing resource such as, for example, a computer, a computer system, a server, one or several processors, or any other desired computing resource capable. The engineering support servers may comprise software located on the computing resource configured to maintain the functionality, security, and updatedness of storage unit software. In some embodiments, the engineering support servers 408 may utilize commercial security products to maintain the security of the storage unit system 400. These products may include anti-virus products, anti-malware products, firewalls, and any other product or software configured to provide or improve security. In some embodiments, the engineering support servers 408 comprise software configured to monitor the functionality of software in different components of the storage unit system 400, and specifically in the storage units 402. In some embodiments, the software configured to monitor the functionality of software throughout the storage unit system 400 is configured to detect and repair issues in individual components of the storage unit system 400 or across the entire storage unit system 400. Thus, in some embodiments, this feature is used to repair, upgrade, or replace the software used by components of the storage unit system 400.

The storage unit system may additionally comprise an agent directory 410. The agent directory 410 may comprise stand-alone computing capability, or the information of the agent directory 410 is located in computing capability shared with one or more other components of the storage unit system 400.

In one embodiment, the agent directory 410 comprises a database 418 of individuals. In one embodiment, these individuals are affiliated through the operation and maintenance of the storage unit system 400. In one embodiment, these individuals may be employees or contractors of the entity owning and controlling the storage unit system 400. In some embodiments, the database 418 comprises information relating to the access provided to each individual. Thus, individuals within the database 418 are provided with different levels of access to the components of the storage unit system 400 or to the storage unit system 400 based on, for example, their responsibilities or any other factor.

The storage unit system 400 further comprises a customer directory 412. The customer directory 412 may comprise stand-alone computing capability, or the information of the customer directory 412 may be located in computing capability shared with one or more other components of the storage unit system 400.

In one embodiment, the customer directory 412 comprises a database 420 of individuals. In one embodiment, the individuals is, for example, individuals who have successfully completed the registration process for use of the storage unit system 400, individuals who have begun the registration process for use of the storage unit system 400, or individuals who have been invited to register for use of the storage unit system 400. In some embodiments, information stored in the database 420 may include, for example, account and customer identification information, account preferences, payment information, and any other information associated with the customer and/or the account. In some embodiments, information stored in the database 420 may include, for example, data related to customer or recipient activity. Activity here may include, as discussed further herein, data related to frequency and/or efficiency of use of the storage system.

In some embodiments, the customer identification information may include, for example, a cell phone number, an account number, a user name, a password, a name, an address, or any other user identifying information.

In some embodiments, the account preferences may include, for example, preferred delivery method, contact information, preferred contact method, preferred delivery locations, including, for example, a preference list identifying different storage units 402 and their comparative preference as delivery locations, and any other account preferences.

In some embodiments, the information stored on database 420 is received from a customer 422 during the registration process. A "customer" as used herein may refer to a recipient of an item, a user of the system, and/or other persons involved in the storage system and processes described herein. In one embodiment, and as depicted in FIG. 9, the customer 422 provides this information during the registration process across a network 424, such as the internet. In some embodiments, the customer 422 may provide this information to a web-site during the registration process. A person of skill in the art will recognize that a customer 422 will be able to access a web-site using a range of technologies and devices, including, for example, a computer, a Smartphone, a tablet, or any other device configured for internet access. In some embodiments, a web-site may handle customer related interactions such as customer registration, electronic parcel locker selection, contact information, and access management.

In some embodiments in which the database 420 is associated with a network, the customer directory 412 and the associated database 420 is separated from other components of the network by a security feature 426. In some embodiments, the security feature may comprise, for example, a firewall, a filter, or any other feature, product, or software stored on the hardware configured to allow controlled and secure access of information from the database 420 by components of the storage unit system 400.

The storage unit system 400 further comprises an agent access point 428. The agent access point 428 may be a back 160 interface of a control unit 144, as discussed in further detail herein. It may also refer to the back 160 of a storage unit 100 and/or of other components of a storage unit system 400. The agent access point 428 may also be in a remote location relative to the storage unit 100 and may be a portable or non-portable device. A single storage unit 100 may have a plurality of agent access points 428 each with different levels of access and functionality and may exist as a variety of devices. Features discussed herein with respect to the back 160 of control unit 144 or storage unit 100 apply equally to discussion here of the agent access point 428.

In some embodiments, the agent access point 428 is configured to allow an agent to access the storage unit system 400. The agent access point 428 may comprise a variety of devices, including a PC, a laptop, a mobile device, a handheld device, a Smartphone, or any other device capable of requesting and receiving information across a network. In some embodiments, the agent access point 428 is configured to transmit information to the central management system 404 relating to items for delivery to a storage unit 402. The agent access point 428 is further configured to receive information from the storage unit system 402 relating to capacity for receiving the item at one or several storage units. In some embodiments, the agent access point 428 is configured to send a request to the storage unit system 400 to reserve a storage receptacle 132 for delivery at a storage unit 402.

The different components of the storage unit system 400 may communicate via a communication link with each other. In some embodiments, the communication link is a wired or wireless connection. In some embodiments, the different components of the storage unit system 400 is redundantly connected, with a combination of different wired and/or wireless connections and links.

Figure 9A:
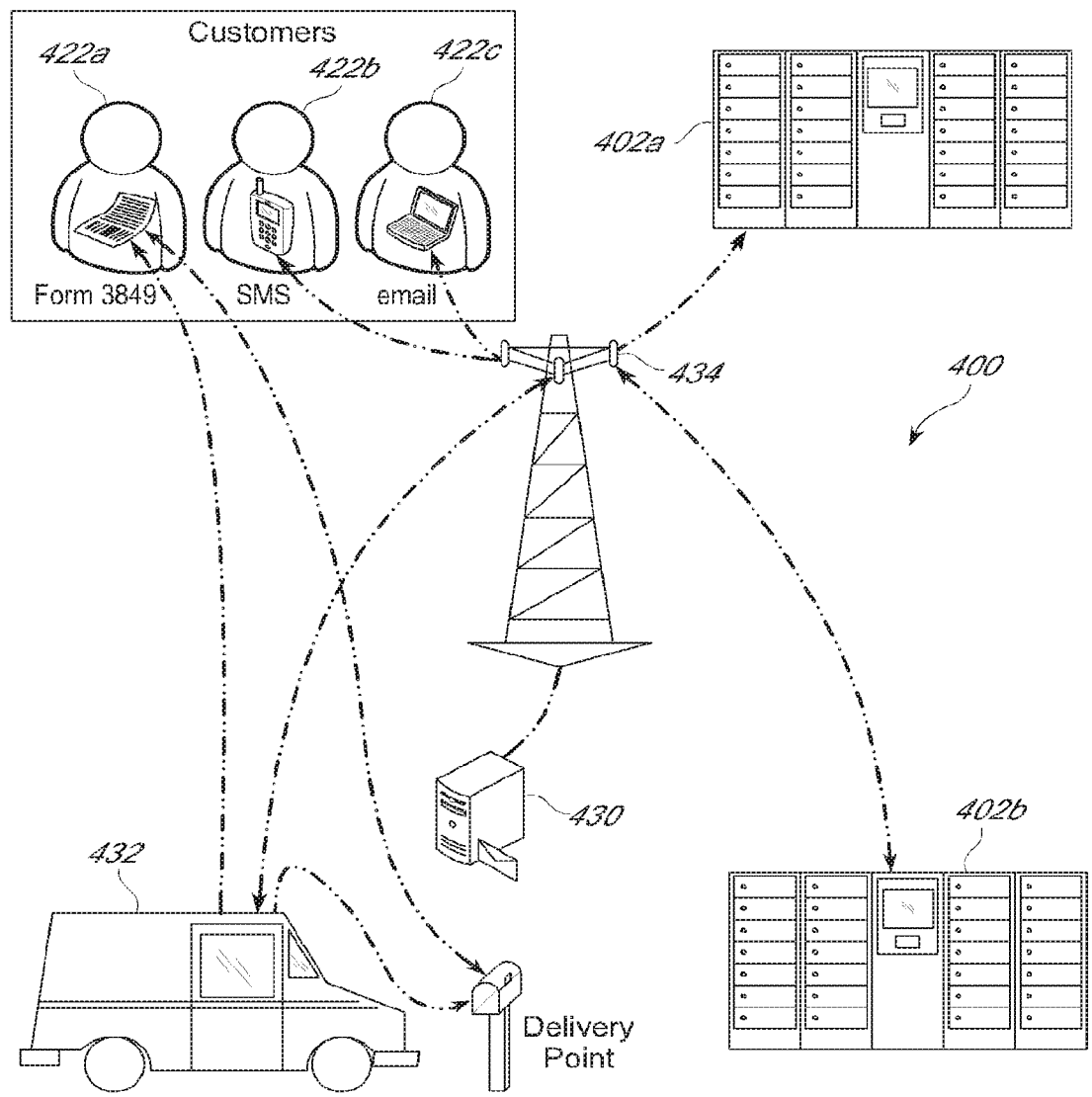

FIG. 9A depicts a functional layout of one embodiment of the storage unit system 400. As depicted in FIG. 9A, the storage unit system 400 comprises a first storage unit 402a, a second storage unit 402, and a central server 430. The central server 430 depicted in FIG. 9A comprises a variety of features, including the databases and capabilities of the system as discussed in relation to FIG. 9. Central server 430 provides a central control station for the system 400. For example, as requests for storage receptacle availability are received either at individual storage units 100 or via the network 424, the request may be provided to the server 430 as they are received. As further depicted in FIG. 9A, the storage units 402a, 402b and the central server 430 are communicatingly connected. This communicating connection is wired or wireless, or a combination thereof. As depicted in FIG. 9A, this connection includes a transmission feature 434 capable of sending and receiving wireless communications.

As further depicted in FIG. 9A, the storage unit system 400 is communicatingly connected with a plurality of customers 422a, 422b, 422c, and an agent 432. Customers here may refer to recipients, users, or other persons involved in the storage of an item. As further depicted, the communication to the customers 422a, 422b, and 422c may be achieved through a variety of means, including, for example, an electronic communication such as an email 422c or an SMS 422b, or through delivery of written notification 422a.

In some embodiments, the customer 422 receives and transmits information to the storage unit system 422. In some embodiments, the customer 422 accesses the storage unit system 422 using a computing device via the network and request information relating to the status of a delivery, the location of an item, the availability of specified storage units 402, locations of storage units 402, or any other desired information.

In some embodiments, and as depicted in FIG. 9A, an agent 432 delivering items can communicate with customers 422a, 422b, 422c, with a central server 430 and with other components of the storage unit system 400. In some embodiments, this communication is via a wireless device, such as, for example, a handheld device, a Smartphone, a mobile device, or any other device capable of wireless network communications. In some embodiments, the wireless device communicates with the storage unit system via, for example, a transmission feature 434. Advantageously, such communication may allow an agent to receive and transmit real-time information relating to the availability status of storage units 402 and relating to the delivery of items.

In some embodiments, the customer 422 may access the central server 430 via network 424 via a user interface existing on network 424. Using the user interface, the customer 422 may check availability of one or more storage receptacles 132 in one or more storage units 100 located in a user-specified geographic area, capable of receiving a particular item. The customer 422 receives a report of storage units available to receive the particular item. The customer 422 may reserve a particular storage receptacle 132 via the user interface over the network, and then the customer 422 may physically go to the particular storage receptacle 132 and deposit an item as described herein.

In some embodiments, a storage unit 100 containing an item designated for an intended recipient can send a notification or information about the item to the central server 430, which can then route the notification or information to the customer 422 for whom the item is designated or intended. In some embodiments, the agent 432 may communicate its position continuously or at periodic intervals to the central server 430. The central server may also receive periodic updates about deposits and items in storage receptacles 132. When the central server 430 receives information regarding an item to be picked-up from or delivered to a particular storage unit 100, the central server 430 sends a notification to the agent 432 directing the agent to pick up an item from or deliver an item to a particular storage unit 100. This notification may be coordinated by the central server 430 such that notifications are preferably sent to the agents 432 who are nearest in proximity to the storage unit containing the item to be picked-up or the storage unit to which the item is to be delivered. In some embodiments, the central server notifies the agent 432 whose planned route passes in proximity to the storage unit 100 where the item is to be picked up or delivered.

Figure 10:
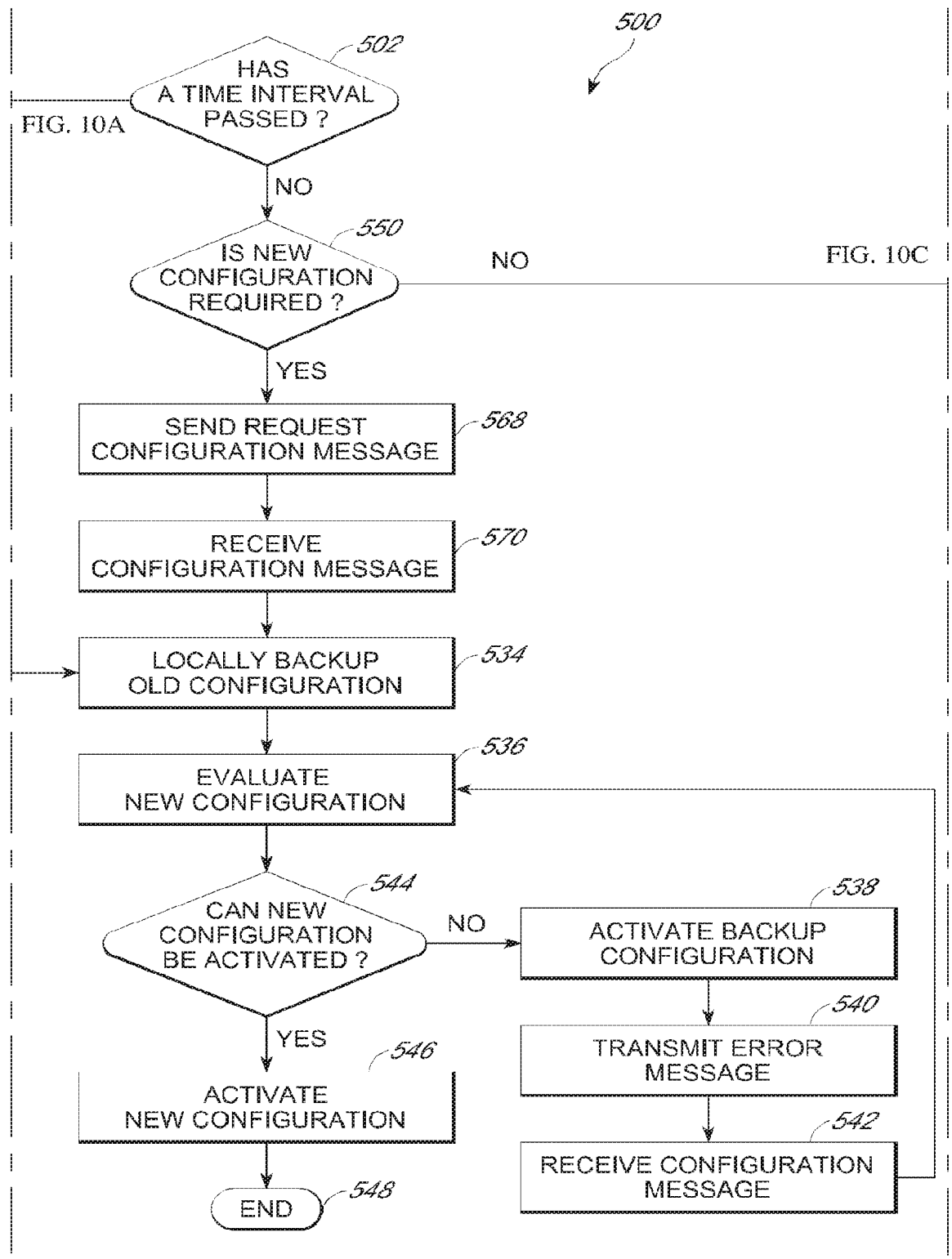
FIGS. 10-10K depict flow charts of different embodiments of operation of the control of a storage unit system.
Figure 10A:
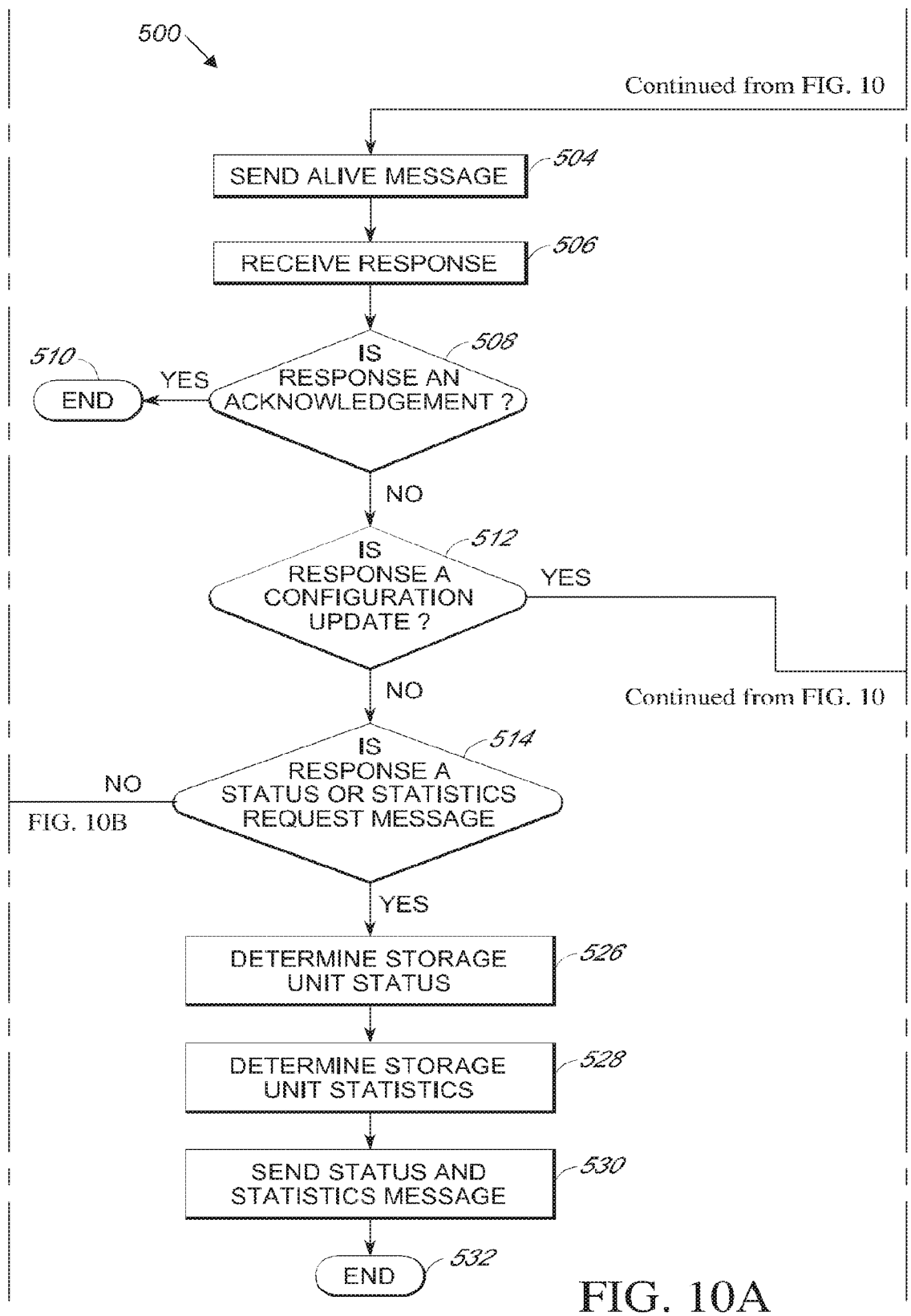
Figure 10B:
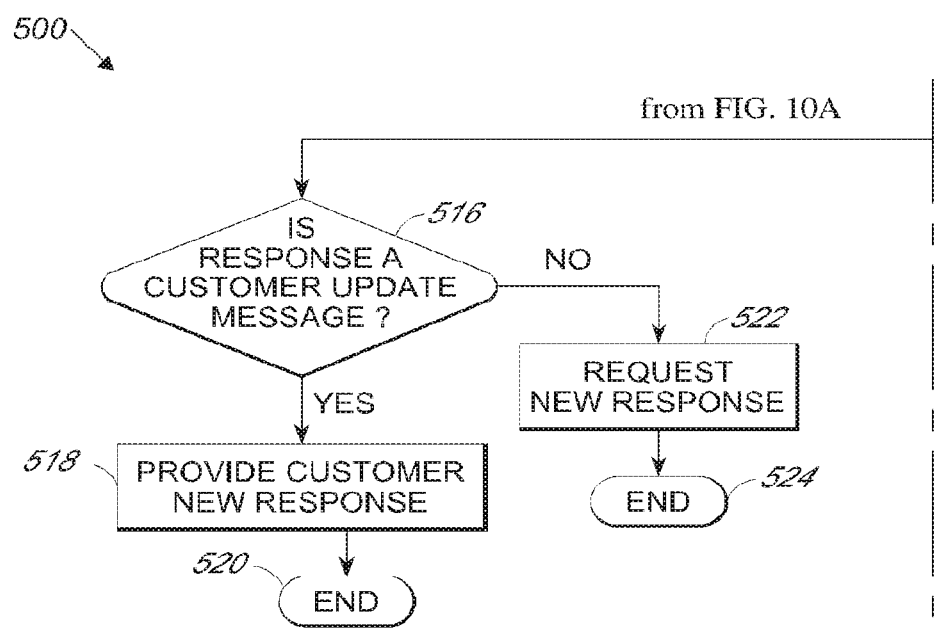
Figure 10C:
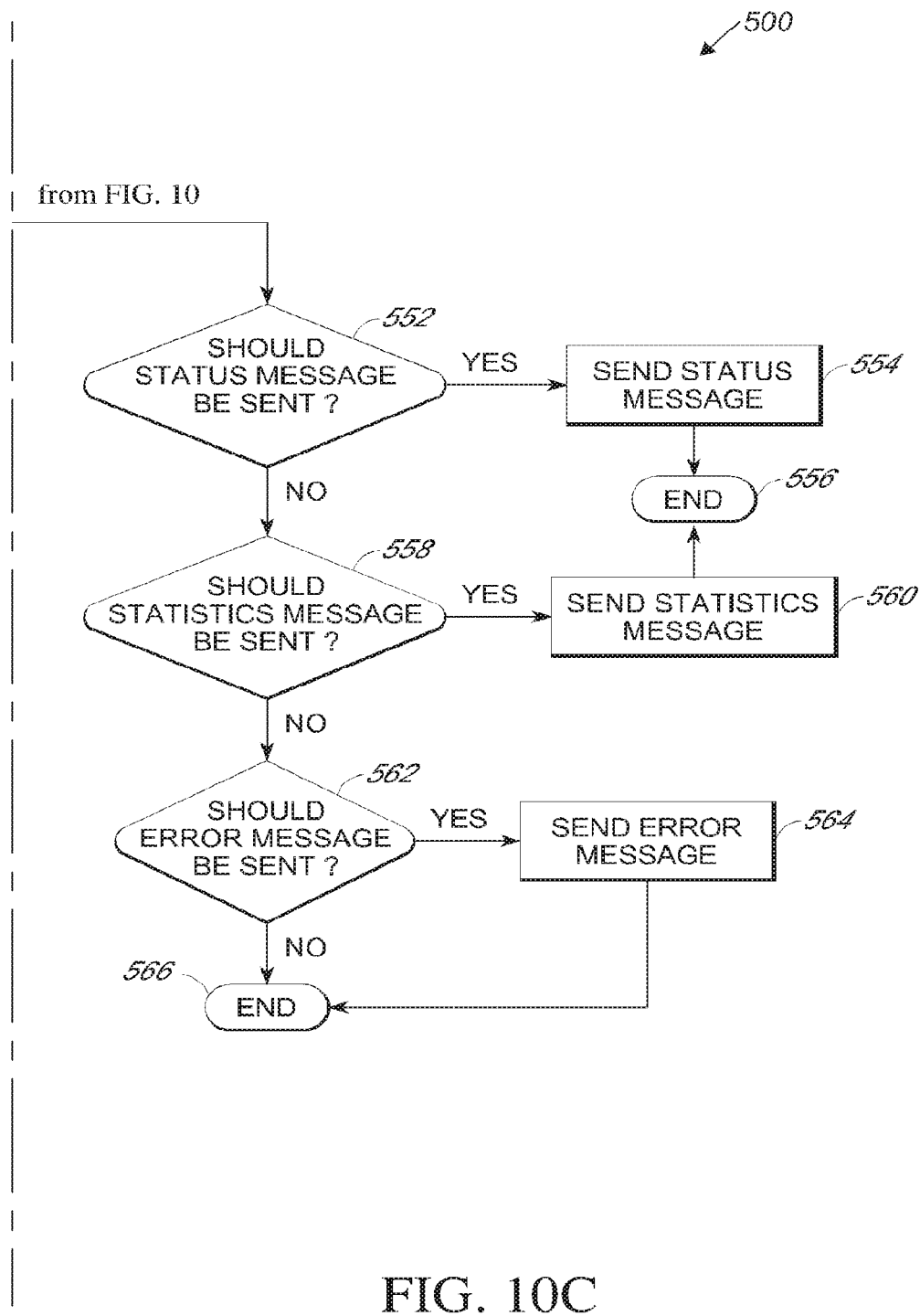

FIGS. 10-10C depict one embodiment of a process 500 of controlling a storage unit system 100. In some embodiments, the process 500 is performed at the storage unit 100, and a cooperating process is performed by computing resources elsewhere in the storage unit system 400. Although FIGS. 10-10C depicts steps specifically performed by the storage unit, a person of skill in the art will recognize that any other component of the storage unit system 400 can perform similar or identical steps. As described herein, when messages are sent and/or received, the messages may originate in the control unit 144 or in the central server 430, as the circumstances require. The central server 430 may control the process 500, and may direct the operations of other components, including the sending of messages by the control units 144. The central server 430 may facilitate message and information sending between various components of the storage unit system 400 according to the processes and methods described herein.

The process 500 moves to decision state 502 and determines if a designated time interval has passed. The time interval may be any specified time interval. In some embodiments, the time interval may be, for example, 1 second, 1 minute, 5 minutes 15 minutes, 30 minutes 1 hour, 12 hours, 1 day, 1 week, or any other desired time interval. The time interval may be determined by a number of factors, including, for example, the frequency with which customers use the storage unit 100, the frequency with which software updates of hardware maintenance is required, the location of the storage unit 100, the system bandwidth and/or processing capabilities, and/or any other factor.

If the time interval has passed, an alive message is sent as depicted at block 504. This message indicates that the storage unit 100 is properly functioning, and has no specific needs.

After sending the alive message at block 504, the process 500 moves to block 506 and awaits receipt of a response to the alive message. Once the response to the alive message is received, the process 500 moves to decision state 508 and determines if the response is an acknowledgement. An acknowledgement may comprise a message indicating that the alive message was received. In some embodiments, an acknowledgement may include further instructions for execution by the storage unit. In some embodiments, the acknowledgement may not include any instructions. If the response is an acknowledgment, then the process terminates at block 510.

If the response is not an acknowledgement, then the process moves to decision state 512 and determines if the response is a configuration update. A configuration update may provide a software update or software patch to maintain and improve the operating system of the storage unit 100.

If the response is not a configuration update, the process moves to decision state 514 and determines if the response is a status or statistics request message. In some embodiments, a status or statistics request message is periodically requested to provide an update on usage of the storage unit 100, usage of the individual storage receptacles 132 of the storage unit 100, any maintenance requests, present availability of storage receptacles, and/or any other information relating to the storage unit.

If the message is not a status or statistics request message, the process moves to decision state 516 and determines if the response is a customer update message. A customer update message may provide, for example, an update relating to customers who have used the storage unit 100. This may include, for example, user identification information, user passwords, user pictures, and identification of user transactions with the storage unit 100 such as, for example, the picking-up or depositing of one or several items.

If the message is a customer update message, the process moves to block 518 and a customer update is provided. After providing the customer update, the process terminates at block 520. Returning again to block 516, if the response is not a customer update message, the process moves to block 522 and requests a new response as the response was not of an expected type, in an expected format, or otherwise not readable. After requesting a new response, the process terminates at block 524.

Returning again to block 514, if the response is a status or statistics request message, the process moves to block 526 and determines the status of the storage unit 100. This may include, for example, determining the availability of storage receptacles 132, determining whether any maintenance or updates are required, determining how many storage receptacles 132 are occupied, determining how many storage receptacles 132 are reserved, and making any other determination relating to the status of the storage unit 100.

The process then moves to block 528 and determines storage unit 100 statistics. These statistics may include, for example, the average number of available storage receptacles 132, the average number of occupied storage receptacles 132, the average number of reserved storage receptacles, the number of customers who have used the storage receptacle, the average number of customers using the storage receptacle in a specified time period, the actual number of customers using the storage receptacle in a specified time period, the average amount of time an item is left in the storage receptacle 132 before being picked-up, the frequency of use of the system by a particular recipient or user or customer, the efficiency of use of the system by a particular recipient or user or customer, or any other desired statistic relating to the storage unit 100.

The process 500 then moves to block 530 and the status and statistics message is sent. In some embodiments, the status and statistics messages are sent to the central server 430. The process 500 then terminates at block 532.

Returning again to block 512, if the process determines that the response is a configuration update, then the process moves to block 534 and creates a local backup of the old software configuration. This backup may be of the entire software configuration, or portions of the software configuration that will be replaced by the present configuration update. After backing-up the old configuration, the process 500 moves to block 536 and evaluates the new configuration. This evaluation may be configured to determine which portions of the software configuration will be updated, to detect any obvious errors in the new configuration, and to screen the new configuration for security threats, such as, malware and/or viruses.

The process then moves to decision state 544 and determines if the new configuration may be activated. If the new configuration may be activated, the process moves to block 546 and the new configuration is activated. The process then terminates at block 548.

If the process determines that the new configuration cannot be activated, the process moves to block 538 and the old, backup configuration is activated. After activating the backup configuration, the storage unit transmits an error message indicating that the new configuration cannot be activated at block 540. The process 500 then moves to block 542 and the storage unit 100 receives a new configuration message. The process then returns to block 536 and the new configuration is evaluated. From this block, the process moves to block 544 and proceeds as described above.

Returning again to block 502, if the designated time interval has not passed, the process moves to decision state 550 and determines if a new software configuration is required. If no new software configuration is required, then the process moves to decision state 552 and determines if a status message should be sent. A status message may comprise information relating to, for example, the status of the storage unit 100 and the status of the storage receptacles 132. This may include information relating to any required maintenance, the availability of storage receptacles 132, the number and identification of storage receptacles 132 occupied by an item, the number and identification of storage receptacles 132 reserved for receiving an item, the length of time that items have been in the occupied storage receptacles 132, and any other desired status information.

If the process 500 determines that a status message should be sent, then the message is sent at block 554, and the process terminates at block 556.

If a status message should not be sent, as decided at decision state 552, the process moves to decision state 558 and determines if a statistics message should be sent. A statistics message may include, for example, the average number of available storage receptacles 132, the average number of occupied storage receptacles 132, the average number of reserved storage receptacles, the number of customers who have used the storage receptacle, the average number of customers using the storage receptacle in a specified time period, the actual number of customers using the storage receptacle in a specified time period, the average amount of time an item is left in the storage receptacle 132 before being picked-up, or any other desired statistic relating to the storage unit 100. If the statistics message should be sent, then the process moves to block 560 and the message is sent and the process terminates at block 556.

If a statistics message should not be sent, then the process moves to decision state 562 and determines if an error message should be sent. An error message may report a malfunction of the hardware or software of the storage unit 100. In some embodiments, for example, an error message is sent when a door 136 of a storage receptacle 132 cannot be shut and/or re-secured. Similarly, in some embodiments, an error message is sent when some aspect of the software fails to properly operate. If an error message should be sent, then the process moves to decision state 564 and the error message is sent, after which the process terminates at block 566. An error message may be sent if a printer is out of paper, a scanner fails, a storage receptacle 132 fails, high heat or humidity are detected, vandalism detected, power failure, or other error conditions.

Returning again to block 550, if a new configuration is required, the process moves to block 568 and a request configuration message is sent. The process then moves to block 570 and a configuration message is received. The process then proceeds to back up the old configuration as depicted at block 534 and to evaluate the new configuration at block 536. The process then proceeds to decision state 544 and proceeds through the flow-chart as discussed above.

Figure 10D:
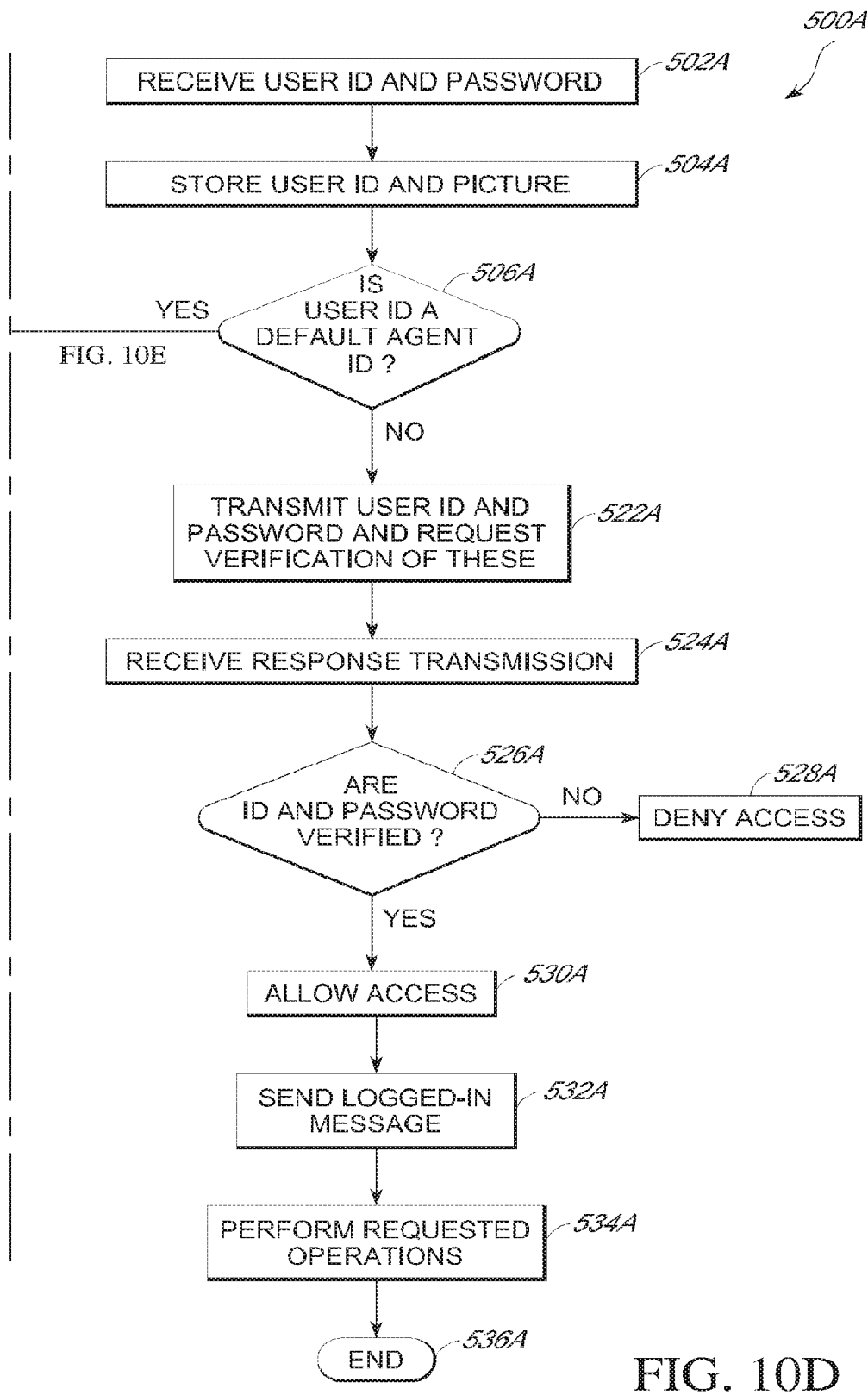
Figure 10E:
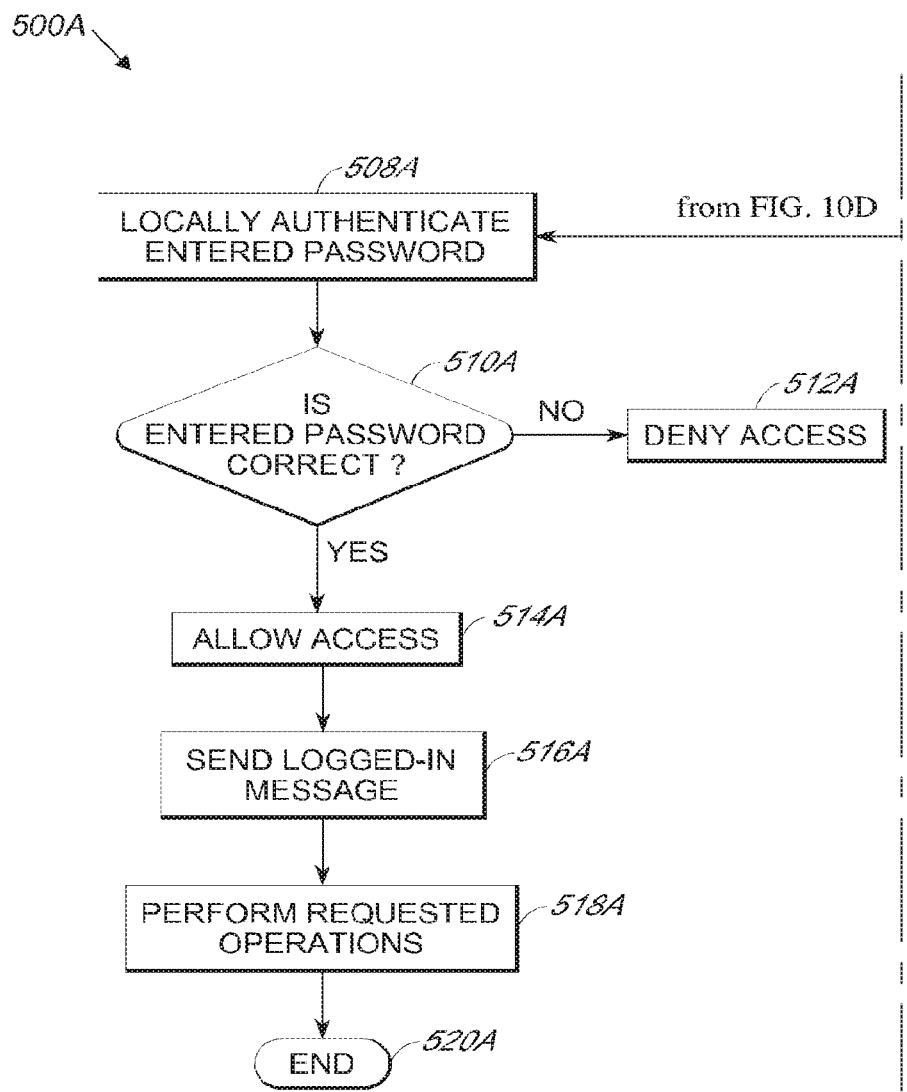

Some embodiments of a storage unit system 400 include security features to protect deposited items and to avoid accidental removal of the wrong item. One of these features is the user identification system. One process 500A used for user identification is depicted in FIGS. 10D-10E.

In some embodiments, the storage unit system 400 includes security features. For example, a storage unit 100 may comprise an accelerometer configured to identify an abrupt, sharp, or other unexpected movement of the storage unit 100, and communicate this acceleration as evidence of tampering or attempted tampering. The cameras associated with storage unit 100, including the camera on the control cabinet 146 and on the roof 124 may be motion activated and provide monitoring of transactions. These security measures may be provided to meet stringent standards as requested or required by a particular organization, such as, for example, the United States Postal Service. In some embodiments, the storage unit system, specifically the storage units 100, may be configured, e.g. designed, to meet underwriting laboratory (UL) requirements, ergonomic requirements, specific industry standard requirements, government requirements such as ABA, ADA, 508, etc., and/or other requirements.

Process 500A begins at block 502A when the user identification and password are received. At block 504A the entered user identification and picture captured at the time of entry of the user identification are stored.

The process then proceeds to decision state 506A and determines whether the customer identification is a default agent identification. The decision may be based on a list of agent identification stored on database 171 in memory 170.

If the identification is an agent identification, then the process moves to block 508A and the identification and entered password are locally authenticated by the storage unit 100 where the identification and password were entered. In some embodiments, the identification and entered password may be remotely authenticated.

The process then proceeds to decision state 510 and determines if the entered password is correct. If the password is incorrect, the process moves to block 512A and access to the storage unit 100 is denied.

If the entered password is correct for the entered agent identification, then the process moves to block 514A and access is allowed. The process then moves to block 516A and the storage unit 100 transmits a logged-in message to the central management system 404. The logged-in message may include the date and time the user logged in to the storage unit. In some embodiments, the logged-in message may include the user identification, password, and/or image captured at the time of user log-in.

The process 500A then moves to block 518A and the storage unit performs the operations requested by the agent and outlined throughout the present specification. The process 500A then ends at block 520A.

Returning again to block 506A, if the user identification is not a default agent identification, then the process moves to block 522A and transmits the user identification and password to the customer directory 412 and requests verification of the identification and password by the customer directory 412. The process then moves to block 524A and receives the response transmission.

The process then moves to decision state 526A and determines if the identification and password are verified. If the identification and password are not verified, the process moves to block 528A and access to the storage unit is denied. In some embodiments, the identification and password are verified by comparing the transmitted user identification and password to prestored user identification and password contained in customer directory 412. A user may provide the prestored user identification and password upon signing up to use the storage system 400, or by registering as a customer of the storage system 400.

If the identification and password are verified, the process moves to block 530A and access to the storage unit is allowed. The process then moves to block 532A and the storage unit 100 sends a logged-in message to the central management system 404. The logged-in message may include the date and time the user logged in to the storage unit. In some embodiments, the logged-in message may include the user identification, password, and/or image captured at the time of user log-in.

The process 500A then moves to block 534A and the storage unit performs the operations requested by the user and outlined throughout the present specification. The process 500A then ends at block 536A.

Figure 10F:
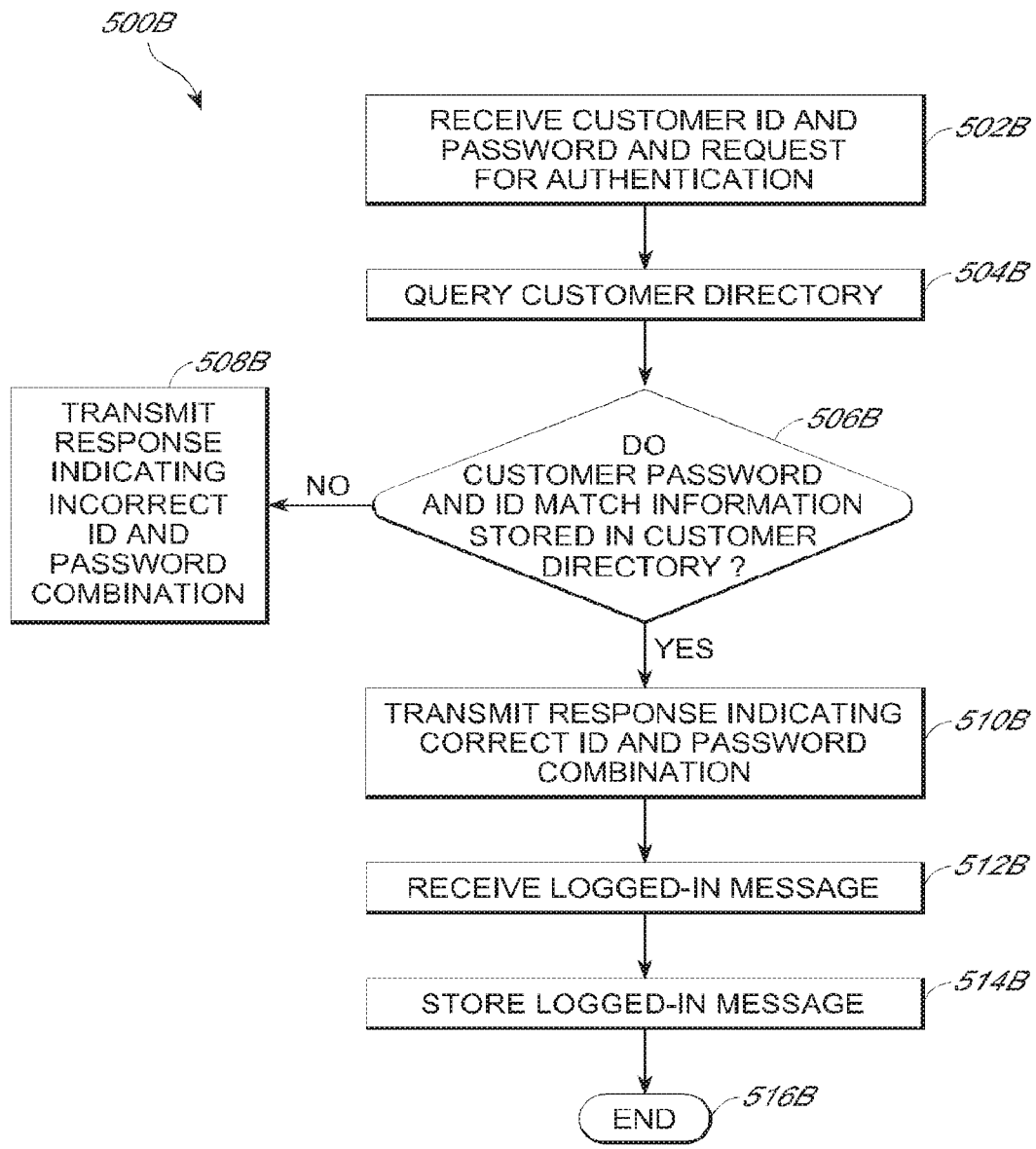

FIG. 10F depicts one embodiment of the process 500B of customer verification performed using the customer directory 412. The process 500B begins at block 502B when the customer identification and password and a request for authentication of the customer identification and password are received. The process 500B moves to block 504B and the customer directory 412 is queried.

The process 500B then moves to decision state 506B and determines if the customer identification and password match information stored in the customer directory 412. If the customer identification and password do not match the information stored in the customer directory, then the process 500B moves to block 508B and a response is transmitted to the storage unit 100 that indicates that the identification and password combination are incorrect.

If the customer identification and password match information in the customer directory 412, then the process 500B moves to block 510B, and the response is transmitted to the storage unit 100 indicating that the identification and password combination is correct.

The process 500B then moves to block 512B and a logged-in message is received from the storage unit 100 indicating that the customer has successfully logged-in. The logged-in message may include information relating to the user and the log-in, including, for example, the customer password, customer identification, customer image captured during log-in, date of log-in, time of log-in, or any other information related to the log-in. The process 500B then moves to block 514B and the logged-in message is stored, and then the process terminates at block 516B.

Figure 10G:
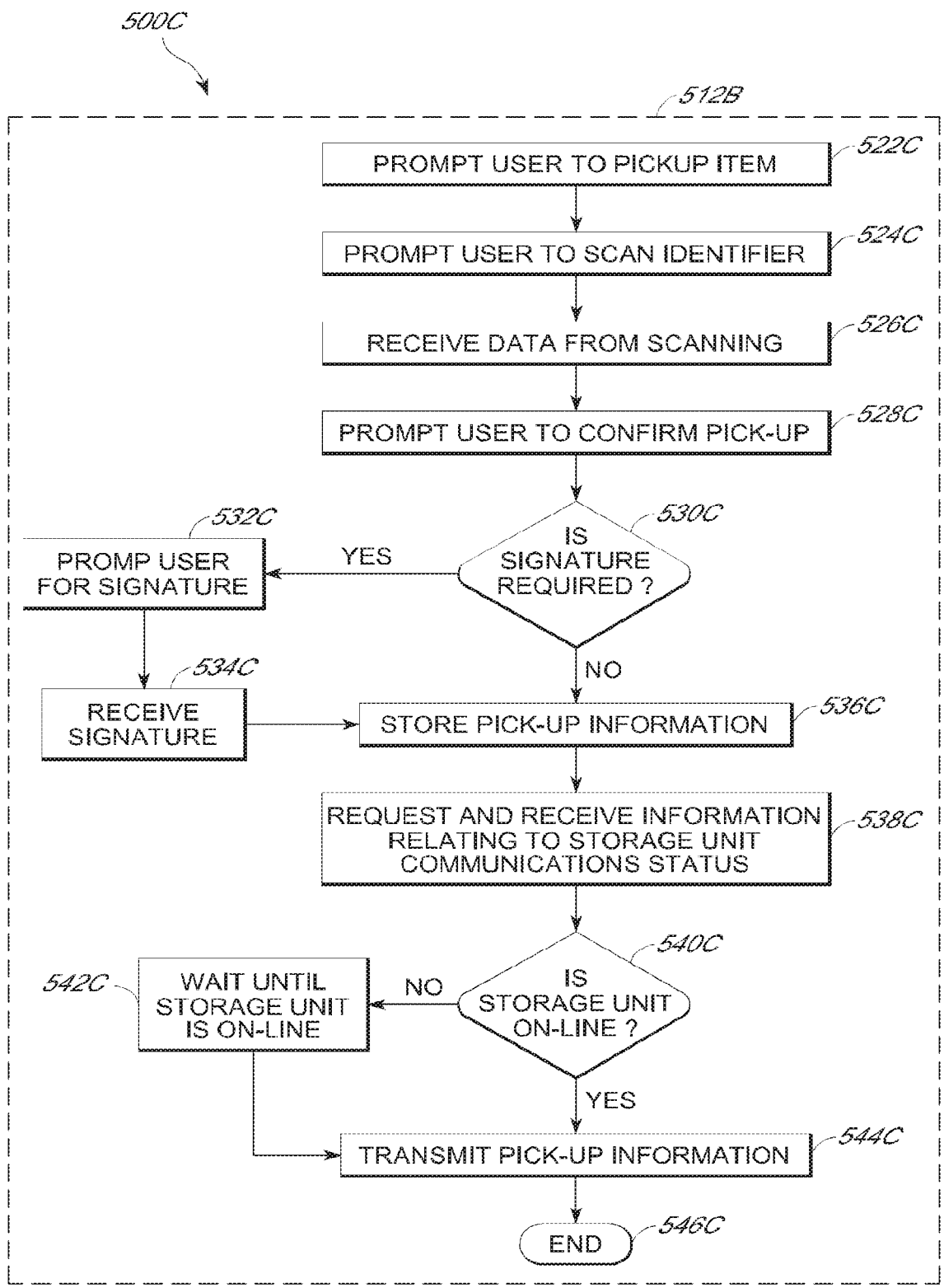

FIG. 10G provides further detail into the steps of some processes used in picking-up an item from a storage unit 100 when the storage unit 100 is functioning as part of a storage unit system 400. Specifically, FIG. 10G depicts one embodiment of a process 500C for requesting confirmation of item pick-up as depicted in block 312B of FIG. 8B. Accordingly, the steps of the present process 500C occur within block 312B of FIG. 8B.

As depicted in FIG. 10G, the process 500C for requesting confirmation of item pick-up begins at block 522C by prompting the user to pick-up the item. This prompt may be, for example, in addition to an indication of which storage receptacle 132 contains the item, and in addition to opening of the storage receptacle 132 containing the item.

After prompting the user to pick-up the item, the process 500C advances to block 524C where the user is prompted to scan an identifier, such as user access information 151, related to the item. In some embodiments, this may comprise, for example, scanning a computer readable bar code, receiving a radio frequency transmission, scanning a text string, or scanning any other feature identifying the item.

After prompting the user to scan the identifier as depicted in block 524C, the process 500C advances to block 526C, where the storage unit 100 receives data from the scanning of the identifier.

After receiving data from the scanning of the identifier as depicted in block 526C, the storage unit 100 prompts the user to confirm the pick-up of the item at block 528C. The process 500C then advances to decision state 530C where it determines whether a user signature is required. If a signature is required, the storage unit 100 prompts the user to provide a signature as depicted in block 532C. The storage unit then receives the signature as depicted in block 534C.

After receiving the signature as depicted in block 534C, or after determining that no signature is required in decision state 530C, the process 500C moves to block 536C and stores pick-up-information. This information may include, for example, the user identification, the user password, the image captured at the time of log-in, the user image captured at the time of pick-up or pick-up confirmation, the item number, and/or any other information relating to the item pick-up.

The process 500C then moves to block 538C and requests and receives information relating to the communications status of the storage unit 100. The process then proceeds to decision state 540C and determines whether the storage unit is online and able to communicate with other components of the storage unit system 400. If the storage unit is not online, the process moves to block 542C and waits until the communications with the storage unit system 400 have been reestablished and the storage unit 100 is online. After the storage unit 100 returns online, or if the storage unit is online in decision state 540C, the process moves to block 544C and the storage unit transmits the confirmation to the other components of the storage unit system 400. The process then terminates at block 546C.

Figure 10H:
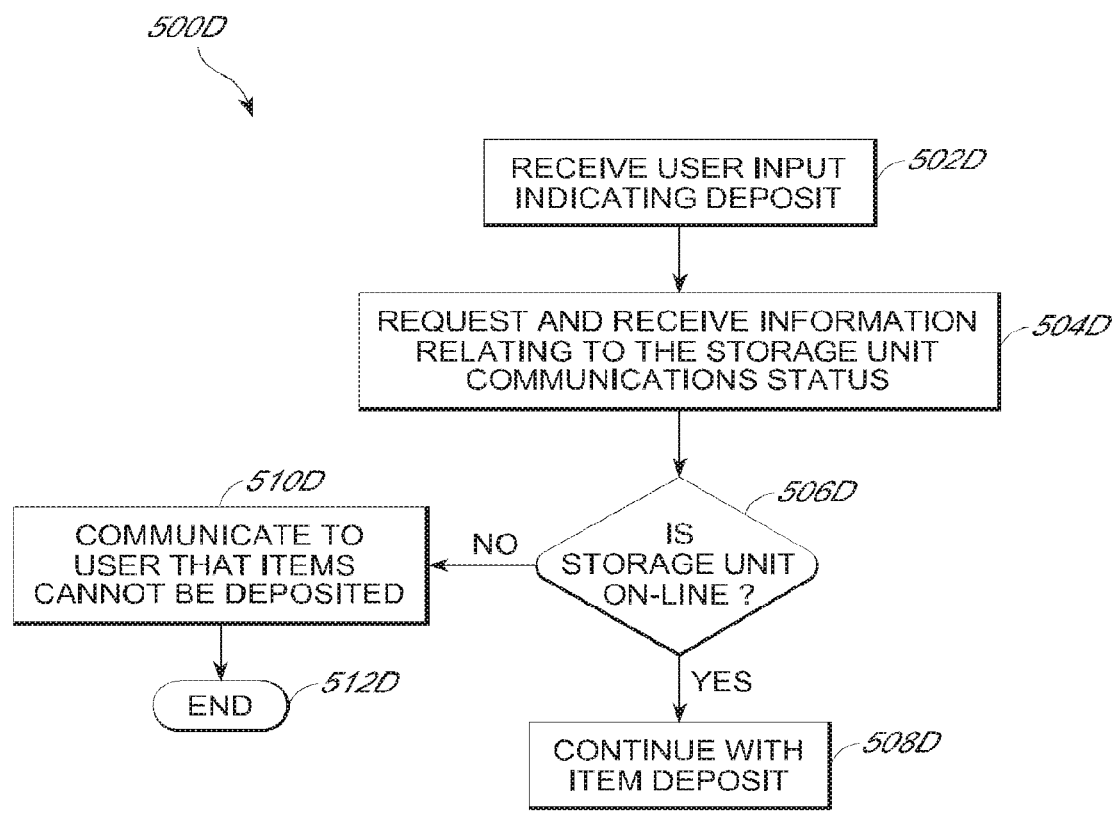

FIG. 10H depicts one embodiment of aspects of a process 500D for depositing items at a storage unit 100 that is functioning as part of a storage unit system 400. The process 500D begins at block 502D when the storage unit 100 receives a user input indicating intent to deposit an item. The process 500D moves to block 504D and requests and receives information relating to the storage unit 100 communications status, and specifically to the ability of the storage unit 100 to communicate with other components of the storage unit system 400.

The process then moves to decision state 506D and determines if the storage unit 100 is online and may communicate with other components of the storage unit system 400. If the storage unit is online, the process moves to block 508D, and the user continues with the deposit of the item following processes outlined in this specification.

If the storage unit 100 is not online and cannot communicate with other components of the storage unit system 400, then the process moves to block 510D and communicates to the user that items cannot be presently deposited. The process then terminates at block 512D.

Figure 10I:
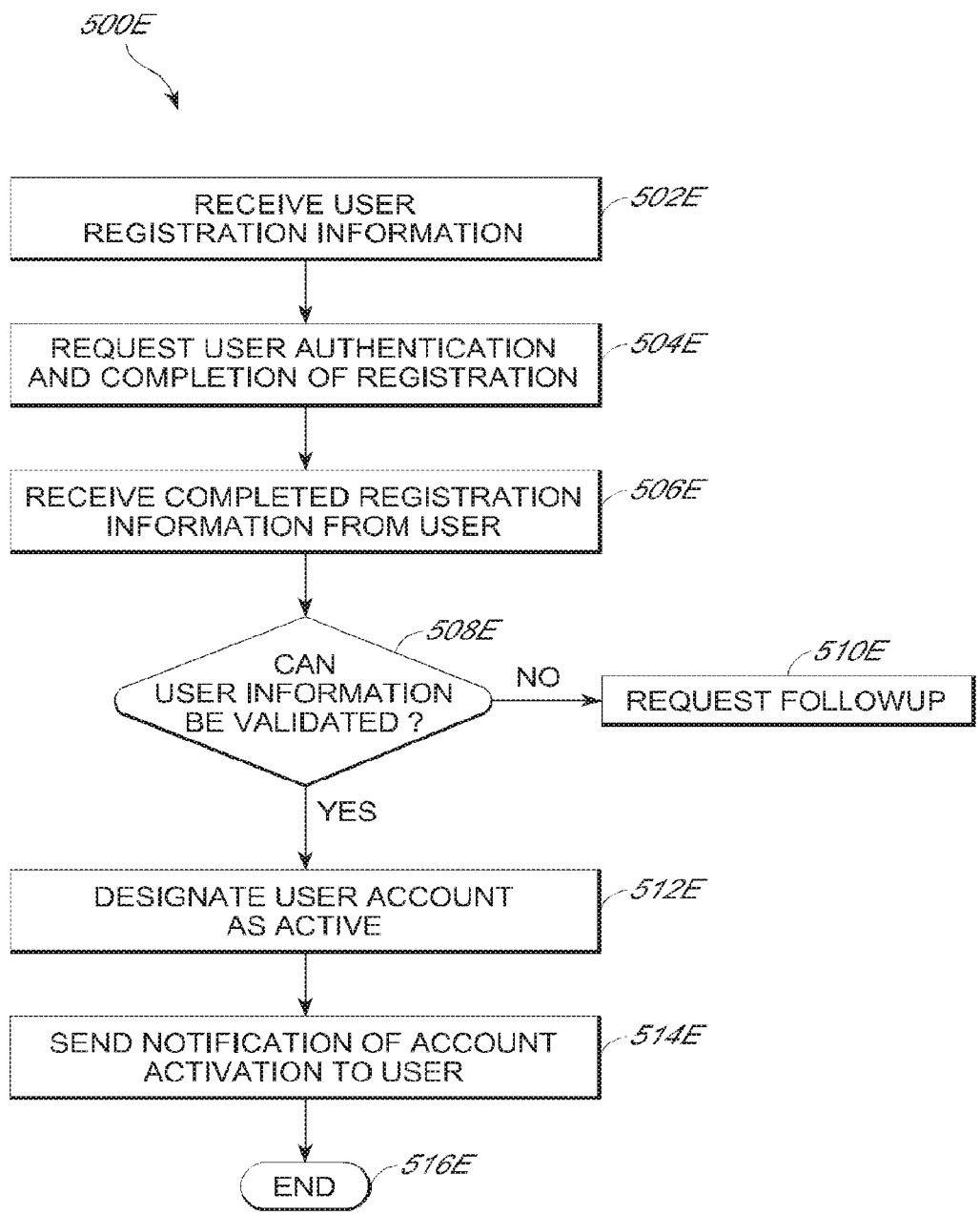

FIG. 10I depicts one embodiment of a process 500E for registering users to allow access to the storage units 402 of the storage unit system 400. Process 500E moves to block 502E and receives user registration information. In some embodiments, user registration information may be received in electronic or non-electronic form. In some embodiments, a user may fill out a registration form. This form may be, for example, delivered to an agent of the storage unit system 400 who can verify the user access information. In another embodiment, the user can fill out and submit an electronic form located, for example, on a website. This user access information may include, for example, a desired username, a desired password, the user's name, the user's address, the user's preferred storage unit 402 locations, the user's email address, the user's telephone number, and any other desired information.

The process then moves to block 504E and requests user authentication and completion of registration. The request may be made via any form of communication, including electronic communication, such as, for example, email, SMS, telecommunications, mail, or any other desired form of communication. The request for authentication and completion of registration may request verification of the already received information, further information about the user, and that the user contacts an agent of the storage unit system 400 for verification of user provided information.

The process then moves to block 506E and receives the completed and authenticated registration information from the user. The process then moves to decision state 508E and determines if the user access information may be validated. In some embodiments, the user access information is validated by comparison of user submitted information to public or secure information relating to the user. In some embodiments, the user access information is validated by a comparison to secure information maintained by a postal agency such as, for example the United States Postal Service.

If the user access information cannot be validated, the process 500E moves to block 510E and follow-up is requested from an agent 432 in order to determine whether the user access information was correct, or whether there is an error in the system. If the used information is validated, process 500E proceeds to block 512E and the user account is designated as active. The process then moves to block 514E and notification of account activation is sent to the user. Following notification, the process ends in block 516E. In some embodiments, this may include sending a user identification and user password for accessing the storage units 400. In some embodiments, this includes providing a computer readable card or object containing information uniquely identifying the user. A person of skill in the art will recognize that a variety of methods of identifying a user may be used and the present disclosure is not limited to any specific form of user identification.

In some embodiments, the storage unit system 400 facilitates the delivery of an item by tailoring delivery to a recipient's delivery preferences. The delivery preferences of a recipient may be provided to the storage unit system 400 upon deposit of the item. In some embodiments, the delivery preferences of a recipient may be provided upon registering as a customer or user of the storage unit system 400, and the delivery preferences may be stored in the customer data 412.

Figure 10J:
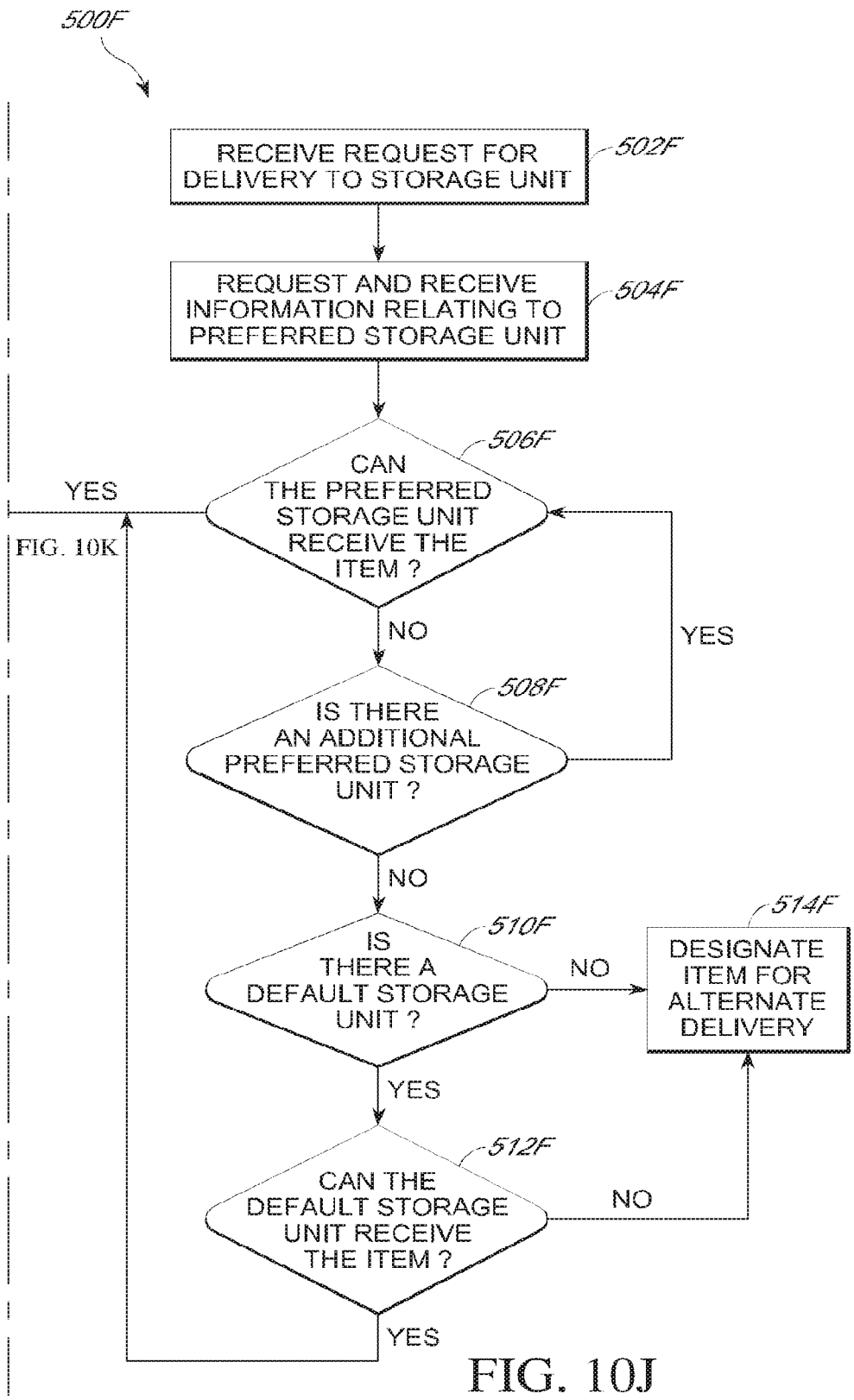
Figure 10K:
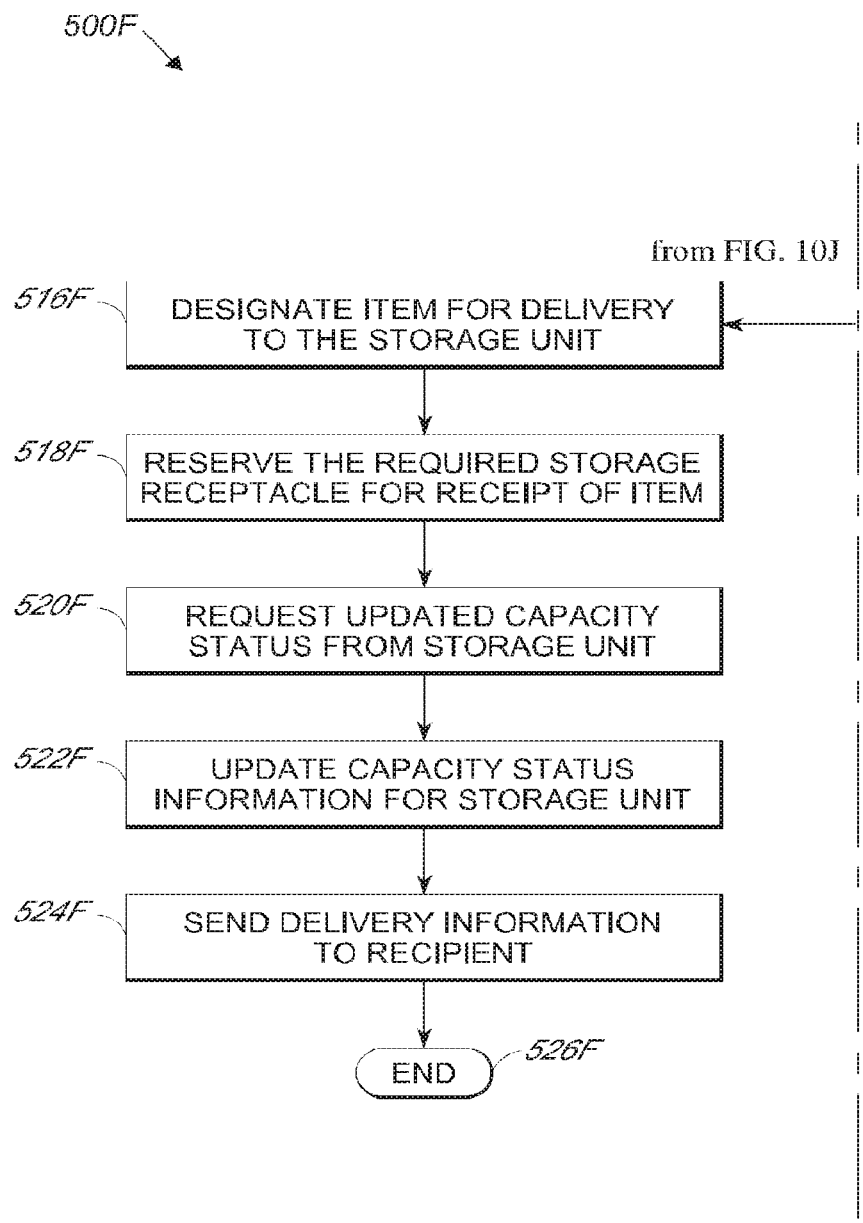

FIGS. 10J-10K depict one embodiment of process 500F used in connection with a storage unit system for delivering an item. The process 500F begins at block 502F and receives a request for delivery of an item to a storage unit 402. The process 502F then proceeds to block 504F and requests and receives information relating to a preferred storage unit 402. The preferred storage unit may be indicated by a user or customer upon depositing the item, or by the user when registering or signing up to use the storage unit system 412. In some embodiments, a customer may specify one or more preferred storage units 402 for receiving item delivery. In some embodiments, these preferences are ranked from most preferential to least preferential. In some further embodiments, a user is assigned a default storage unit 402. The default storage unit 402 may comprise a vast number of storage receptacles 132, and may be located, at, for example, a post office. Advantageously, evaluation of the availability of preferred storage units 402 based on their preference rank results in placement of the item in the most preferred storage unit 402 with an available storage receptacle 132 of adequate size to hold the item.

The process 500F then moves to block 506F and determines if the preferred storage unit can receive the item. If the evaluated storage unit 100 cannot hold the item, the process 500F moves to decision state 508F and determines if the customer has an additional preferred storage unit 402. If the customer has an additional preferred storage unit, then the process returns to block 506F and determines if that next preferred storage unit 402 can receive the item.

Returning to decision state 508F, if there are no additional preferred storage units, the process 500F moves to decision state 510F and determines if a default storage unit 402 is available. If a default storage unit 402 is available, then the process 500F moves to decision state 512F and determines if the default storage unit 402 can receive the item. If the default storage unit 402 cannot receive the item, or if there is no default storage unit 402, then the process moves to block 514F and the item is designated for alternate delivery. In some embodiments, alternate delivery may comprise in person delivery, or delayed delivery when one of the preferred or default storage units 402 can receive the item.

Returning again to decision state 512F, if the default storage unit can receive the item, or if one of the preferred storage units can receive the item, then the process moves to block 516F and the item is designated for delivery to the available storage unit 402.

The process then proceeds to block 518F and reserves the required storage receptacle 132 in the desired storage unit 402 for receipt of the item. In some embodiments, this reservation may be made through communication with the central management system 404. In some embodiments, the reservation is made by communication with the storage unit 402 to which the item will be delivered. In some embodiments, the reservation is made by a communication to both the storage unit 402 to which the item will be delivered and to the central management system 404. The reservation is communicated to central server 430, which maintains a database of the status of each storage receptacle 132 within storage unit system 400. The status includes which storage receptacles 132 are available, which are occupied, and which have been reserved, thus preventing the storage unit system 400 from reserving a particular storage receptacle 132 to more than one user or customer.

The process 500F then proceeds to block 520F and requests updated capacity status from the storage unit 402 to which the item will be delivered. The updated capacity status is then stored in the database 414 in the central management system 404, updating the capacity information for the storage unit as depicted in block 522F.

The process then moves to block 524F and communicates delivery information to the recipient. This information may be communicated with any communication method, including, for example, electronic communication, telecommunication, or postal communication, and the process terminates at block 526F.

Figure 11:
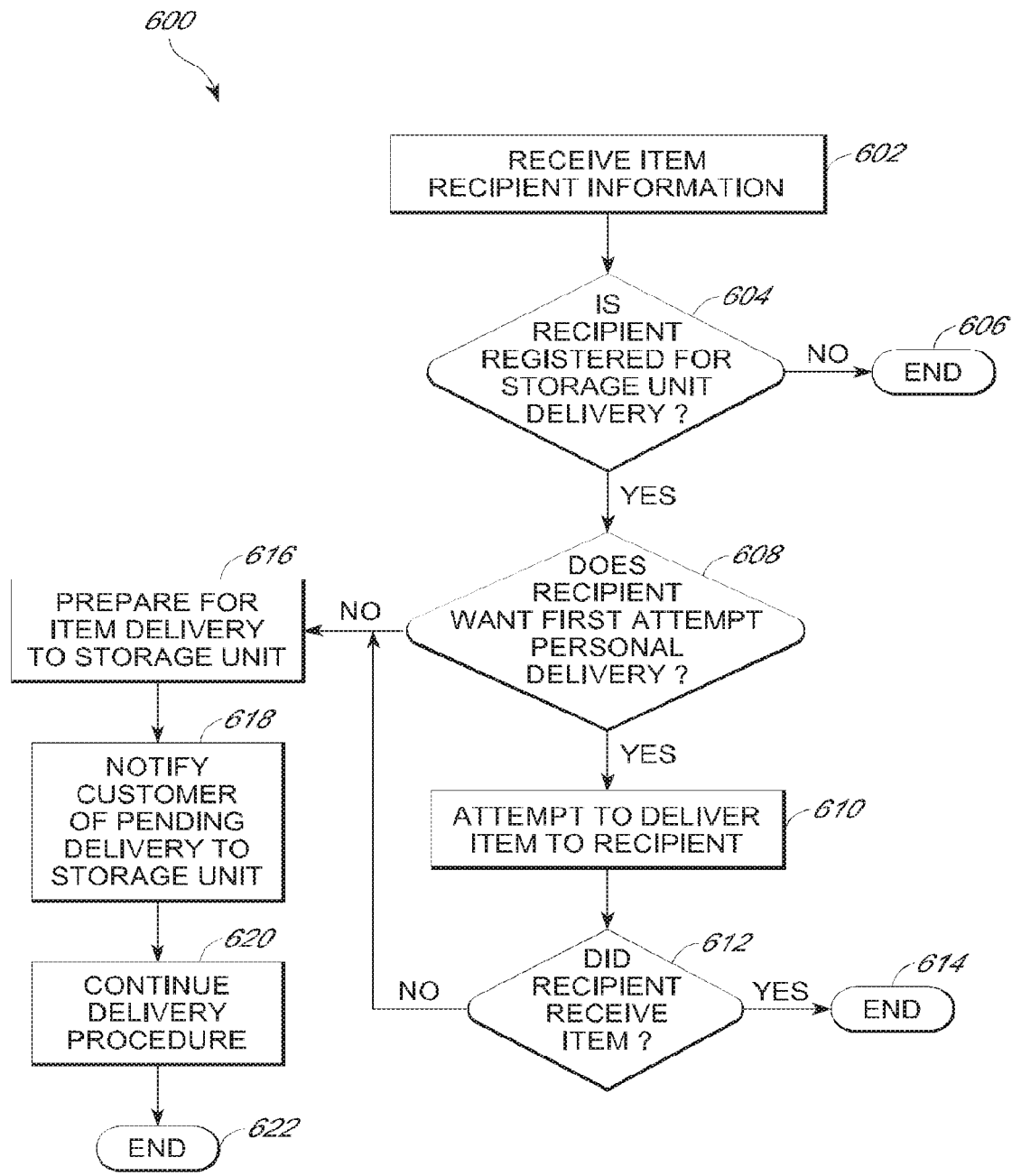
FIGS. 11-11B depict flow charts of different embodiments of a method of item delivery utilizing a storage unit system.

In some embodiments, the use of a storage unit system may affect methods of delivery an item. In some embodiments, the method of delivery is tailored to a customer preference. FIG. 11 depicts one exemplary process 600 for matching delivery to a customer's preference. The process 600 begins at block 602 and receives item recipient information. This information may include item information, recipient identification, recipient delivery preferences, recipient physical address, recipient storage unit address, and any other recipient information. The information may be provided by the user who deposits the item, or by a vendor or merchant who requests that an item be delivered via the storage unit system 400. The process then moves to decision state 604 and determines if the recipient is registered for storage unit delivery. If the recipient is not registered for storage unit delivery, the process is terminated at block 606.

If the recipient is registered for storage unit delivery, the process moves to decision state 608 and determines if the recipient has requested first attempt personal delivery. First attempt personal delivery occurs when the agent delivering the item makes a first attempt to deliver the item to the physical address or other specified location associated with the recipient. If the recipient wants first attempt personal delivery, then the process moves to block 610 and the agent attempts to deliver the item to the recipient. The process then moves to decision state 612 and determines if the recipient received the item by accessing pick-up confirmation information of control unit 144 or central server 430. If the recipient received the item, then the process terminates at block 614.

If the recipient did not receive the item, or if the recipient has noted that they do not desire first attempt personal delivery, then the process moves to block 616 and prepares for item delivery to a storage unit 402. In some embodiments, this may include placing a unique identification feature on the item, scanning the identification feature to enter the item into the system, entering the recipient information into the system so as to associate the recipient information with the item, and any other steps. In some embodiments, this information relating to the item identification and the recipient information is stored in the database 414 of the central management system 404.

The process then proceeds to block 618 and the customer is notified of the pending delivery to the storage unit 402. As mentioned above, this notification may be provided electronically, by telephone, or by writing. The process then proceeds to block 620 and the delivery procedure continues as outlined throughout this specification. After completion of the delivery procedure, the process terminates as depicted at block 622.

Figure 11A:
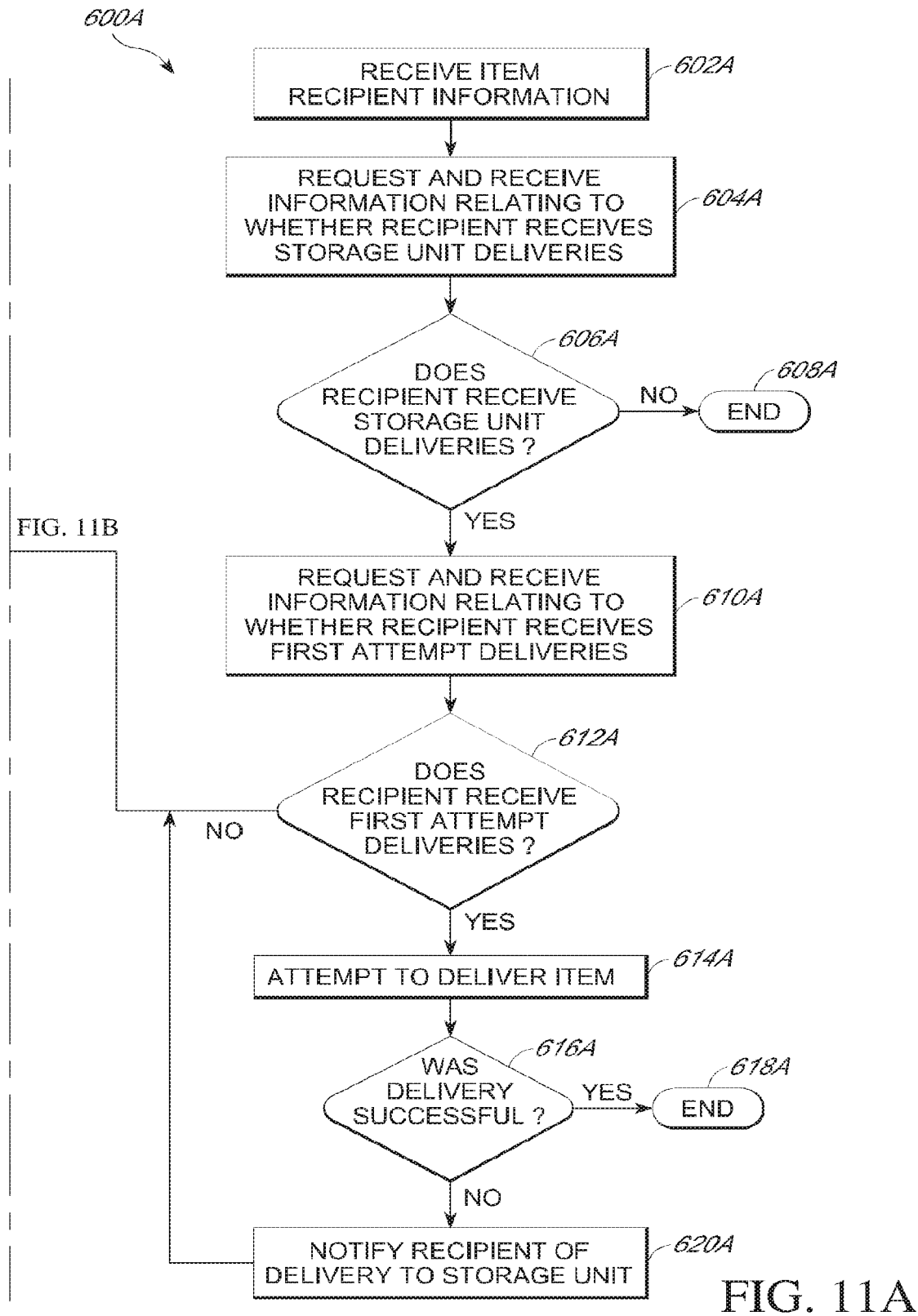
Figure 11B:
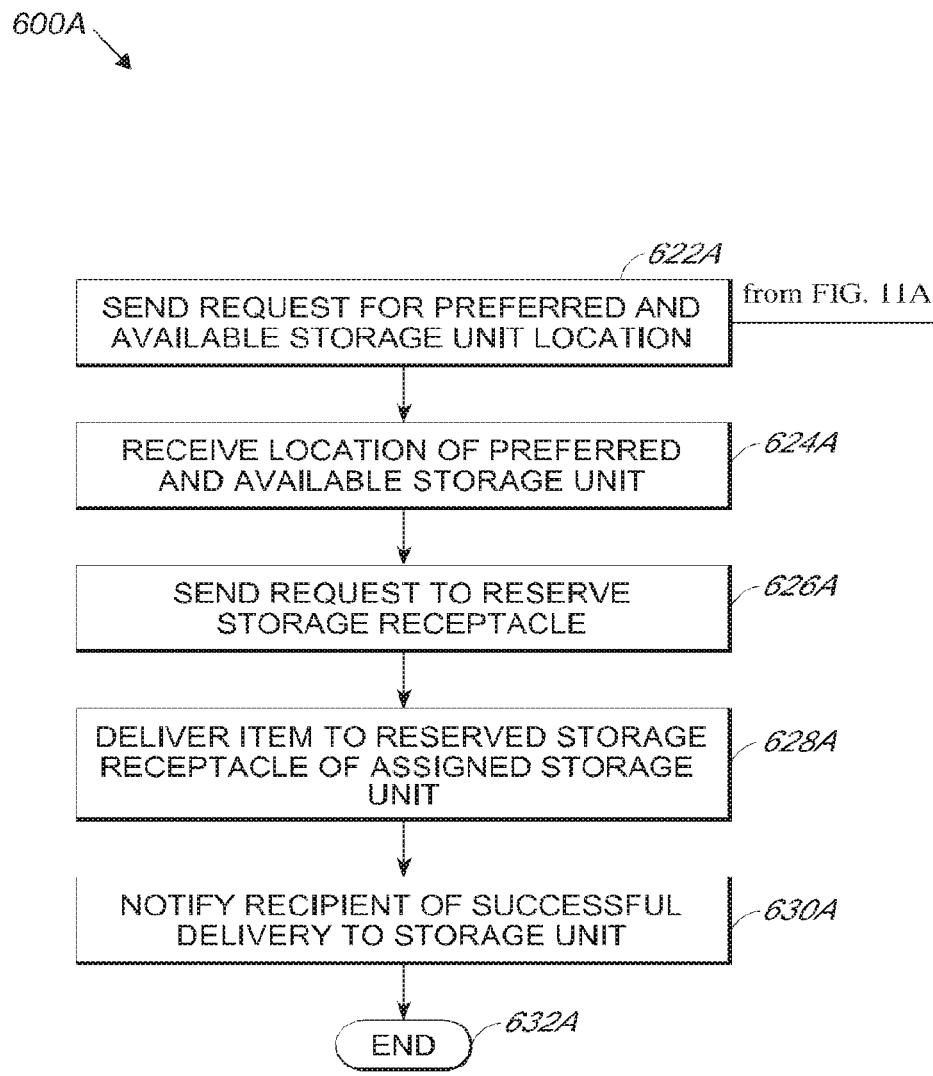

FIGS. 11A-11B depict one embodiment of a process 600A used by an agent in delivering an item. The process 600A may be performed by the agent with a device configured to network communication such as, for example, a computer, a Smartphone, a tablet, a handheld device with network access, a wireless device with network access, or any other device with network communication capability. The process 600A begins at block 602A when item recipient information is received. The process 600A continues to block 604A and requests and receives information relating to whether the recipient receives storage unit deliveries.

The process 600A continues at decision state 606A and determines if the recipient receives storage unit deliveries. If the recipient does not receive storage unit deliveries, the process 600A terminates at block 608A. If the recipient receives storage unit deliveries, the process 600A continues at block 610A and requests and receives information relating to whether the recipient receives first attempt deliveries.

The process 600A continues to decision state 612A and determines if the recipient receives first attempt deliveries. If the recipient receives first attempt deliveries, the process 600A continues to block 614A when delivery of the item is attempted. At decision state 616A, the process 600A determines if the delivery of the item was successful based on delivery status provided by an agent 432. If the delivery was successful, the process 600A terminates at block 618A. If the delivery attempt was unsuccessful, then the process 600A moves to block 620A and the recipient is notified of the pending delivery to the storage unit 402.

After notifying the recipient of the pending delivery to the storage unit 402, or if the recipient does not receive first attempt deliveries, the process 600A continues to block 622A and sends a request for the location of the preferred and available storage unit 402. At block 624A, the process 600A receives information relating to the location of the preferred and available storage unit 402. The process 600A continues to block 626A and sends a request to reserve an available storage receptacle 132.

The process 600A continues at block 628A where the item is delivered to the reserved storage receptacle 132 at the designated storage unit 402. At block 630A, the recipient is notified of the successful delivery of the item to the storage unit 402 and provided information relating to picking-up of the item from the storage unit 402. In some embodiments, this information may include a time frame in which pick-up is required, item identification information, any other information required to retrieve the item, and/or any other desired information. The process 600A then terminates at block 632A

In some embodiments, the storage unit 402 and/or storage unit system 400 is used to facilitate new types of deliveries. In one embodiment, for example, a customer storage unit address is used to facilitate anonymous delivery of items. As the customer storage unit address does not identify the customer or their physical address, the customer storage unit address may allow delivery of items to a customer without disclosing the identity of the customer to the originator of the item. This anonymity may facilitate customer safety and privacy in all transactions, and may be particularly beneficial in electronic transactions, or transaction of sensitive items.

In some embodiments, a storage unit 402 may be used as an unmanned sales merchant office. In one such embodiment, a storage unit 402 may be wholly or partly assigned for use to a merchant, and items ordered from the merchant are delivered to the storage unit 402. In some embodiments, these deliveries are available to registered users of the storage unit. In other embodiments, these deliveries are available to unregistered recipients of the storage unit 402. In embodiments in which a recipient is unregistered, a unique identifier is be used to identify the recipient to allow the recipient to pick-up the delivered item. In some embodiments, a government issued identification is be used as the unique identifier. In other embodiments, the merchant provides a unique identifier, such as a transaction number, a code, a password, a computer readable identifier, or any other unique identifier to the item recipient. Upon inputting of the unique identifier, the storage unit 402 allows the recipient to access their item.

In another embodiment, the storage unit 402 is be used in connection with day- and/or time-specific deliveries. In such an embodiment, the storage unit includes instruction not to allow access to the contents of storage receptacles containing the items for day- and/or time-specific delivery until the designated day and/or time has passed. Delivery capability may beneficially facilitate sales and deliveries of items having a particular release date, such as the release date of a product, including, for example, a book, a video, a device, a toy, or any other item.

In one embodiment, the storage unit system 400 is configured to enable proactive inventory management at the storage unit 402 and/or to enable customers to determine availability of storage receptacles at the delivery location before sending an item. Advantageously, such inventory management increases efficiency of operations.

In one embodiment, the storage unit system 400 is configured to provide a vendor, business entity, or other entity the ability to reserve a particular storage receptacle 132 on a one-time basis or on a subscription basis.

In one embodiment, a portion or all of the storage receptacles 132 at a given storage unit 402 may be assigned to a specific customer. In this embodiment, a customer may be assigned a specific storage receptacle 132, and only items for that customer are delivered to that receptacle 132.

In some embodiments, the systems and methods provide for keyless storage and/or retrieval of an item in a storage receptacle 132. Any of the processes described above with respect to FIGS. 8-11B may incorporate the various systems and methods of keyless storage and/or retrieval of an item in a storage receptacle 132 as described herein. In some embodiments, one of or all of the processes as shown in the flow charts of FIGS. 12A-13B are incorporated therein.

Figure 12A:
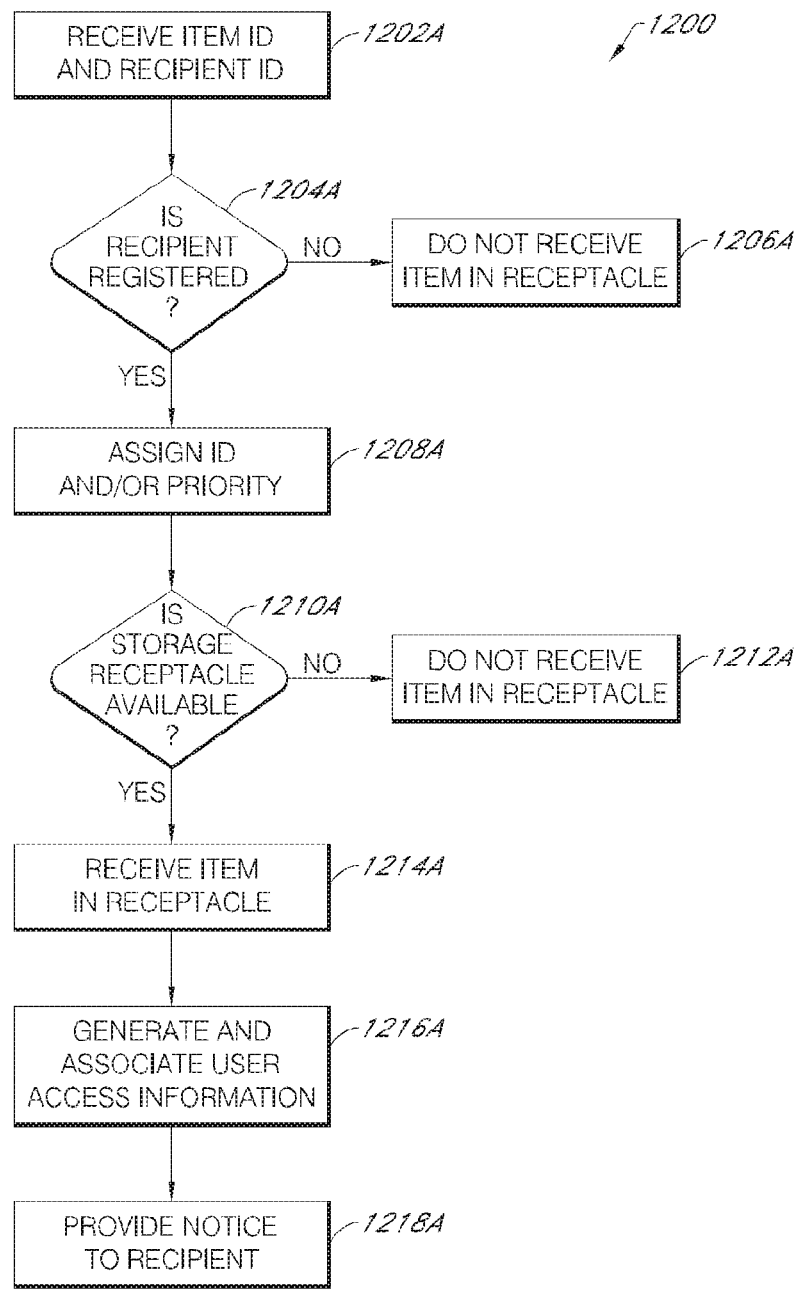
FIGS. 12A-12B depict flow charts of different embodiments of a method of item delivery utilizing a keyless storage unit system.

FIG. 12A depicts a flow chart of an embodiment of a method of item storage utilizing the storage system. In step 1202A, identification information is received that is related to the item and/or to the recipient. Such information may include, for example, a parcel or package number or other specification and the name of the person for whom it is being stored. This step may further include, for example, preliminarily receiving from a delivery agent an item such as a parcel to be stored in a receptacle, where the item is temporarily stored while the information is received. The agent may be opening a back side of a control unit or storage unit to access a computer, input device, printer and/or rear access of the storage receptacles. The system may also receive from the agent the item and/or recipient identification information. The information may include but is not limited to the identification of the recipient and/or the recipient's delivery location, such as a P.O. box, as well as data related to the item, such as its size.

The method then moves to decision step 1204A in which it is determined whether the intended recipient of the item is a registered user. This step may include, for example, accessing a registered user database to determine whether the recipient is registered. If the recipient is not a registered user, the method may move to step 1206A where the item is not received in a receptacle, for example it may be indicated that the item should be sent to a different delivery location, such as another storage system, or a Post Office for conventional pickup at a counter.

If the recipient is a registered user, the method then moves from decision step 1204A to step 1208A in which an identification and/or priority is assigned to the item. Assignment of such data may be manually entered, for example by the delivery agent, or it may be automatically generated by accessing data in a variety of databases, which are described in further detail herein for example with respect to FIG. 7B. The identification and priority, as discussed in further detail herein, may refer to the name of the recipient, the delivery location for the item, the level of priority given in using the storage system, etc. The priority in some embodiments is assigned based on data related to historical activity of the intended recipient and/or sender of the item. In some embodiments, a higher priority is given if the sender and/or recipient are frequent and/or efficient users of the system. Frequency may refer to how often the sender and/or recipient has used the system over a specified period of time. Efficiency may refer to how quickly an intended recipient has responded to and/or picked up an item in response to a notification that an item is available for pickup. In some embodiments, a lower priority is assigned if the sender and/or recipient are infrequent and/or inefficient users of the system.

The process then moves to decision step 1210A in which it is determined if a storage receptacle is available. A storage database may be accessed to determine if a storage unit or receptacle is available for the given item and/or recipient. Availability may be determined on the basis of the size of the item, and/or the identification and/or priority given to the item and/or recipient. If a storage receptacle is not available, then the process moves to step 1212A where it is indicated that the package should be sent to a different delivery location, such as another storage system, or a Post Office for conventional pickup at a counter.

If a storage receptacle is available, then the process moves from decision step 1210A to step 1214A and the item is received in the receptacle. The item may be received for example in the storage receptacle via a rear access to the receptacle from a delivery agent who physically places the item in the receptacle.

Figure 13A:
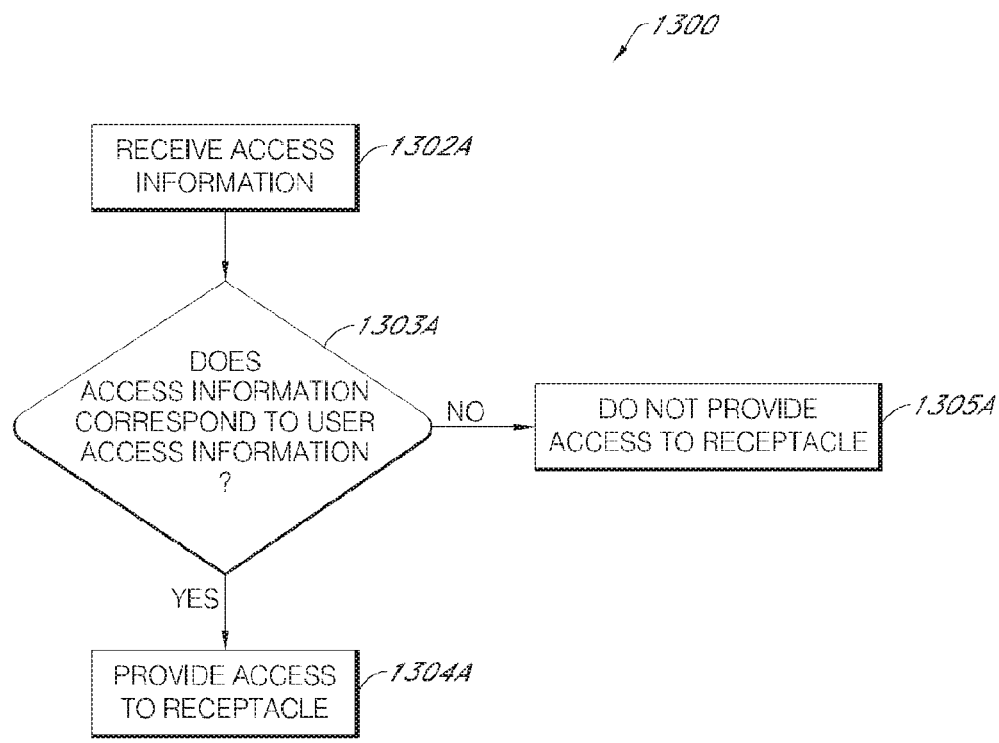
FIGS. 13A-13B depict flow charts of different embodiments of a method of item retrieval utilizing a keyless storage unit system.
Figure 13B:
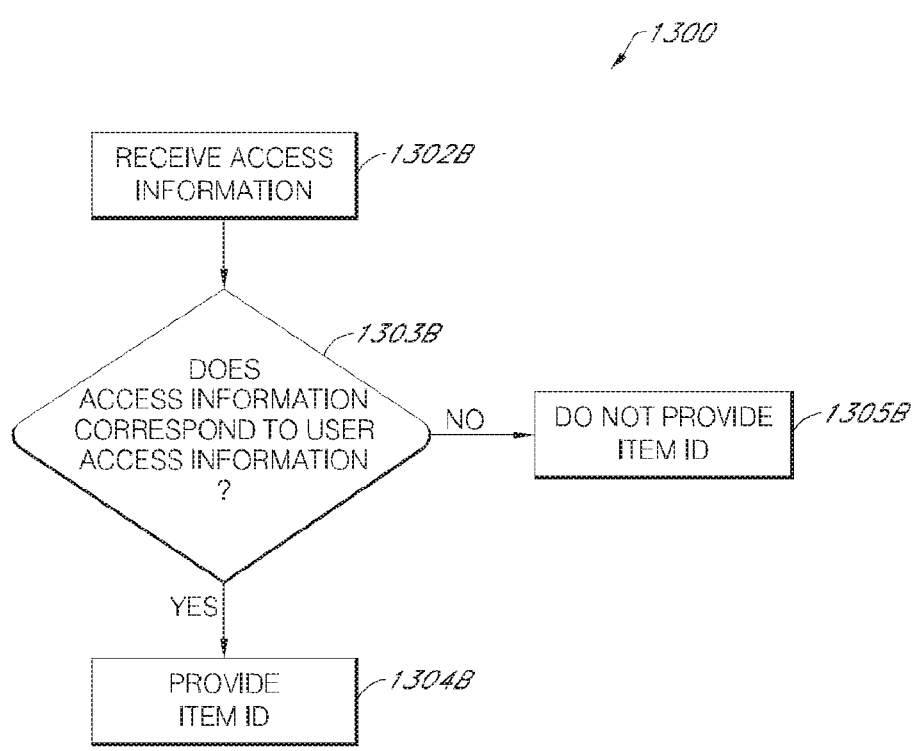

The process then moves to step 1216A in which user access information is associated with the item and/or recipient. The user access information, for example a PIN, may be stored in, or be otherwise accessible to, the control unit. The user access information, for example a bar code, may also be generated in this step. The user access information, as discussed in further detail herein for example with respect to FIG. 4, allows a user of the system to retrieve the item from the receptacle by providing access information to the system that is associated with or otherwise corresponds to the user access information. Access information, as discussed in further detail herein for example with respect to FIGS. 13A and 13B, is the information provided to the control unit to retrieve an item. The access information may be a PIN, an alphanumeric series of digits and/or letters, a bar code, a QR code, etc. Generating the user access information may include for example generating a random unique identifier using software and/or hardware in the control unit. It may further comprise sending such data to a printer for printing of the user access information. In some embodiments, the access information is the same as the user access information. For example, a receipt with a bar code may be the user access information that is generated and provided to the recipient. A user, for instance the recipient, may later present or otherwise provide that same receipt as the access information.

The process then moves to step 1218A in which notice, such as notice information 153, is provided to the recipient. As discussed in further detail herein for example with respect to FIG. 4, providing the notice to the recipient may comprise putting a message in the recipient's mailbox or P.O. box, emailing a message to the recipient, sending a text message to the recipient, putting a receipt in a recipient's mailbox or Post Office box, or otherwise physically and/or electronically sending a message to the recipient. The notice information 153 may comprise information regarding the item and/or retrieval of the item. For example, the message may indicate that an item is available in a receptacle for pickup, how long the recipient has to retrieve the item, information about the item such as the sender, the date delivered, etc. The notice information 153 may also comprise the user access information. For example, it may comprise a bar code, a QR code, a PIN code, etc.

Figure 12B:
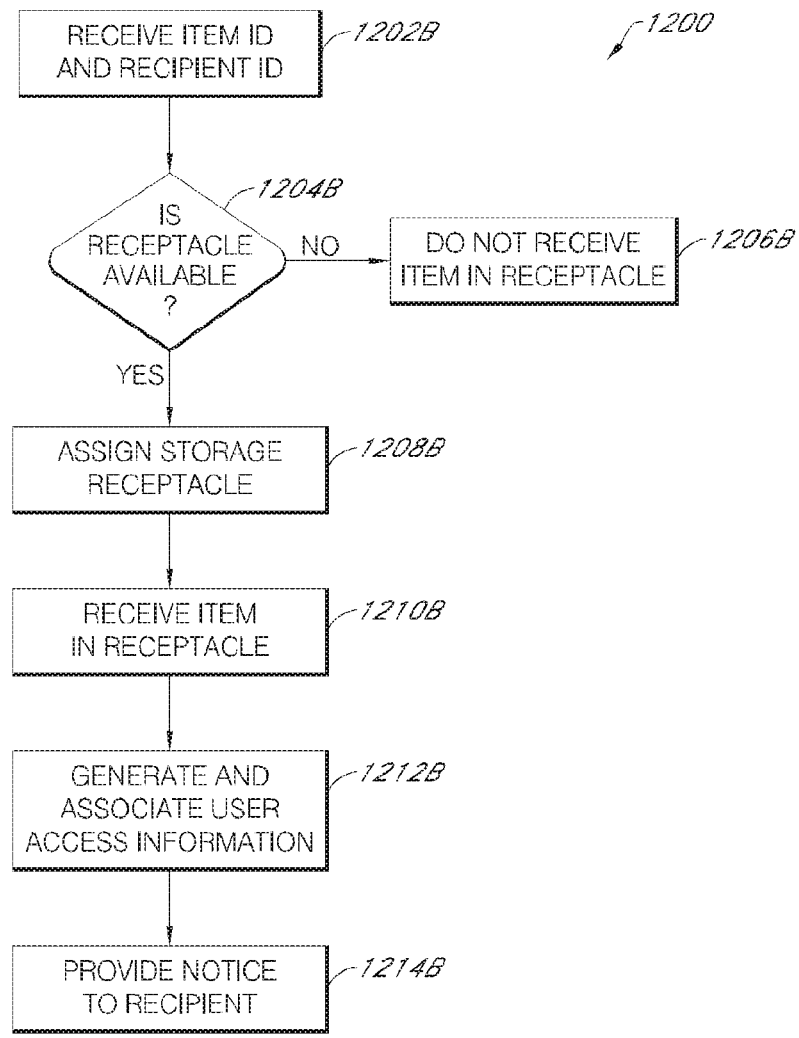

FIG. 12B depicts a flow chart of another embodiment of a method of item delivery utilizing the storage system. The method begins with step 1202B in which an item and/or recipient identification information is received. Such information may include, for example, a parcel or package number or other specification and the name of the person for whom it is being stored. This step may further include, for example, preliminarily receiving from a delivery agent an item such as a parcel to be stored in a receptacle, where the item is temporarily stored while the information is received. This step may further include, for example, preliminarily receiving from a delivery agent an item such as a parcel to be stored in a receptacle, where the item is temporarily stored while the information is received. The agent may be opening a back side of a control unit or storage unit to access a computer, input device, printer and/or rear access of the storage receptacles. The agent may enter the item and/or recipient identification information into the computer, including but not limited to the identification of the recipient and/or the recipient's delivery location, such as a P.O. box, as well as data related to the item, such as its size.

The process then moves to decision step 1204B in which it is determined whether a receptacle is available for storing the item. This step may involve any of the features described above with respect to step 1210A in FIG. 12A. If a receptacle is not available for storing an item, then the process moves to step 1206B and indicates that the item should be sent to a different delivery location, such as another storage system, or a Post Office for conventional pickup at a counter. If a receptacle is available, then the process moves from step 1204B to step 1208B. In step 1208B a storage receptacle in which to store the item is assigned. This step may involve any of the features described above with respect to step 1208A in FIG. 12A related to assigning an identification and/or priority to the item and/or recipient of the item.

Next, the process moves to step 1210B where the item is received in the receptacle. This may include, for example, receiving the item in the storage receptacle via a rear access to the receptacle from a delivery agent who physically places the item in the receptacle.

The process then moves to step 1212B in which user access information is associated with the item and/or recipient. The user access information, for example a PIN, may be stored in, or be otherwise accessible to, the control unit. The user access information, for example a bar code, may also be generated in this step. The user access information, as discussed in further detail herein for example with respect to FIG. 4, allows a user of the system to retrieve the item from the receptacle by providing the access information to the system that is associated with or otherwise corresponds to the user access information. Access information, as discussed in further detail herein for example with respect to FIGS. 13A and 13B, is information or data provided to the control unit by a user of the system. The access information may be a PIN, an alphanumeric series of digits and/or letters, a bar code, a QR code, a fingerprint, a retina, a non-alphanumeric code used for challenge-response authentication, etc. Generating the user access information may include for example generating a random unique identifier using software and/or hardware in the control unit. It may further comprise sending such data to a printer for printing of the user access information. In some embodiments, the access information is the same as the user access information. For example, a receipt with a bar code may be the user access information that is generated and provided to the recipient. A user, for instance the recipient, may later present or otherwise provide that same receipt as the access information.

Then the method moves to step 1214B wherein notice, such as notice information 153, is provided to the recipient of the item. As discussed in further detail herein for example with respect to FIG. 4, providing the notice information 153 to the recipient may comprise putting a message in the recipient's mailbox or P.O. box, emailing a message to the recipient, sending a text message to the recipient, putting a receipt in a recipient's mailbox Post Office box, or otherwise physically and/or electronically sending a message to the recipient. The notice information 153 may comprise information regarding the item and/or retrieval of the item. For example, the message may indicate that an item is available a receptacle for pickup, how long the recipient has to retrieve the item, information about the item such as the sender, the date delivered, etc. The notice information 153 may also comprise the user access information. For example, it may comprise a bar code, a QR code, a PIN, etc.

FIG. 13A depicts a flow chart of an embodiment of a method 1300 of item retrieval utilizing the storage system. The method 1300 may begin with step 1302A in which access information is received. The access information is information or data provided to the interface 151 of a control unit by a user of the system. In some embodiments, the access information may be a PIN, an alphanumeric series of digits and/or letters, a bar code, a QR code, a fingerprint, a retina, etc. Receiving the access information may therefore include, for example, receiving a PIN entered on a number pad, receiving a series of letters and/or numbers on a touch screen, scanning a bar code on a receipt or QR code on a mobile phone, reading a fingerprint with a fingerprint scanner, scanning a retina with a retina scanner, etc. This step may also include receiving access information in digital format, for example by wireless communication with a device (e.g., a mobile phone, via Bluetooth/NFC/Internet etc.), wired communication with a device (for example, a key fob). The access information may be received at the control unit 144 or storage unit 100 or at a remote location such as a home computer or on a mobile device.

The method 1300 may then move to decision step 1303A wherein it is determined if the access information corresponds to the user access information. In some embodiments, the access information is compared to the user access information. For instance, a PIN that is received in step 1302A may be compared to stored user access information. In some embodiments, a scanned bar code or QR code is compared to stored user access information. If the access information does not correspond to the user access information, then the method 1300 moves to step 1305A wherein access is not provided to the receptacle. If the access information does correspond to the user access information, then the method 1300 moves to step 1304A wherein access is provided to the receptacle.

In step 1304A, access to the storage receptacle is provided. This may include any of the features or steps discussed above with respect to unsecuring or unlocking the receptacle. It may further include providing information related to the location of the receptacle in the unit or the method of opening and/or unlocking the receptacle. For instance, it may include directions on how to open and/or close the receptacle. It may further include allowing a user to retrieve the item and then automatically closing and/or securing/locking the receptacle after retrieval. In some embodiments, as discussed in further detail herein for example with respect to FIGS. 7A-7C, the control unit 144 may be separate from the storage receptacle. Therefore, in some embodiments, step 1302A may be done in a different physical location than step 1304A. Many other variations and configurations of this step are possible even though not explicitly addressed herein and are within the scope of the present disclosure.

FIG. 13B depicts a flow chart of another embodiment of a method 1300 of item retrieval utilizing the storage system. The method 1300 may begin with step 1302B in which access information is received. The access information is information or data provided to the interface 151 of a control unit by a user of the system. In some embodiments, the access information may be a PIN, an alphanumeric series of digits and/or letters, a bar code, a QR code, a fingerprint, a retina, etc. Receiving the access information may therefore include, for example, receiving a PIN entered on a number pad, receiving a series of letters and/or numbers on a touch screen, scanning a bar code on a receipt or QR code on a mobile phone, reading a fingerprint with a fingerprint scanner, scanning a retina with a retina scanner, etc. This step may also include receiving access information in digital format, for example by electronic communication over the internet from a user. The access information may be received at the control unit 144 or storage unit 100 or at a remote location such as a home computer or on a mobile device.

The method 1300 may then move to decision step 1303B wherein it is determined if the access information corresponds to the user access information. In some embodiments, the access information is compared to the user access information. For instance, a PIN that is received in step 1302B may be compared to stored user access information. In some embodiments, a scanned bar code or QR code is compared to stored user access information. If the access information does not correspond to the user access information, then the method 1300 moves to step 1305B wherein access is not provided to the receptacle. If the access information does correspond to the user access information, then the method 1300 moves to step 1304B.

In step 1304B, an item identification is provided to a recipient or user of the system. The item identification may include for example the location of the storage receptacle, the sender of the item, the recipient of the item, a time period for pickup of the item, or any other data related to the item. In some embodiments, and as discussed in further detail herein for example with respect to FIGS. 7A-7C, the control unit 144 may be separate from the storage receptacle. Therefore, in some embodiments, step 1302B may be done in a different physical location than step 1304B. Many other variations and configurations of this step are possible even though not explicitly addressed herein and are within the scope of the present disclosure.

Figure 14:
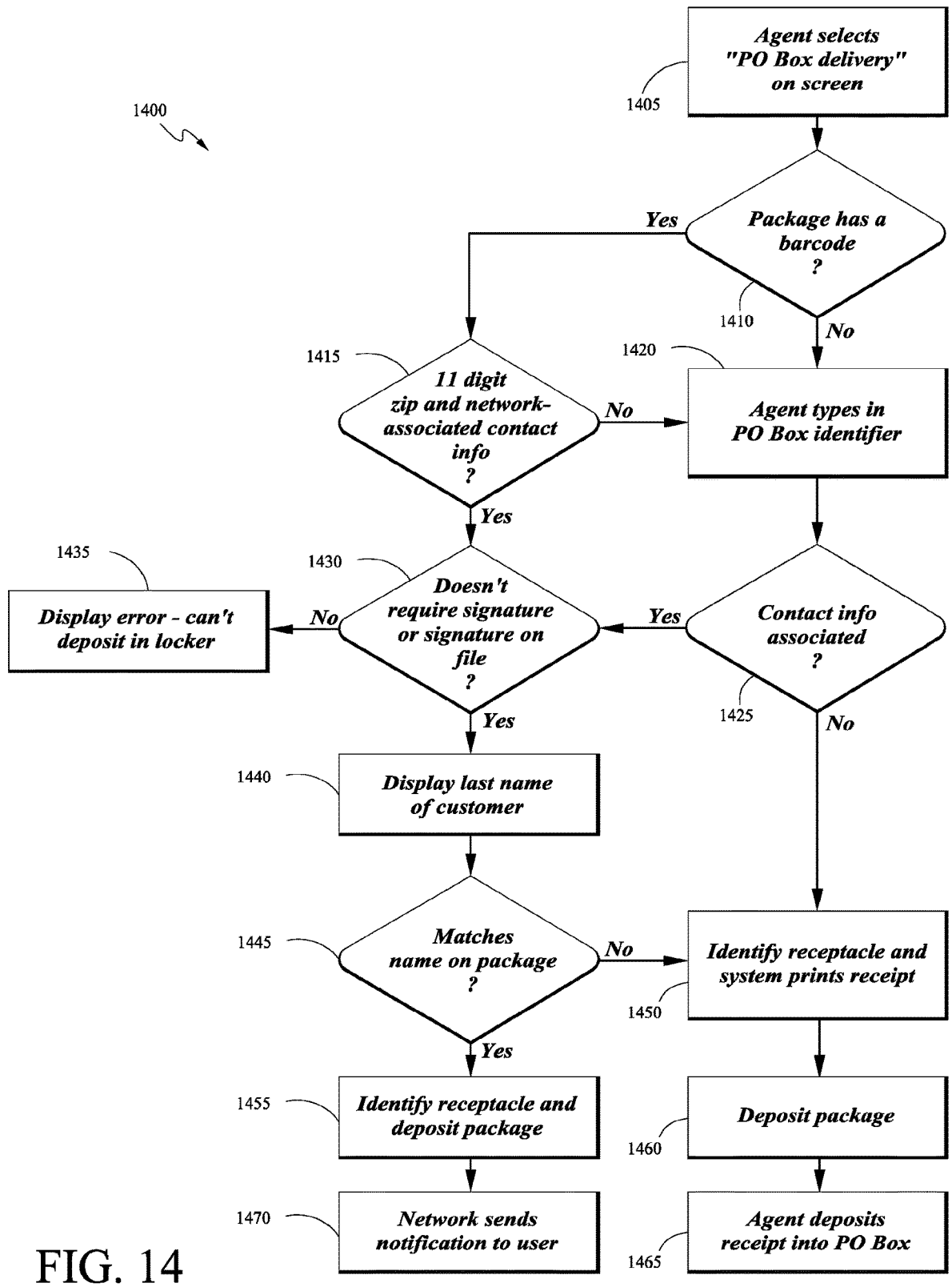
FIG. 14 depicts a flow chart of an embodiment of a method of delivery of an item to a P.O. Box recipient using a storage unit.

FIG. 14 depicts a flow chart of an embodiment of a method 1400 of delivery of an item to a P.O. Box recipient using a storage unit. The method 1400 may be used when delivering an item to a recipient having a typical P.O. Box or other temporary mail box, storage, etc. in which the recipient may receive mail or other item deliveries for later pickup by the recipient. In some embodiments, the method 1400 may be used to deliver items to recipients who use the boxes 163 described with respect to FIG. 5. These are just some examples and other P.O. Boxes, temporary storage boxes, etc. may be used by the recipient.

The method 1400 begins with step 1405 wherein a delivery agent, such as a mail delivery person, selects "P.O. Box" on a screen of a storage unit. In some embodiments, the delivery agent may first log into the computer 135, which may contain the screen 148. In some embodiments, the screen 148 as described with respect to FIGS. 1G and 3A-3C may be used to choose the P.O. Box method. If the recipient is using a different temporary storage box other than a P.O. Box, the delivery agent may select another appropriate selection in step 1405. For example, in step 1405 the delivery agent may select "Temporary Storage Box," and the like.

The method 1400 then moves to decision state 1410 wherein it is determined if the item being delivered, such as a package, has a barcode or other readable identifier. In some embodiments, the item may have a barcode, QR code, or other readable identifier that can be read by a scanner or other machine of the storage unit. The delivery agent may examine the item to determine whether it contains such an identifier. In some embodiments of decision state 1410, the bar code or other identifier may be read by the input device 147, described with respect to FIG. 1G. If the item has a bar code or other readable identifier, the method 1400 then moves to decision state 1415. If the item does not have a bar code or other readable identifier, the method 1400 then moves to step 1420.

In decision state 1415, it is determined whether the scanned identifier, such as a bar code, is associated with a zip code, such as an 11-digit zip code, and/or other information associated with a recipient. In some embodiments, data stored in a computer or other storage device is searched or otherwise accessed, for example the memory 170 as described with respect to FIG. 6, the user database 173 described with respect to FIG. 7B, and the like. In some embodiments, a network is utilized, such as the network 169 described with respect to FIG. 7A. Further, in addition or alternatively, other information may be searched in decision state 1415. For example, other information besides zip codes and/or other recipient information may be searched for, such as other personal identification information. The zip code or other identification information may be searched for in order to determine whether it is associated with a recipient in order to determine certain information associated with the recipient, such as name, contact method, whether they have a signature on file, etc. If it is determined in decision state 1415 that such information is associated with a recipient, then the method 1400 moves to decision state 1430. If it is determined in decision state 1415 that such information is not associated with a recipient, then the method 1400 moves to step 1420.

In step 1420, the delivery agent may enter a P.O. Box identifier or other storage box information associated with the recipient. For example, if the bar code lookup fails, or if there is no bar code, then the delivery agent may manually enter a P.O. Box identifier, or other temporary storage box number, or other recipient identifier. In some embodiments, the delivery agent may enter such information using the input device 147 or screen 148, such as a touch screen, as described for example with respect to FIG. 1G.

After step 1420, the method 1400 then moves to decision state 1425 wherein it is determined whether contact information of the recipient is associated with the information entered in step 1420. In some embodiments, decision step 1425 may use the information entered in step 1420, such as a P.O. Box number, and search a database. For instance, the database 171 or memory 170, as described for example in FIG. 6, and/or the database 174 described with respect to FIG. 7B, may be searched to determine whether a recipient name or other contact information is associated with the information. In some embodiments, a network, such as the network 169 described with respect to FIGS. 7A-7B, may be utilized to search an external database. If it is determined in decision state 1425 that no contact information is associated with the information, then the method 1400 moves to step 1450. If it is determined in decision state 1425 that contact information is associated with the information, then the method 1400 moves to decision state 1430.

In decision state 1430, it is determined whether a signature is required or whether a signature is on file. In some embodiments, the database 171 or memory 170, as described for example in FIG. 6, and/or the database 174 described with respect to FIG. 7B, may be searched to determine whether a signature is required or if a signature is already possessed by the system. In some embodiments, a network, such as the network 169 described with respect to FIGS. 7A-7B, may be utilized to search an external database for a signature requirement or if a signature is already possessed. If it is determined in decision state 1430 that a signature is required and that the recipient does not have a signature on file, then the method 1400 moves to step 1435. If it is determined in decision state 1430 that a signature is not required, or alternatively that a signature is required and the recipient has a signature on file, then the method 1400 moves to step 1440.

In step 1435, a message indicating that the item cannot be deposited in a storage unit is communicated to the delivery agent. In some embodiments, an error message is displayed. For example, the screen 148 may display an error message indicating that the storage unit 100 or the receptacle 132 cannot be used to deliver the item.

In step 1440, information indicating the identity of the recipient is communicated to the delivery agent. In some embodiments, the last name of a customer recipient is displayed. For example, the screen 148 may display the last name or other recipient-identifying information. After step 1440, the method 1400 then moves to decision state 1445.

In decision state 1445, it is determined whether the recipient-identifying information communicated in step 1440 corresponds to the recipient name on the item to be delivered. In some embodiments, the name on a box or other package being delivered is compared to the last name displayed in step 1440. For example, the delivery agent may examine the name on an item being delivered and compare it to the last name displayed in step 1440 to determine whether they match. If it is determined in decision state 1445 that the recipient-identifying information communicated in step 1440 corresponds to the recipient name on the item to be delivered, then the method 1400 moves to step 1455. If it is determined in decision state 1445 that the recipient-identifying information communicated in step 1440 does not correspond to the recipient name on the item to be delivered, then the method 1400 moves to step 1450.

In step 1450, a receptacle is identified for delivery of the item and notice information, such as a receipt, is produced. In some embodiments, the control unit 144 identifies an available receptacle 132 of the storage unit 100. The identified receptacle can be included in the notice information, which may be on a receipt. In some embodiments, a receipt may be printed. For example, the printer 152 may print the receipt 149, as described respectively with respect to FIGS. 1G and 4. In some embodiments, the notice information 153, as described with respect to FIG. 4, is produced. For example, in addition or alternatively to a receipt, a text message or other communication may be produced. After step 1450, the method 1400 then moves to step 1460 wherein the item to be delivered is deposited in the receptacle. In some embodiments, the door 136 of the receptacle 132 may open automatically. In some embodiments, the item may be placed into the receptacle 132 by the delivery agent. In some embodiments, the door 136 of the receptacle 132 may be closed by the delivery agent. After step 1455, the method 1400 then moves to step 1465, wherein the notice information is communicated to the recipient. In some embodiments, the receipt may be deposited into the P.O. Box of the recipient. For example, the delivery agent may place the receipt into one of the boxes 163 described with respect to FIG. 5. In some embodiments, a text or electronic mail message may be sent to the recipient. For example, the network 169 may be utilized to send an electronic communication.

In step 1455, a receptacle is identified for delivery of the item and the item is deposited in the receptacle. In some embodiments, the control unit 144 identifies an available receptacle 132 of the storage unit 100. In some embodiments, one of the receptacles 132 as described with respect to FIG. 1A may be identified. In some embodiments, the door 136 of the receptacle 132 may open automatically. In some embodiments, the item may be placed into the receptacle 132 by the delivery agent. In some embodiments, the door 136 of the receptacle 132 may be closed by the delivery agent. After step 1455, the method 1400 then moves to step 1470.

In step 1470, a communication is sent to the recipient indicating that the recipient has an item in a receptacle for pickup. In some embodiments, the notice information 153 is communicated to the recipient. For example, the network 169 may be utilized to send an electronic communication that includes the receptacle-identifying information, address or location of the storage unit 100 and/or receptacle, a bar code to be scanned, etc.

Figure 15:
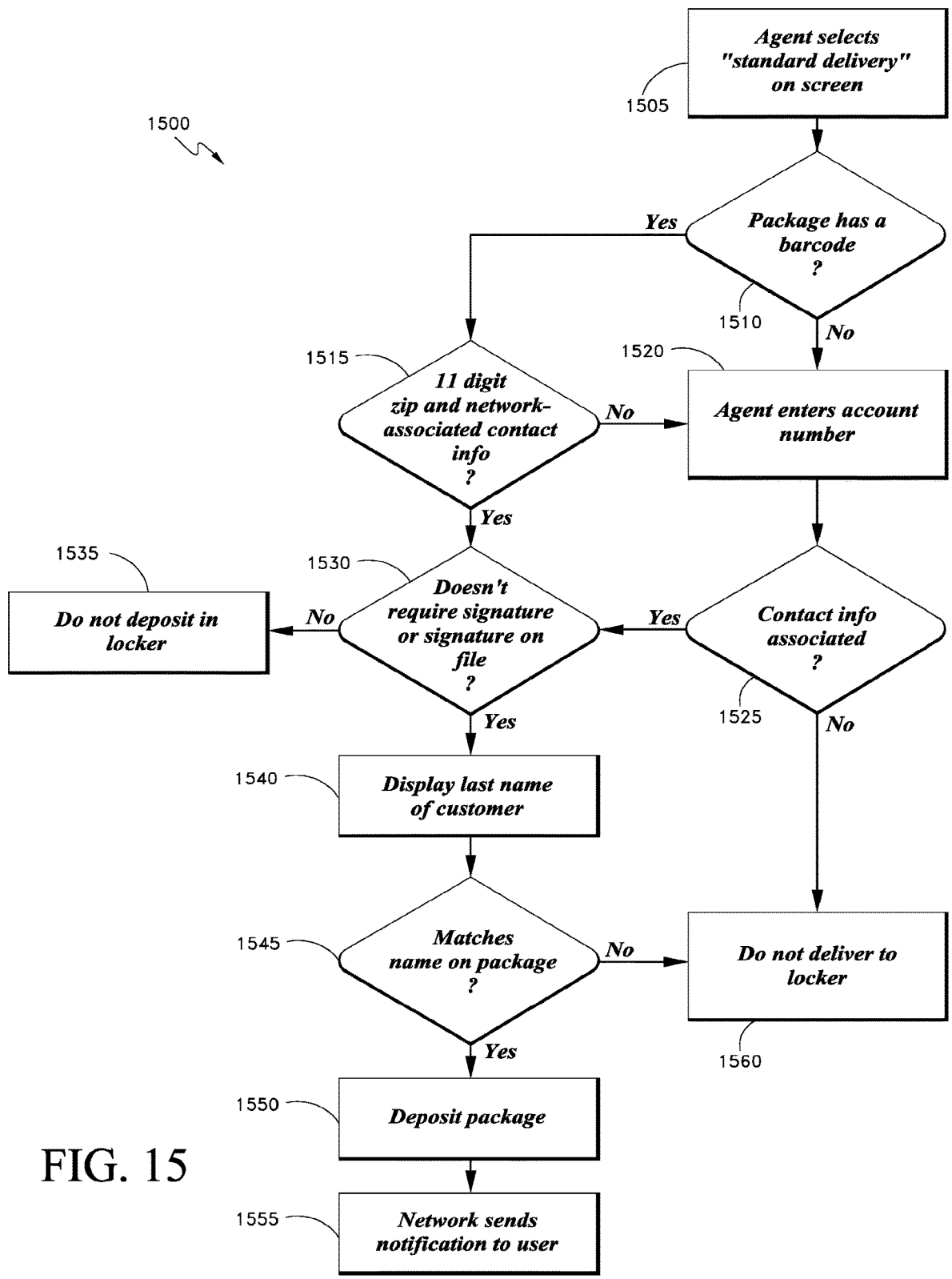
FIG. 15 depicts a flow chart of an embodiment of a method of standard delivery of an item using a storage unit.

FIG. 15 depicts a flow chart of an embodiment of a method 1500 of standard delivery of an item using a storage unit 100. In some embodiments, the storage unit 100 may be used with the method 1500.

The method 1500 begins with step 1505 wherein a delivery agent, such as a mail delivery person, selects "Standard Delivery," or other delivery option, on an input device, such as screen 148, of a storage unit 100. In some embodiments, the delivery agent may first log into the computer 135. In some embodiments, the screen 148 as described with respect to FIGS. 1G and 3A-3C may be used.

The method 1500 then moves to decision state 1510 wherein it is determined if the item being delivered, such as a package, has a barcode or other readable identifier. Decision state 1510 may be similar to decision state 1410 described with respect to method 1400 in FIG. 14. In decision state 1510, if the item has a bar code or other readable identifier, the method 1500 then moves to decision state 1515. If the item does not have a bar code or other readable identifier, the method 1500 then moves to step 1520.

In decision state 1515, it is determined whether the scanned identifier, such as a bar code, is associated with a zip code, such as an 11-digit zip code, and/or other information associated with a recipient. Decision state 1515 may be similar to decision state 1415 described with respect to method 1400 in FIG. 14. In decision state 1515, if it is determined that such information is associated with a recipient, then the method 1500 moves to decision state 1530. If it is determined in decision state 1515 that such information is not associated with a recipient, then the method 1500 moves to step 1520.

In step 1520, the delivery agent may enter in information associated with the recipient. Step 1520 may be similar to step 1420 described with respect to method 1400 in FIG. 14. For example, if the bar code lookup fails, or if there is no bar code, then the delivery agent may manually enter the recipient's name, account number, etc. In some embodiments, the delivery agent may enter such information using the input device 147 or screen 148, such as a touch screen, as described for example with respect to FIG. 1G.

After step 1520, the method 1500 then moves to decision state 1525 wherein it is determined whether contact information of the recipient is associated with the information entered in step 1520. Decision state 1525 may be similar to decision state 1425 described with respect to method 1400 in FIG. 14. If it is determined in decision state 1525 that no contact information is associated with the information, then the method 1500 moves to step 1560. In step 1560, the item is not delivered using the storage unit and is instead delivered using alternative delivery methods. If it is determined in decision state 1525 that contact information is associated with the information, then the method 1500 moves to decision state 1530.

In decision state 1530, it is determined whether a signature is required or whether a signature is on file. Decision state 1530 may be similar to decision state 1430 described with respect to method 1400 in FIG. 14. If it is determined in decision state 1530 that a signature is required and that the recipient does not have a signature on file, then the method 1500 moves to step 1535. If it is determined in decision state 1530 that a signature is not required, or alternatively that a signature is required and the recipient has a signature on file, then the method 1500 moves to step 1540.

In step 1535, a message indicating that the item cannot be deposited in a storage unit is communicated to the delivery agent. Step 1530 may be similar to step 1435 described with respect to method 1400 in FIG. 14.

In step 1540, information indicating the identity of the recipient is communicated to the delivery agent. Step 1540 may be similar to step 1440 described with respect to method 1400 in FIG. 14. After step 1540, the method 1500 then moves to decision state 1545.

In decision state 1545, it is determined whether the recipient-identifying information communicated in step 1540 corresponds to the recipient name on the item to be delivered. Decision state 1545 may be similar to decision state 1445 described with respect to method 1400 in FIG. 14. If it is determined in decision state 1545 that the recipient-identifying information communicated in step 1540 corresponds to the recipient name on the item to be delivered, then the method 1500 moves to step 1550. If it is determined in decision state 1445 that the recipient-identifying information communicated in step 1540 does not correspond to the recipient name on the item to be delivered, then the method 1500 moves to step 1560. In step 1560, as mentioned, the item is not delivered using the storage unit and is instead delivered using alternative delivery methods.

In step 1550, a receptacle is identified for delivery of the item and the item is deposited in the receptacle. Step 1550 may be similar to step 1455 described with respect to method 1400 in FIG. 14. After step 1550, the method 1500 then moves to step 1555.

In step 1555, a communication is sent to the recipient indicating that the recipient has an item in a receptacle for pickup. Step 1555 may be similar to step 1470 described with respect to method 1400 in FIG. 14.

Figure 16:
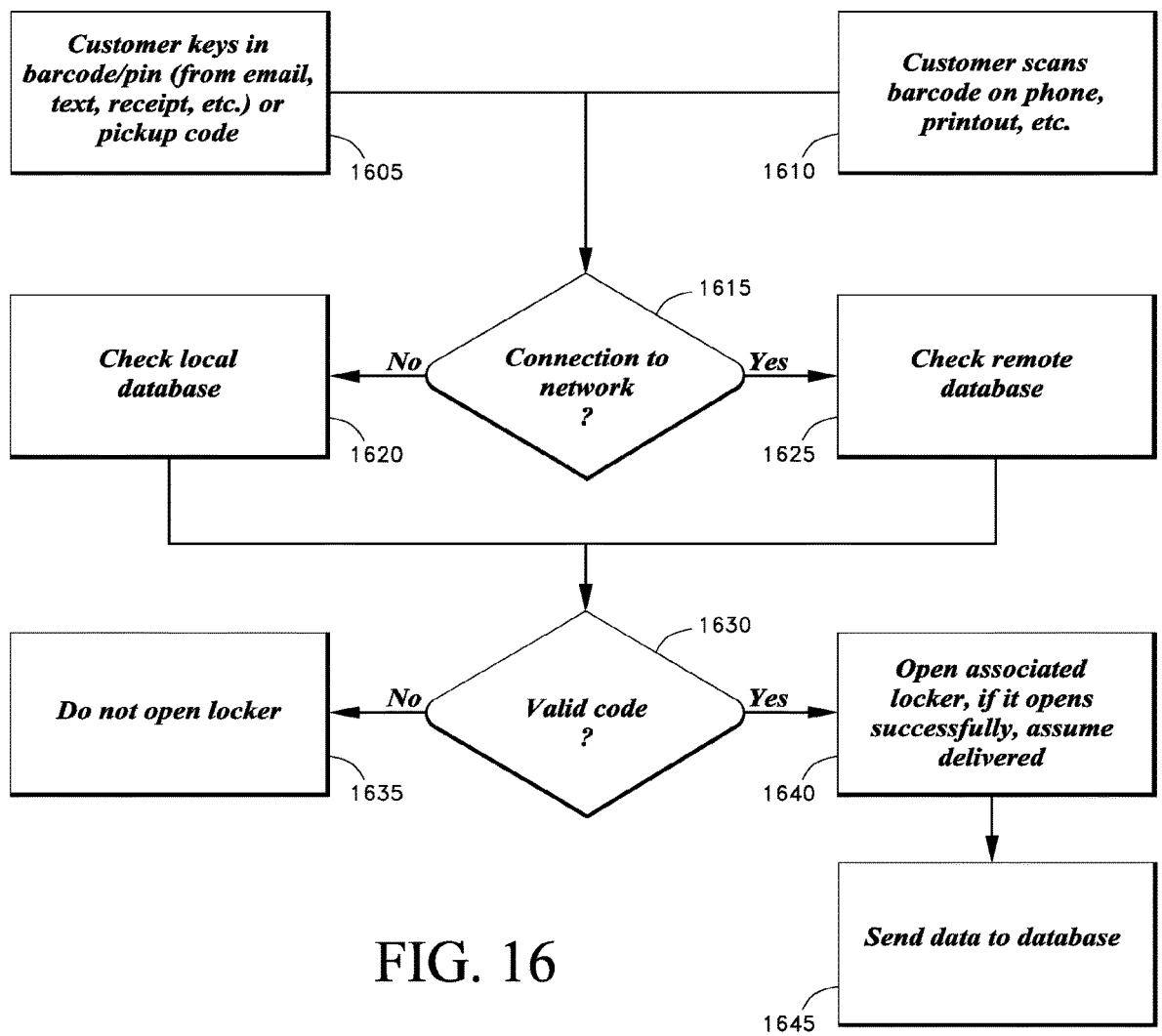
FIG. 16 depicts a flow chart of an embodiment of a method of retrieval of an item using a storage unit.

FIG. 16 depicts a flow chart of an embodiment of a method 1600 of retrieval of an item by a recipient using a storage unit. In some embodiments, the method 1600 may be used with the storage unit 100 and/or the control unit 144 to access an item such as a package from the receptacle 132.

The method 1600 may begin with either step 1605 or step 1610. In step 1605, a recipient enters information corresponding to the item. In some embodiments, the recipient keys in the barcode or pin or pickup code. The recipient may have received such information on a receipt or in an electronic communication, such as electronic mail, text message, etc. In some embodiments, the recipient enters information contained on the notice information 153, such as the receipt 149 described with respect to FIG. 4. For example, the recipient may manually enter the user access information 151, which may be a bar code, numerical code, etc. The recipient may enter the information on the interface 150 or other feature of the control unit 144. In some embodiments, the screen 148 may be used to confirm a recipient's selection and to display information related to step 1605. For example, the recipient may select the #key to confirm entry of a code.

Alternatively, the method 1600 may begin with step 1610, wherein user access information such as a bar code is read. In some embodiments, the notice information 153 contains the user access information 153 which is read by the interface 150, which may be a scanner. For example, the receipt 149 or a mobile device may contain a bar code, QR code, or other readable information.

After either of steps 1605 or 1610 is performed, the method 1600 then moves to decision state 1615 wherein it is determined if there is a connection to a network such as a Central Management System ("CMS"). In some embodiments, it may be determined whether the control unit 144 is communicatively connected with the network 169, which may be a CMS. In some embodiments, it may be determined in step 1615 if there is a connection to a database, storage or memory, such as the storage database 174, the user database 173, the memory 170, the priority module 175, and/or the database 171. If it is determined in decision state 1615 that there is a connection to a network, the method 1600 then moves to step 1625. If it is determined in decision state 1615 that there is not a connection to a network, the method 1600 then moves to step 1620.

In step 1620, a local database is checked. In some embodiments, the memory 170 and/or database 171 is accessed to look up the information received in either step 1605 or 1610. These are just some examples, and other databases or memories may be accessed. The local database may be checked in step 1620 to verify the information received in step 1605 or 1610. For example, information may be accessed in step 1620 that allows for confirmation of the validity of the information in a following step of the method 1600. In some embodiments, a receptacle such as the receptacle 132 may be identified that is associated with such information. After step 1620, the method 1600 moves to decision state 1630, as described below.

In step 1625, the network such as a CMS is checked. In some embodiments, the storage database 174, the user database 173, the memory 170, the priority module 175, and/or the database 171 is/are accessed to look up the information received in either step 1605 or 1610. These are just some examples, and other databases or memories may be accessed. Such information may be assessed similarly as described with respect to step 1620. After step 1625, the method 1600 moves to decision state 1630.

At decision state 1630, it is determined whether the user access information or other received code is valid. In some embodiments, it is determined whether the user access information 151 and/or notice information 153 is valid. For example, the information accessed in either step 1620 or 1625 may be compared to the information received in either step 1605 or 1610 to determine whether the recipient should be given access to the receptacle. In some embodiments, in decision state 1630 it may be determined that the information is valid if a receptacle, such as the receptacle 132, is identified that is associated with such information. If it is determined in decision state 1630 that the user access information is not valid, then the method moves to step 1635 wherein access is not permitted to the receptacle. If it is determined in decision state 1630 that the user access information is valid, then the method moves to step 1640.

In step 1640, access to the corresponding receptacle is allowed, for example by opening the corresponding receptacle 132, which may be a locker. In some embodiments, the receptacle 132 identified in steps 1620 or 1625 or in decision state 1630 is opened. After step 1640, the method 1600 moves to step 1645.

In step 1645, data is sent to a database indicating successful retrieval of the item. In some embodiments, the database is a local database, such as the memory 170 and/or database 171. In some embodiments, the database is a remote or networked database, such as the network 169 or user database 173. In some embodiments, these or other databases may be updated or otherwise written to in order to indicate that the user access information has been used. For example, it may be communicated that the user access information 151 has been used such that it cannot be used again to access the receptacle 132.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The logical blocks, modules and flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for storage of an item, the system comprising:
   a storage unit comprising:
      an integrally formed base, the base configured to secure the storage unit to a placement location and to elevate the storage unit from the surrounding ground level;
      a cabinet connected to the base;
      a rotatable frame positioned within the cabinet and configured to rotate at least one hundred and eighty degrees with respect to the cabinet;
      a plurality of storage receptacles connected to the rotatable frame; and
      a control unit and an agent access portal each affixed to the rotatable frame,
      wherein each of the plurality of storage receptacles is in electronic communication with the agent access portal.

2. The system of claim 1, wherein the control unit is in communicating connection with the frame, and wherein the control unit is configured to move the frame between a first and a second position in response to an agent input.

3. The system of claim 1, further comprising a door connected to the cabinet in a configuration such that the door permits access to the agent access portal on the rotatable frame.

4. The system of claim 3, wherein the agent access portal includes a computer configured to receive identifying information corresponding to a recipient of an item to be placed in one of the plurality of storage receptacles.

5. The system of claim 4, wherein the computer includes a screen and an input device.

6. The system of claim 5, wherein the computer includes a printer.

7. The system of claim 1, further comprising a user interface positioned to be accessible by a non-agent user.

8. A system for storage of an item, the system comprising:
   a cabinet having an opening;
   a rotatable frame located within the cabinet, the frame moveable with respect to the cabinet between a first position and a second position; and
   a plurality of storage receptacles attached to the rotatable frame, each of the receptacles having:
      a front side,
      a rear side positioned opposite the front side,
      an interior configured to contain an item, and
      an agent access portal located on the rear side of the receptacle and;
   a door connected to the plurality of storage receptacles, such that opening the door permits access to the agent access portals of the storage receptacles,
   wherein when the frame is in the second position, the agent access portal to each of the plurality of storage receptacles is accessible through the opening.

9. The system of claim 8, wherein the door is accessible through the opening when the rotatable frame is in the second position.

10. The system of claim 8, further comprising a control circuit in communicating connection with the frame, wherein the control circuit is configured to move the frame between the first and second position in response to an agent input, and wherein providing the communication comprises transmitting the user access code to a mobile device.

11. The system of claim 10, further comprising a user access portal located on the front side, wherein when the frame is in the first position, the user access portal on each of the plurality of storage receptacles is accessible through the opening, and wherein an interface is configured to receive the user access code from the mobile device.

12. The system of claim 11, wherein the control circuit is further configured to prohibit use of the user access code to access the storage receptacles following permitting access to the identified storage receptacle.

* * * * *